(12) United States Patent
Hamam et al.

(10) Patent No.: US 8,836,172 B2
(45) Date of Patent: *Sep. 16, 2014

(54) EFFICIENT NEAR-FIELD WIRELESS ENERGY TRANSFER USING ADIABATIC SYSTEM VARIATIONS

(71) Applicant: Massachusetts Institute of Technology, Cambridge, MA (US)

(72) Inventors: Rafif E. Hamam, Cambridge, MA (US); Aristeidis Karalis, Boston, MA (US); John D. Joannopoulos, Belmont, MA (US); Marin Soljacic, Belmont, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/677,407

(22) Filed: Nov. 15, 2012

(65) Prior Publication Data

US 2014/0062211 A1 Mar. 6, 2014

Related U.S. Application Data

(63) Continuation of application No. 12/571,949, filed on Oct. 1, 2009, now Pat. No. 8,362,651.

(60) Provisional application No. 61/101,809, filed on Oct. 1, 2008.

(51) Int. Cl.
*H01F 37/00* (2006.01)
(52) U.S. Cl.
USPC .............................. 307/104; 307/149; 307/151
(58) Field of Classification Search
USPC ......................................... 307/104, 149, 151
See application file for complete search history.

(56) References Cited

U.S. PATENT DOCUMENTS

| 645,576 A | 3/1900 | Telsa |
| 649,621 A | 5/1900 | Tesla |

(Continued)

FOREIGN PATENT DOCUMENTS

| CA | 142352 | 8/1912 |
| DE | 38 24 972 | 1/1989 |

(Continued)

OTHER PUBLICATIONS

Abe et al. "A Noncontact Charger Using a Resonant Converter with Parallel Capacitor of the Secondary Coil". IEEE, 36(2):444-451, Mar./Apr. 2000.

(Continued)

*Primary Examiner* — Jared Fureman
*Assistant Examiner* — Alfonso Perez Borroto
(74) *Attorney, Agent, or Firm* — Fish & Richardson P.C.

(57) ABSTRACT

Disclosed is a method for transferring energy wirelessly including transferring energy wirelessly from a first resonator structure to an intermediate resonator structure, wherein the coupling rate between the first resonator structure and the intermediate resonator structure is $\kappa_{1B}$, transferring energy wirelessly from the intermediate resonator structure to a second resonator structure, wherein the coupling rate between the intermediate resonator structure and the second resonator structure is $\kappa_{B2}$, and during the wireless energy transfers, adjusting at least one of the coupling rates $\kappa_{1B}$ and $\kappa_{B2}$ to reduce energy accumulation in the intermediate resonator structure and improve wireless energy transfer from the first resonator structure to the second resonator structure through the intermediate resonator structure.

34 Claims, 26 Drawing Sheets

(56) References Cited

U.S. PATENT DOCUMENTS

| | | |
|---|---|---|
| 787,412 A | 4/1905 | Tesla |
| 1,119,732 A | 12/1914 | Tesla |
| 2,133,494 A | 10/1938 | Waters |
| 3,517,350 A | 6/1970 | Beaver |
| 3,535,543 A | 10/1970 | Dailey |
| 4,088,999 A | 5/1978 | Fletcher et al. |
| 4,180,795 A | 12/1979 | Matsuda et al. |
| 4,450,431 A | 5/1984 | Hochstein |
| 4,588,978 A | 5/1986 | Allen |
| 5,027,709 A | 7/1991 | Slagle |
| 5,033,295 A | 7/1991 | Schmid et al. |
| 5,034,658 A | 7/1991 | Hierig et al. |
| 5,053,774 A | 10/1991 | Schuermann et al. |
| 5,070,293 A | 12/1991 | Ishii et al. |
| 5,118,997 A | 6/1992 | El-Hamamsy |
| 5,216,402 A | 6/1993 | Carosa |
| 5,287,112 A | 2/1994 | Schuermann |
| 5,341,083 A | 8/1994 | Klontz et al. |
| 5,367,242 A | 11/1994 | Hulman |
| 5,374,930 A | 12/1994 | Schuermann |
| 5,437,057 A | 7/1995 | Richley et al. |
| 5,455,467 A | 10/1995 | Young et al. |
| 5,493,691 A | 2/1996 | Barrett |
| 5,528,113 A | 6/1996 | Boys et al. |
| 5,550,452 A | 8/1996 | Shirai et al. |
| 5,703,573 A | 12/1997 | Fujimoto et al. |
| 5,864,323 A | 1/1999 | Berthon |
| 5,898,579 A | 4/1999 | Boys et al. |
| 5,986,895 A | 11/1999 | Stewart et al. |
| 5,999,308 A | 12/1999 | Nelson et al. |
| 6,176,433 B1 | 1/2001 | Uesaka et al. |
| 6,184,651 B1 | 2/2001 | Fernandez et al. |
| 6,436,299 B1 | 8/2002 | Baarman et al. |
| 6,450,946 B1 | 9/2002 | Forsell |
| 6,452,465 B1 | 9/2002 | Brown et al. |
| 6,459,218 B2 | 10/2002 | Boys et al. |
| 6,515,878 B1 | 2/2003 | Meins et al. |
| 6,563,425 B2 | 5/2003 | Nicholson et al. |
| 6,597,076 B2 | 7/2003 | Scheible et al. |
| 6,650,227 B1 | 11/2003 | Bradin |
| 6,664,770 B1 | 12/2003 | Bartels |
| 6,673,250 B2 | 1/2004 | Kuennen et al. |
| 6,731,071 B2 | 5/2004 | Baarman |
| 6,749,119 B2 | 6/2004 | Scheible et al. |
| 6,772,011 B2 | 8/2004 | Dolgin |
| 6,798,716 B1 | 9/2004 | Charych |
| 6,806,649 B2 | 10/2004 | Mollema et al. |
| 6,812,645 B2 | 11/2004 | Baarman |
| 6,825,620 B2 | 11/2004 | Kuennen et al. |
| 6,831,417 B2 | 12/2004 | Baarman |
| 6,839,035 B1 | 1/2005 | Addonisio et al. |
| 6,844,702 B2 | 1/2005 | Giannopoulos et al. |
| 6,856,291 B2 | 2/2005 | Mickle et al. |
| 6,906,495 B2 | 6/2005 | Cheng et al. |
| 6,917,163 B2 | 7/2005 | Baarman |
| 6,917,431 B2 | 7/2005 | Soljacic et al. |
| 6,937,130 B2 | 8/2005 | Scheible et al. |
| 6,960,968 B2 | 11/2005 | Odendaal et al. |
| 6,975,198 B2 | 12/2005 | Baarman |
| 7,042,196 B2 | 5/2006 | Ka-Lai et al. |
| 7,069,064 B2 | 6/2006 | Govorgian et al. |
| 7,116,200 B2 | 10/2006 | Baarman et al. |
| 7,118,240 B2 | 10/2006 | Baarman et al. |
| 7,126,450 B2 | 10/2006 | Baarman et al. |
| 7,132,918 B2 | 11/2006 | Baarman et al. |
| 7,147,604 B1 | 12/2006 | Allen et al. |
| 7,180,248 B2 | 2/2007 | Kuennen et al. |
| 7,191,007 B2 | 3/2007 | Desai et al. |
| 7,212,414 B2 | 5/2007 | Baarman |
| 7,239,110 B2 | 7/2007 | Cheng et al. |
| 7,248,017 B2 | 7/2007 | Cheng et al. |
| 7,375,492 B2 | 5/2008 | Calhoon et al. |
| 7,375,493 B2 | 5/2008 | Calhoon et al. |
| 7,378,817 B2 | 5/2008 | Calhoon et al. |
| 7,382,636 B2 | 6/2008 | Baarman et al. |
| 7,385,357 B2 | 6/2008 | Kuennen et al. |
| 7,443,135 B2 | 10/2008 | Cho |
| 7,462,951 B1 | 12/2008 | Baarman |
| 7,466,213 B2 | 12/2008 | Lobl et al. |
| 7,474,058 B2 | 1/2009 | Baarman |
| 7,492,247 B2 | 2/2009 | Schmidt et al. |
| 7,514,818 B2 | 4/2009 | Abe et al. |
| 7,518,267 B2 | 4/2009 | Baarman |
| 7,525,283 B2 | 4/2009 | Cheng et al. |
| 7,545,337 B2 | 6/2009 | Guenther |
| 7,599,743 B2 | 10/2009 | Hassler, Jr. et al. |
| 7,615,936 B2 | 11/2009 | Baarman et al. |
| 7,639,514 B2 | 12/2009 | Baarman |
| 7,741,734 B2 | 6/2010 | Joannopoulos et al. |
| 7,795,708 B2 | 9/2010 | Katti |
| 7,825,543 B2 | 11/2010 | Karalis et al. |
| 7,843,288 B2 | 11/2010 | Lee et al. |
| 7,863,859 B2 | 1/2011 | Soar |
| 8,022,576 B2 | 9/2011 | Joannopoulos et al. |
| 8,076,800 B2 | 12/2011 | Joannopoulos et al. |
| 8,076,801 B2 | 12/2011 | Karalis et al. |
| 8,084,889 B2 | 12/2011 | Joannopoulos et al. |
| 8,097,983 B2 | 1/2012 | Karalis et al. |
| 8,131,378 B2 | 3/2012 | Greenberg et al. |
| 8,178,995 B2 | 5/2012 | Amano et al. |
| 8,362,651 B2 * | 1/2013 | Hamam et al. ............... 307/104 |
| 8,395,282 B2 | 3/2013 | Joannopoulos et al. |
| 8,395,283 B2 | 3/2013 | Joannopoulos et al. |
| 8,400,018 B2 | 3/2013 | Joannopoulos et al. |
| 8,400,019 B2 | 3/2013 | Joannopoulos et al. |
| 8,400,020 B2 | 3/2013 | Joannopoulos et al. |
| 8,400,021 B2 | 3/2013 | Joannopoulos et al. |
| 8,400,022 B2 | 3/2013 | Joannopoulos et al. |
| 8,400,023 B2 | 3/2013 | Joannopoulos et al. |
| 8,400,024 B2 | 3/2013 | Joannopoulos et al. |
| 2002/0032471 A1 | 3/2002 | Loftin et al. |
| 2002/0105343 A1 | 8/2002 | Scheible et al. |
| 2002/0118004 A1 | 8/2002 | Scheible et al. |
| 2003/0038641 A1 | 2/2003 | Scheible |
| 2003/0062794 A1 | 4/2003 | Scheible et al. |
| 2003/0062980 A1 | 4/2003 | Scheible et al. |
| 2003/0124050 A1 | 7/2003 | Yadav et al. |
| 2003/0126948 A1 | 7/2003 | Yadav et al. |
| 2003/0199778 A1 | 10/2003 | Mickle et al. |
| 2003/0214255 A1 | 11/2003 | Baarman et al. |
| 2004/0000974 A1 | 1/2004 | Odenaal et al. |
| 2004/0100338 A1 | 5/2004 | Clark |
| 2004/0113847 A1 | 6/2004 | Qi et al. |
| 2004/0130915 A1 | 7/2004 | Baarman |
| 2004/0130916 A1 | 7/2004 | Baarman |
| 2004/0150934 A1 | 8/2004 | Baarman |
| 2004/0201361 A1 | 10/2004 | Koh et al. |
| 2004/0222751 A1 | 11/2004 | Mollema et al. |
| 2004/0232845 A1 | 11/2004 | Baarman |
| 2004/0233043 A1 | 11/2004 | Yazawa et al. |
| 2004/0267501 A1 | 12/2004 | Freed et al. |
| 2005/0007067 A1 | 1/2005 | Baarman et al. |
| 2005/0027192 A1 | 2/2005 | Govari et al. |
| 2005/0085873 A1 | 4/2005 | Gord et al. |
| 2005/0093475 A1 | 5/2005 | Kuennen et al. |
| 2005/0104064 A1 | 5/2005 | Hegarty et al. |
| 2005/0116650 A1 | 6/2005 | Baarman |
| 2005/0122058 A1 | 6/2005 | Baarman et al. |
| 2005/0122059 A1 | 6/2005 | Baarman et al. |
| 2005/0125093 A1 | 6/2005 | Kikuchi et al. |
| 2005/0127849 A1 | 6/2005 | Baarman et al. |
| 2005/0127850 A1 | 6/2005 | Baarman et al. |
| 2005/0127866 A1 | 6/2005 | Hamilton et al. |
| 2005/0135122 A1 | 6/2005 | Cheng et al. |
| 2005/0151511 A1 | 7/2005 | Chary |
| 2005/0156560 A1 | 7/2005 | Shimaoka et al. |
| 2005/0288739 A1 | 12/2005 | Hassler, Jr. et al. |
| 2005/0288740 A1 | 12/2005 | Hassler, Jr. et al. |
| 2005/0288741 A1 | 12/2005 | Hassler, Jr. et al. |
| 2006/0022636 A1 | 2/2006 | Xian et al. |
| 2006/0061323 A1 | 3/2006 | Cheng et al. |
| 2006/0090956 A1 | 5/2006 | Peshkovskiy et al. |
| 2006/0132045 A1 | 6/2006 | Baarman |
| 2006/0181242 A1 | 8/2006 | Freed et al. |

(56) References Cited

U.S. PATENT DOCUMENTS

| | | |
|---|---|---|
| 2006/0185809 A1 | 8/2006 | Elfrink et al. |
| 2006/0202665 A1 | 9/2006 | Hsu |
| 2006/0205381 A1 | 9/2006 | Beart et al. |
| 2006/0270440 A1 | 11/2006 | Shearer et al. |
| 2007/0021140 A1 | 1/2007 | Keyes, IV et al. |
| 2007/0064406 A1 | 3/2007 | Beart |
| 2007/0145830 A1 | 6/2007 | Lee et al. |
| 2007/0171681 A1 | 7/2007 | Baarman |
| 2007/0178945 A1 | 8/2007 | Cook et al. |
| 2007/0182367 A1 | 8/2007 | Partovi |
| 2007/0222542 A1 | 9/2007 | Joannopoulos et al. |
| 2007/0267918 A1 | 11/2007 | Gyland |
| 2007/0276538 A1 | 11/2007 | Kjellsson et al. |
| 2008/0012569 A1 | 1/2008 | Hall et al. |
| 2008/0014897 A1 | 1/2008 | Cook et al. |
| 2008/0030415 A1 | 2/2008 | Homan et al. |
| 2008/0067874 A1 | 3/2008 | Tseng |
| 2008/0191638 A1 | 8/2008 | Kuennen et al. |
| 2008/0197710 A1 | 8/2008 | Kreitz et al. |
| 2008/0211320 A1 | 9/2008 | Cook et al. |
| 2008/0265684 A1 | 10/2008 | Farkas |
| 2008/0266748 A1 | 10/2008 | Lee |
| 2008/0278264 A1* | 11/2008 | Karalis et al. ............. 333/219 |
| 2009/0010028 A1 | 1/2009 | Baarman et al. |
| 2009/0015075 A1 | 1/2009 | Cook et al. |
| 2009/0033564 A1 | 2/2009 | Cook et al. |
| 2009/0045772 A1 | 2/2009 | Cook et al. |
| 2009/0051224 A1 | 2/2009 | Cook et al. |
| 2009/0058189 A1 | 3/2009 | Cook et al. |
| 2009/0067198 A1 | 3/2009 | Graham et al. |
| 2009/0072627 A1 | 3/2009 | Cook et al. |
| 2009/0072628 A1 | 3/2009 | Cook et al. |
| 2009/0072629 A1 | 3/2009 | Cook et al. |
| 2009/0079268 A1 | 3/2009 | Cook et al. |
| 2009/0085408 A1 | 4/2009 | Bruhn |
| 2009/0085706 A1 | 4/2009 | Baarman et al. |
| 2009/0096413 A1 | 4/2009 | Patovi et al. |
| 2009/0102292 A1 | 4/2009 | Cook et al. |
| 2009/0108679 A1 | 4/2009 | Porwal |
| 2009/0108997 A1 | 4/2009 | Patterson et al. |
| 2009/0127937 A1 | 5/2009 | Widmer et al. |
| 2009/0134712 A1 | 5/2009 | Cook et al. |
| 2009/0146892 A1 | 6/2009 | Shimizu et al. |
| 2009/0153273 A1 | 6/2009 | Chen |
| 2009/0160261 A1 | 6/2009 | Elo |
| 2009/0167449 A1 | 7/2009 | Cook et al. |
| 2009/0174263 A1 | 7/2009 | Baarman et al. |
| 2009/0179502 A1 | 7/2009 | Cook et al. |
| 2009/0189458 A1 | 7/2009 | Kawasaki |
| 2009/0195332 A1 | 8/2009 | Joannopoulos et al. |
| 2009/0195333 A1 | 8/2009 | Joannopoulos et al. |
| 2009/0212636 A1 | 8/2009 | Cook et al. |
| 2009/0213028 A1 | 8/2009 | Cook et al. |
| 2009/0224608 A1 | 9/2009 | Cook et al. |
| 2009/0224609 A1 | 9/2009 | Cook et al. |
| 2009/0224856 A1 | 9/2009 | Karalis et al. |
| 2009/0230777 A1 | 9/2009 | Baarman et al. |
| 2009/0237194 A1 | 9/2009 | Waffenschmidt et al. |
| 2009/0243394 A1 | 10/2009 | Levine |
| 2009/0243397 A1 | 10/2009 | Cook et al. |
| 2009/0251008 A1 | 10/2009 | Sugaya |
| 2009/0267558 A1 | 10/2009 | Jung |
| 2009/0267709 A1 | 10/2009 | Joannopoulos et al. |
| 2009/0267710 A1 | 10/2009 | Joannopoulos et al. |
| 2009/0271047 A1 | 10/2009 | Wakamatsu |
| 2009/0271048 A1 | 10/2009 | Wakamatsu |
| 2009/0273242 A1 | 11/2009 | Cook |
| 2009/0281678 A1 | 11/2009 | Wakamatsu |
| 2009/0284082 A1 | 11/2009 | Mohammadian |
| 2009/0284083 A1 | 11/2009 | Karalis et al. |
| 2009/0284218 A1 | 11/2009 | Mohammadian et al. |
| 2009/0284220 A1 | 11/2009 | Toncich et al. |
| 2009/0284227 A1 | 11/2009 | Mohammadian et al. |
| 2009/0284245 A1 | 11/2009 | Kirby et al. |
| 2009/0284369 A1 | 11/2009 | Toncich et al. |
| 2009/0286470 A1 | 11/2009 | Mohammadian et al. |
| 2009/0286475 A1 | 11/2009 | Toncich et al. |
| 2009/0286476 A1 | 11/2009 | Toncich et al. |
| 2009/0289595 A1 | 11/2009 | Chen et al. |
| 2009/0299918 A1 | 12/2009 | Cook et al. |
| 2010/0017249 A1 | 1/2010 | Fincham et al. |
| 2010/0033021 A1 | 2/2010 | Bennett |
| 2010/0034238 A1 | 2/2010 | Bennett |
| 2010/0036773 A1 | 2/2010 | Bennett |
| 2010/0038970 A1 | 2/2010 | Cook et al. |
| 2010/0045114 A1 | 2/2010 | Sample et al. |
| 2010/0052431 A1 | 3/2010 | Mita |
| 2010/0052811 A1 | 3/2010 | Smith et al. |
| 2010/0065352 A1 | 3/2010 | Ichikawa |
| 2010/0066349 A1 | 3/2010 | Lin et al. |
| 2010/0081379 A1 | 4/2010 | Cooper et al. |
| 2010/0094381 A1 | 4/2010 | Kim et al. |
| 2010/0096934 A1 | 4/2010 | Joannopoulos et al. |
| 2010/0102639 A1 | 4/2010 | Joannopoulos et al. |
| 2010/0102640 A1 | 4/2010 | Joannopoulos et al. |
| 2010/0102641 A1 | 4/2010 | Joannopoulos et al. |
| 2010/0109443 A1 | 5/2010 | Cook et al. |
| 2010/0109604 A1 | 5/2010 | Boys et al. |
| 2010/0115474 A1 | 5/2010 | Takada et al. |
| 2010/0117454 A1 | 5/2010 | Cook et al. |
| 2010/0117455 A1 | 5/2010 | Joannopoulos et al. |
| 2010/0117456 A1 | 5/2010 | Karalis et al. |
| 2010/0117596 A1 | 5/2010 | Cook et al. |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0123452 A1 | 5/2010 | Amano et al. |
| 2010/0123530 A1 | 5/2010 | Park et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0127660 A1 | 5/2010 | Cook et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0148589 A1 | 6/2010 | Hamam et al. |
| 2010/0148723 A1 | 6/2010 | Cook et al. |
| 2010/0151808 A1 | 6/2010 | Toncich et al. |
| 2010/0156346 A1 | 6/2010 | Takada et al. |
| 2010/0156570 A1 | 6/2010 | Hong et al. |
| 2010/0164295 A1 | 7/2010 | Ichikawa et al. |
| 2010/0171370 A1 | 7/2010 | Karalis et al. |
| 2010/0181844 A1 | 7/2010 | Karalis et al. |
| 2010/0181961 A1 | 7/2010 | Novak et al. |
| 2010/0184371 A1 | 7/2010 | Cook et al. |
| 2010/0187911 A1 | 7/2010 | Joannopoulos et al. |
| 2010/0187913 A1 | 7/2010 | Sample |
| 2010/0190435 A1 | 7/2010 | Cook et al. |
| 2010/0190436 A1 | 7/2010 | Cook et al. |
| 2010/0194206 A1 | 8/2010 | Burdo et al. |
| 2010/0194207 A1 | 8/2010 | Graham |
| 2010/0194334 A1 | 8/2010 | Kirby et al. |
| 2010/0194335 A1 | 8/2010 | Kirby et al. |
| 2010/0201189 A1 | 8/2010 | Kirby et al. |
| 2010/0201201 A1 | 8/2010 | Mobarhan et al. |
| 2010/0201202 A1 | 8/2010 | Kirby et al. |
| 2010/0201204 A1 | 8/2010 | Sakoda et al. |
| 2010/0201205 A1 | 8/2010 | Karalis et al. |
| 2010/0201310 A1 | 8/2010 | Vorenkamp et al. |
| 2010/0201313 A1 | 8/2010 | Vorenkamp et al. |
| 2010/0201316 A1 | 8/2010 | Takada et al. |
| 2010/0201513 A1 | 8/2010 | Vorenkamp et al. |
| 2010/0207458 A1 | 8/2010 | Joannopoulos et al. |
| 2010/0210233 A1 | 8/2010 | Cook et al. |
| 2010/0213770 A1 | 8/2010 | Kikuchi |
| 2010/0213895 A1 | 8/2010 | Keating et al. |
| 2010/0217553 A1 | 8/2010 | Von Novak et al. |
| 2010/0219695 A1 | 9/2010 | Komiyama et al. |
| 2010/0219696 A1 | 9/2010 | Kojima |
| 2010/0222010 A1 | 9/2010 | Ozaki et al. |
| 2010/0225175 A1 | 9/2010 | Karalis et al. |
| 2010/0225270 A1 | 9/2010 | Jacobs et al. |
| 2010/0225271 A1 | 9/2010 | Oyobe et al. |
| 2010/0225272 A1 | 9/2010 | Kirby et al. |

(56) References Cited

U.S. PATENT DOCUMENTS

| | | | |
|---|---|---|---|
| 2010/0231053 A1 | 9/2010 | Karalis et al. | |
| 2010/0231163 A1 | 9/2010 | Mashinsky | |
| 2010/0237706 A1 | 9/2010 | Karalis et al. | |
| 2010/0237707 A1 | 9/2010 | Karalis et al. | |
| 2010/0237708 A1 | 9/2010 | Karalis et al. | |
| 2010/0244576 A1 | 9/2010 | Hillan et al. | |
| 2010/0244577 A1 | 9/2010 | Shimokawa | |
| 2010/0244578 A1 | 9/2010 | Yoshikawa | |
| 2010/0244579 A1 | 9/2010 | Sogabe et al. | |
| 2010/0244580 A1 | 9/2010 | Uchida et al. | |
| 2010/0244581 A1 | 9/2010 | Uchida | |
| 2010/0244582 A1 | 9/2010 | Yoshikawa | |
| 2010/0244583 A1 | 9/2010 | Shimokawa | |
| 2010/0244839 A1 | 9/2010 | Yoshikawa | |
| 2010/0248622 A1 | 9/2010 | Kirby et al. | |
| 2010/0253152 A1 | 10/2010 | Karalis et al. | |
| 2010/0253281 A1 | 10/2010 | Li | |
| 2010/0256831 A1 | 10/2010 | Abramo et al. | |
| 2010/0259109 A1 | 10/2010 | Sato | |
| 2010/0264745 A1 | 10/2010 | Karalis et al. | |
| 2010/0264746 A1 | 10/2010 | Kazama et al. | |
| 2010/0276995 A1 | 11/2010 | Marzetta et al. | |
| 2010/0277003 A1 | 11/2010 | Von Novak et al. | |
| 2010/0277004 A1 | 11/2010 | Suzuki et al. | |
| 2010/0277005 A1 | 11/2010 | Karalis et al. | |
| 2010/0277120 A1 | 11/2010 | Cook et al. | |
| 2010/0289341 A1 | 11/2010 | Ozaki et al. | |
| 2010/0289449 A1 | 11/2010 | Elo | |
| 2010/0295505 A1 | 11/2010 | Jung et al. | |
| 2010/0295506 A1 | 11/2010 | Ichikawa | |
| 2010/0327660 A1 | 12/2010 | Karalis et al. | |
| 2010/0327661 A1 | 12/2010 | Karalis et al. | |
| 2011/0012431 A1 | 1/2011 | Karalis et al. | |
| 2011/0018361 A1 | 1/2011 | Karalis et al. | |
| 2011/0025131 A1 | 2/2011 | Karalis et al. | |
| 2011/0043046 A1 | 2/2011 | Joannopoulos et al. | |
| 2011/0049996 A1 | 3/2011 | Karalis et al. | |
| 2011/0049998 A1 | 3/2011 | Karalis et al. | |
| 2011/0074218 A1 | 3/2011 | Karalis et al. | |
| 2011/0074347 A1 | 3/2011 | Karalis et al. | |
| 2011/0089895 A1 | 4/2011 | Karalis et al. | |
| 2011/0140544 A1 | 6/2011 | Karalis et al. | |
| 2011/0148219 A1 | 6/2011 | Karalis et al. | |
| 2011/0162895 A1 | 7/2011 | Karalis et al. | |
| 2011/0169339 A1 | 7/2011 | Karalis et al. | |
| 2011/0181122 A1 | 7/2011 | Karalis et al. | |
| 2011/0193419 A1 | 8/2011 | Karalis et al. | |
| 2011/0198939 A1 | 8/2011 | Karalis et al. | |
| 2011/0221278 A1 | 9/2011 | Karalis et al. | |
| 2011/0227528 A1 | 9/2011 | Karalis et al. | |
| 2011/0227530 A1 | 9/2011 | Karalis et al. | |
| 2011/0241618 A1 | 10/2011 | Karalis et al. | |
| 2012/0068549 A1 | 3/2012 | Karalis et al. | |

FOREIGN PATENT DOCUMENTS

| | | | |
|---|---|---|---|
| DE | 100 29147 | 12/2001 | |
| DE | 200 16 655 | 3/2002 | |
| DE | 102 21 484 | 11/2003 | |
| DE | 103 04584 | 8/2004 | |
| DE | 10 2005 03629 | 2/2007 | |
| DE | 102006044057 | 4/2008 | |
| EP | 1335477 | 8/2003 | |
| EP | 1 521 206 | 4/2005 | |
| EP | 1 524 010 | 4/2005 | A61N 1/372 |
| JP | 02-097005 | 4/1990 | |
| JP | 6-341410 | 12/1994 | |
| JP | 9-182323 | 7/1997 | H02J 17/00 |
| JP | 11-75329 | 3/1999 | H02J 17/00 |
| JP | 11-188113 | 7/1999 | |
| JP | 2003-179526 | 6/2003 | H04B 5/02 |
| JP | 2004-166459 | 6/2004 | H02J 7/00 |
| JP | 2004-201458 | 7/2004 | H02M 3/28 |
| JP | 2005-57444 | 3/2005 | H01Q 7/09 |
| JP | 2006-074848 | 3/2006 | |
| KR | 10-2007-0017804 | 2/2007 | |
| SG | 112842 | 7/2005 | |
| WO | WO 92/17929 | 10/1992 | |
| WO | WO 93/23908 | 11/1993 | |
| WO | WO 94/28560 | 12/1994 | |
| WO | WO 95/11545 | 4/1995 | |
| WO | WO 96/02970 | 2/1996 | |
| WO | WO 98/50993 | 11/1998 | |
| WO | WO 00/77910 | 12/2000 | |
| WO | WO 03/092329 | 11/2003 | |
| WO | WO 03/096361 | 11/2003 | |
| WO | WO 03/096512 | 11/2003 | |
| WO | WO 2004/015885 | 2/2004 | H04B 5/00 |
| WO | WO 2004/038888 | 5/2004 | |
| WO | WO 2004/055654 | 7/2004 | |
| WO | WO 2004/073150 | 8/2004 | |
| WO | WO 2004/073166 | 8/2004 | |
| WO | WO 2004/073176 | 8/2004 | |
| WO | WO 2004/073177 | 8/2004 | |
| WO | WO 2004/112216 | 12/2004 | |
| WO | WO 2005/024865 | 3/2005 | |
| WO | WO 2005/060068 | 6/2005 | |
| WO | WO 2005/109597 | 11/2005 | |
| WO | WO 2005/109598 | 11/2005 | |
| WO | WO 2006/011769 | 2/2006 | |
| WO | WO 2007/008646 | 1/2007 | |
| WO | WO 2007/020583 | 2/2007 | |
| WO | WO 2007/042952 | 4/2007 | |
| WO | WO 2007/084716 | 7/2007 | |
| WO | WO 2007/084717 | 7/2007 | |
| WO | WO 2008/109489 | 9/2008 | |
| WO | WO 2008/118178 | 10/2008 | |
| WO | WO 2009/009559 | 1/2009 | |
| WO | WO 2009/018568 | 2/2009 | |
| WO | WO 2009/023155 | 2/2009 | |
| WO | WO 2009/023646 | 2/2009 | |
| WO | WO 2009/033043 | 3/2009 | |
| WO | WO 2009/070730 | 6/2009 | |
| WO | WO 2009/126963 | 10/2009 | |
| WO | WO 2009/140506 | 11/2009 | |
| WO | WO 2009/149464 | 12/2009 | |
| WO | WO 2009/155000 | 12/2009 | |
| WO | WO 2010/030977 | 3/2010 | |
| WO | WO 2010/039967 | 4/2010 | |
| WO | WO 2010/090538 | 8/2010 | |
| WO | WO 2010/090539 | 9/2010 | |
| WO | WO 2011/062827 | 5/2011 | |

OTHER PUBLICATIONS

Altchev et al. "Efficient Resonant Inductive Coupling Energy Transfer Using New Magnetic and Design Criteria". IEEE, pp. 1293-1298, 2005.

T. Aoki et al. Observation of strong coupling between one atom and a monolithic microresonator. Nature 443:671-674 (2006).

Apneseth et al. "Introducing wireless proximity switches" ABB Review Apr. 2002.

Baker et al., "Feedback Analysis and Design of RF Power Links for Low-Power Bionic Systems," IEEE Transactions on Biomedical Circuits and Systems, 1(1):28-38 (Mar. 2007).

Balanis, C.A., "Antenna Theory: Analysis and Design," 3rd Edition, Sections 4.2, 4.3, 5.2, 5.3 (Wiley, New Jersey, 2005).

Burri et al. "Invention Description" Feb. 5, 2008.

Electricity Unplugged, Feature: Wireless Energy, *Physics World*, pp. 23-25 (Feb. 2009).

Esser et al. "A New Approach to Power Supplies for Robots". IEEE, 27(5):872-875, Sep./Oct. 1991.

Fenske et al. "Dielectric Materials at Microwave Frequencies". Applied Microwave & Wireless, pp. 92-100, 2000.

C. Fernandez et al., "A simple dc-dc converter for the power supply of a cochlear implant", *IEEE*, pp. 1965-1970 (2003).

D.H.Freedman. "Power on a Chip". MIT Technology Review, Nov. 2004.

Geyi, Wen. A Method for the Evaluation of Small Antenna Q. IEEE Transactions on Antennas and Propagation, vol. 51, No. 8, Aug. 2003.

(56) References Cited

OTHER PUBLICATIONS

Haus, H.A., "Waves and Fields in Optoelectronics," Chapter 7 "Coupling of Modes—Reasonators and Couplers" (Prentice-Hall, New Jersey, 1984).

Heikkinen et al. "Performance and Efficiency of Planar Rectennas for Short-Range Wireless Power Transfer at 2.45 GHz". Microwave and Optical Technology Letters, 31(2):86-91, Oct. 20, 2001.

Hirai et al. "Integral Motor with Driver and Wireless Transmission of Power and Information for Autonomous Subspindle Drive". IEEE, 15(1):13-20, Jan. 2000.

Hirai et al. "Practical Study on Wireless Transmission of Power and Information for Autonomous Decentralized Manufacturing System". IEEE, 46(2):349-359, Apr. 1999.

Hirai et al. "Study on Intelligent Battery Charging Using Inductive Transmission of Power and Information". IEEE, 15(2):335-345, Mar. 2000.

Hirai et al. "Wireless Transmission of Power and Information and Information for Cableless Linear Motor Drive". IEEE 15(1):21-27, Jan. 2000.

"Intel CTO Says Gap between Humans, Machines Will Close by 2050", *Intel News Release*, (See intel.com/.../20080821comp. htm?iid=S . . . ) (Printed Nov. 6, 2009).

M. V. Jacob et al. "Lithium Tantalate—A High Permittivity Dielectric Material for Microwave Communication Systems". Proceedings of IEEE TENCON—Poster Papers, pp. 1362-1366, 2003.

Jackson, J.D., "Classical Electrodynamics," 3rd Edition, Sections 1.11, 5.5, 5.17, 6.9, 8.1, 8.8, 9.2, 9.3 (Wiley, New York, 1999).

Aristeidis Karalis et al., "Efficient Wireless non-radiative mid-range energy transfer", *Annals of Physics*, vol. 323, pp. 34-48 (2008).

Kawamura et al. "Wireless Transmission of Power and Information Through One High-Frequency Resonant AC Link Inverter for Robot Manipulator Applications". IEEE, 32(3):503-508, May/Jun. 1996.

Yoshihiro Konishi, *Microwave Electronic Circuit Technology*, Chapter 4, pp. 145-197 (Marcel Dekker, Inc., New York, NY 1998).

Andre Kurs et al., "Simultaneous mid-range power transfer to multiple devices",*Applied Physics Letters*, vol. 96, No. 044102 (2010).

Andre Kurs et al., "Wireless Power Transfer via Strongly Coupled Magnetic Resonances", *Science* vol. 317, pp. 83-86 (Jul. 6, 2007).

Lee, "Antenna Circuit Design for RFID Applications," Microchip Technology Inc., AN710, 50 pages (2003).

Lee, "RFID Coil Design," Microchip Technology Inc., AN678, 21 pages (1998).

Liang et al., "Silicon waveguide two-photon absorption detector at 1.5 µm wavelength for autocorrelation measurements," Applied Physics Letters, 81(7):1323-1325 (Aug. 12, 2002).

A. Mediano et al. "Design of class E amplifier with nonlinear and linear shunt capacitances for any duty cycle", IEEE Trans. Microwave Theor. Tech., vol. 55, No. 3, pp. 484-492, (2007).

Microchip Technology Inc., "microID 13.56 MHz Design Guide—MCRF355/360 Reader Reference Design," 24 pages (2001).

MIT Team Experimentally Demonstrates Wireless Power Transfer, Potentially Useful for Power Laptops, Cell-Phones Without Cords—Goodbye Wires . . . , by Franklin Hadley, Institute for Soldier Nanotechnologies, Massachusetts Institute of Technology (Jun. 7, 2007).

O'Brien et al. "Analysis of Wireless Power Supplies for Industrial Automation Systems". IEEE, pp. 367-372, 2003.

O'Brien et al. "Design of Large Air-Gap Transformers for Wireless Power Supplies". IEEE, pp. 1557-1562, 2003.

J. B. Pendry. "A Chiral Route to Negative Refraction". Science 306:1353-1355 (2004).

Gary Peterson, "MIT WiTricity not so Original After all", *Feed Line* No. 9, (See http://www.tfcbooks.com/articles/witricity.htm) printed Nov. 12, 2009.

"Physics Update, Unwired Energy", *Physics Today*, pp. 26, (Jan. 2007) (See http://arxiv.org/abs/physics/0611063.).

Powercast LLC. "White Paper" Powercast simply wire free, 2003.

Sakamoto et al. "A Novel Circuit for Non-Contact Charging Through Electro-Magnetic Coupling". IEEE, pp. 168-174, 1992.

David Schneider, "A Critical Look at Wireless Power", *IEEE Spectrum*, (May 2010).

John C. Schuder et al., "An Inductively Coupled RF System for the Transmission of 1 kW of Power Through the Skin", IEEE Transactions on Bio-Medical Engineering, vol. BME-18, No. 4 (Jul. 1971).

J. C. Schuder et al., "Energy Transport Into the Closed Chest From a Set of Very-Large Mutually Orthogonal Coils", Communication Electronics, vol. 64, pp. 527-534 (Jan. 1963).

John C. Schuder "Powering an Artificial Heart: Birth of the Inductively Coupled-Radio Frequency System in 1960", Artificial Organs, vol. 26, No. 11, pp. 909-915 (2002).

Sekitani et al. "A large-area flexible wireless power transmission sheet using printed plastic MEMS switches and organic field-effect transistors". [Publication Unknown].

Sekitani et al. "A large-area wireless power-transmission sheet using printed organic transistors and plastic MEMS switches" www.nature.com/naturematerials. Published online Apr. 29, 2007.

H. Sekiya et al. "FM/PWM control scheme in class DE inverter", IEEE Trans. Circuits Syst. I, vol. 51, No. 7 (Jul. 2004).

S. Sensiper. Electromagnetic wave propogation on helical conductors. PhD Thesis, Massachusetts Institute of Technology, 1951.

Marin Soljacic, "Wireless nonradiative energy transfer", *Visions of Discovery New Light on Physics, Cosmology, and Consciousness*, Cambridge University Press, New York, NY pp. 530-542 (2011).

Soljacic. "Wireless Non-Radiative Energy Transfer—PowerPoint presentation". Massachusetts Institute of Technology, Oct. 6, 2005.

Someya, Takao. "The world's first sheet-type wireless power transmission system". University of Tokyo, Dec. 12, 2006.

Splashpower, "Splashpower—World Leaders in Wireless Power," PowerPoint presentation, 30 pages (Sep. 3, 2007).

David H. Staelin et al., *Electromagnetic Waves*, Chapters 2, 3, 4, and 8, pp. 46-176 and 336-405 (Prentice Hall Upper Saddle River, New Jersey 1998).

Joseph C. Stark III, "Wireless Power Transmission Utilizing a Phased Array of Tesla Coils", Master Thesis, Massachusetts Institute of Technology (2004).

Nikola Tesla, "High Frequency Oscillators for Electro-Therapeutic and Other Purposes", *The Electrica Engineer*, vol. XXVI, No. 50 (Nov. 17, 1898).

Nikola Tesla, "High Frequency Oscillators for Electro-Therapeutic and Other Purposes", *Proceedings of the IEEE*, vol. 87, No. 7, pp. 1282-1292 (Jul. 1999).

Texas Instruments, "HF Antenna Design Notes—Technical Application Report," Literature No. 11-08-26-003, 47 pages (Sep. 2003).

"The Big Story for CES 2007: The public debut of eCoupled Intelligent Wireless Power" Press Release, Fulton Innovation LLC, Las Vegas, NV, Dec. 27, 2006.

"The world's first sheet-type wireless power transmission system: Will a socket be replaced by e-wall?" Press Release, Tokyo, Japan, Dec. 12, 2006.

Thomsen et al., "Ultrahigh speed all-optical demultiplexing based on two-photon absorption in a laser diode," Electronics Letters, 34(19):1871-1872 (Sep. 17, 1998).

"Unwired energy questions asked, answered", *Physics Today*, pp. 16-17 (Sep. 2007).

UPM Rafsec, "Tutorial overview of inductively coupled RFID Systems," 7 pages (May 2003).

Vandevoorde et al. "Wireless energy transfer for stand-alone systems: a comparison between low and high power applicability". Sensors and Actuators, A 92:305-311, 2001.

David Vilkomerson et al., "Implantable Doppler System for Self-Monitoring Vascular Grafts", *IEEE Ultrasonics Symposium*, pp. 461-465 (2004).

"Wireless Energy Transfer Can Potentially Recharge Laptops, Cell Phones Without Cords", by Marin Soljacic of Massachusetts Institute of Technology and Davide Castelvecchi of American Institute of Physics (Nov. 14, 2006).

Clemens M. Zierhofer et al., "High-Efficiency Coupling-Insensitive Transcutaneous Power and Data Transmission Via an Inductive Link", *IEEE Transactions on Biomedical Engineering*, vol. 37, No. 7, pp. 716-722 (Jul. 1990).

Examination Report for Australia Application No. 2006269374, dated Sep. 18, 2008.

(56) References Cited

OTHER PUBLICATIONS

International Search Report and Written Opinion for International Application No. PCT/US2006/026480, dated Dec. 21, 2007.
International Preliminary Report on Patentability for International Application No. PCT/US2006/026480, dated Jan. 29, 2008.
International Search Report and Written Opinion for International Application No. PCT/US2007/070892, dated Mar. 3, 2008.
International Search Report and Written Opinion for International Application No. PCT/US09/43970, dated Jul. 14, 2009.
International Search Report and Written Opinion of the International Searching Authority for International Application No. PCT/US2011/027868 dated Jul. 5, 2011.
European Examination Report dated Jan. 15, 2009 in connection with Application No. 06 786 588.1-1242.
International Preliminary Report on Patentability with regard to International Application No. PCT/US2007/070892 dated Sep. 29, 2009.
"Recharging, The Wireless Way—Even physicists forget to recharge their cell phones sometimes." by Angela Chang—PC Magazine, *ABC News Internet Ventures*, (2006).
"Physics Promises Wireless Power" by Jonathan Fildes, Science and Technology Reporter, *BBC News*, (Nov. 15, 2006).
"Wireless energy promise powers up" by Jonathan Fildes, *Science and Technology Report, BBC News*, (See http://news.bbc.co.uk/2/hi/technology/6725955.stm) (Jun. 7, 2007).
"The technology with impact 2007", by Jonathan Fildes, *BBC News*, (Dec. 27, 2007).
"In pictures: A year in technology", *BBC News*, (Dec. 28, 2007).
"Man tries wirelessly boosting batteries", by Seth Borenstein, *AP Science Writer*, Boston.com, (See http://www.boston.com/business/technology/articles/2006/11/15/man_tries_wirelessly_b . . . ) (Nov. 15, 2006).
"The vision of an MIT physicist: Getting rid of pesky rechargers" by Gareth Cooks, Globe Staff, Boston.com, (Dec. 11, 2006).
"MIT discovery could unplug your iPod forever", by Chris Reidy, Globe staff, Boston.com, (See http://www.boston.com/business/ticker/2007/06/mit_discovery_c.html) (Jun. 7, 2007).
"Scientists light bulb with 'wireless electricity'", www.Chinaview.cn, (See http://news.xinhuanet.com/english/2007-06/08/content_6215681.htm) (Jun. 2007).
"Look, Ma—no wires!—Electricity broadcast through the air may someday run your home", by Gregory M. Lamb, Staff writer, *The Christian Science Monitor*, (See http://www.csmonitor.com/2006/1116/p14s01-stet.html) (Nov. 15, 2006).
"The end of the plug? Scientists invent wireless device that beams electricity through your home", by David Derbyshire, *Daily Mail*, (See http://www.dailymail.co.uk/pages/live/articles/technology/technology.html?in_article_id=4 . . . ) (Jun. 7, 2007).
"Lab report: Pull the plug for a positive charge", by James Morgan, *The Herald*, Web Issue 2680 (Nov. 16, 2006).
"Recharging gadgets without cables", *Infotech Online*, Printed from infotech.indiatimes.com (Nov. 17, 2006).
"Electro-nirvana? Not so fast", by Alan Boyle, *MSNBC*, (Jun. 8, 2007).
"'Evanescent coupling' could power gadgets wirelessly" by Celeste Biever, NewScientistsTech.com, (see http://www.newscientisttech.com/article.ns?id=dn10575&print=true) (Nov. 15, 2006).
"Wireless Energy", by Clay Risen, *The New York Times*, (Dec. 9, 2007).
"Wireless power transfer possible". *PressTV*, (See http://www.presstv.ir/detail.aspx?id=12754&sectionid=3510208) (Jun. 11, 2007).
"Outlets Are Out", by Phil Berardelli, *ScienceNOW Daily News, Science Now*, (See http://sciencenow.sciencemag.org/cgi/content/full/2006/1114/2) (Nov. 14, 2006).
"The Power of Induction—Cutting the last cord could resonate with our increasingly gadget-dependent lives", by Davide Castelvecchi, *Science News Online*, vol. 172, No. 3, (Week of Jul. 21, 2007).
"Wireless Energy Transfer May Power Devices at a Distance", ScientificAmerican.com, (Nov. 14, 2006).

"Wireless Energy Lights Bulb from Seven Feet Away—Physicists vow to cut the cord between your laptop battery and the wall socket—with just a simple loop of wire", by JR Minkel, ScientificAmerican.com, (See http://www.sciam.com/article.cfm?articleid=07511C52-E7F2-99DF-3FA6ED2D7DC9AA2 . . . ) (Jun. 7, 2007).
"Air Power—Wireless data connections are common—now scientists are working on wireless power", by Stephen Cass, Sponsored by Spectrum, (See http://spectrum.ieee.org/computing/hardware/air-power) (Nov. 2006).
"Wireless revolution could spell end of plugs" by Roger Highfield, Science Editor. Telegraph.co.uk, (See http://www.telegraph.co.uk/news/main.jhtml?xml=/news/2007/06/07/nwireless107.xml) (Jun. 7, 2007).
"Man tries wirelessly boosting batteries", by Seth Borenstein, The Associated Press, *USA Today*(Nov. 16, 2006).
"MIT's wireless electricity for mobile phones", by Miebi Senge, Vanguard, (See http://www.vanguardngr.com/articles/2002/features/gsm/gsm211062007.htm) (Jun. 11, 2007).
"MIT Scientists Pave the Way for Wireless Battery Charging", by William M. Bulkeley, The Wall Street Journal, (See http://online.wsj.com/article/SB118123955549228045.html?mod=googlenews_wsj) (Jun. 8, 2007).
U.S. Appl. No. 60/908,383, filed Mar. 27, 2007.
"Intel Moves to Free Gadgets of Their Recharging Cords", by John Markoff, The New York Times—nytimes.com, Aug. 21, 2008.
G. Scheible et al., "Novel Wireless Power Supply System for Wireless Communication Devices in Industrial Automation Systems", *IEEE*, (2002).
J. Schutz et al., "Load Adaptive Medium Frequency Resonant Power Supply", *IEEE*, (2002).
Marin Soljacic et al., "Photonic-crystal slow-light enhancement of nonlinear phase sensitivity", *J. Opt. Soc. Am B*, vol. 19, No. 9, pp. 2052-2059 (Sep. 2002).
Amnon Yariv et al., "Coupled-resonator optical waveguide: a proposal and analysis", *Optics Letters*, vol. 24, No. 11, pp. 711-713 (Jun. 1, 1999).
International Search Report for International Application No. PCT/US09/58499 dated Dec. 10, 2009.
PCT International Search Report and Written Opinion for PCT/US09/59244, Dec. 7, 2009, 12 pages.
Non-Final Office Action for U.S. Appl. No. 12/648,604 dated Dec. 5, 2011.
Non-Final Office Action for U.S. Appl. No. 13/036,177 dated May 15, 2012.
Non-Final Office Action for U.S. Appl. No. 13/078,511 dated May 15, 2012.
Non-Final Office Action for U.S. Appl. No. 12/726,742 dated May 11, 2012.
Non-Final Office Action for U.S. Appl. No. 13/030,395 dated May 17, 2012.
Non-Final Office Action for U.S. Appl. No. 13/040,810 dated May 17, 2012.
Non-Final Office Action with regard to U.S. Appl. No. 12/639,958 dated Aug. 16, 2012 (21 pages).
Non-Final Office Action with regard to U.S. Appl. No. 12/639,963 dated Aug. 31, 2012 (20 pages).
Non-Final Office Action with regard to U.S. Appl. No. 12/949,544 dated Sep. 5, 2012 (41 pages).
Non-Final Office Action with regard to U.S. Appl. No. 12/646,524 dated Oct. 1, 2012 (11 pages).
Non-Final Office Action with regard to U.S. Appl. No. 12/415,667 dated Oct. 5, 2012 (20 pages).
Final Office Action with regard to U.S. Appl. No. 12/639,967 dated Oct. 5, 2012 (21 pages).
Final Office Action with regard to U.S. Appl. No. 12/639,966 dated Oct. 9, 2012 (20 pages).
Non-Final Office Action with regard to U.S. Appl. No. 12/868,852 dated Oct. 10, 2012 (26 pages).
"Automatic Recharging, From a Distance" by Anne Eisenberg, The New York Times, (see www.nytimes.com/2012/03/11/business/built-in-wireless-charging-for-electronic-devices.html?_r=0) (published on Mar. 10, 2012).

(56) References Cited

OTHER PUBLICATIONS

"How Wireless Charging Will Make Life Simpler (and Greener)" by David Ferris, Forbes (See forbes.com/sites/davidferris/2012/07/24/how-wireless-charging-will-make-life-simpler-and-greener/print/) (dated Jul. 24, 2012).
"Wireless charging—the future for electric cars?" by Katia Moskvitch, BBC News Technology (See www.bbc.co.uk/news/technology-14183409) (dated Jul. 21, 2011).
"Next Little Thing 2010 Electricity without wires", CNN Money (See money.cnn.com/galleries/2009/smallbusiness/0911/gallery.next_little_thing_2010.smb/) (dated Nov. 30, 2009).
Non-Final Office Action with regard to U.S. Appl. No. 12/649,635 dated Dec. 21, 2012 (41 pages).
Non-Final Office Action with regard to U.S. Appl. No. 12/649,777 dated Dec. 24, 2012 (43 pages).
Non-Final Office Action with regard to U.S. Appl. No. 12/649,813 dated Dec. 21, 2012 (40 pages).
Non-Final Office Action with regard to U.S. Appl. No. 12/649,852 dated Dec. 21, 2012 (41 pages).
Non-Final Office Action with regard to U.S. Appl. No. 12/649,904 dated Dec. 28, 2012 (43 pages).
European Search Report with regard to Application Serial No. 11184066.6 dated Mar. 20, 2013.
Klaus Finkenzeller, "RFID Handbook ($2^{nd}$ Edition)", The Nikkan Kogyo Shimbun, Ltd., pp. 19, 20, 38, 39, 43, 44, 62, 63, 67, 68, 87, 88, 291, 292 (Published on May 31, 2004).
Translation of Information Statement by Third Party submitted to the Japanese Patent Office for Japanese Application No. 2011-83009, translation received on May 15, 2013.
Submission of Publication to the Japanese Patent Office for Japanese Application No. 2011-256,729, translation received on May 2, 2013.
Submission of Publication to the Japanese Patent Office for Japanese Application No. 2011-509,705, translation received on May 2, 2013.
Final Office Action with regard to U.S. Appl. No. 12/639,958 dated Jun. 6, 2013 (18 pages).
Final Office Action with regard to U.S. Appl. No. 12/639,963 dated Jun. 18, 2013 (16 pages).
Final Office Action with regard to U.S. Appl. No. 12/649,635 dated Jun. 20, 2013 (20 pages).
Final Office Action with regard to U.S. Appl. No. 12/649,777 dated Jun. 26, 2013 (17 pages).
Final Office Action with regard to U.S. Appl. No. 12/649,813 dated Jun. 24, 2013 (17 pages).
Final Office Action with regard to U.S. Appl. No. 12/649,852 dated Jun. 27, 2013 (19 pages).
Final Office Action with regard to U.S. Appl. No. 12/649,904 dated Sep. 26, 2013 (23 pages).
Non-Final Office Action for U.S. Appl. No. 12/639,963 dated Feb. 27, 2014 (19 pages).
Non-Final Office Action for U.S. Appl. No. 12/649,635 dated Feb. 27, 2014 (18 pages).
Non-Final Office Action for U.S. Appl. No. 12/649,777 dated Feb. 26, 2014 (16 pages).
Non-Final Office Action for U.S. Appl. No. 12/649,813 dated Feb. 27, 2014 (16 pages).
Non-Final Office Action for U.S. Appl. No. 12/649,852 dated Feb. 27, 2014 (17 pages).
Non-Final Office Action with regard to U.S. Appl. No. 12/949,580 dated Jun. 17, 2013 (55 pages).
M. Ahmadian et al., "Miniature Transmitter for Implantable Micro Systems", *Proceedings of the 25th Annual International Conference of the IEEE EMBS* Cancun, Mexico, pp. 3028-3031, Sep. 17-21, 2003.
Shanhui Fan et al., "Rate-Equation Analysis of Output Efficiency and Modulation Rate of Photomic-Crystal Light-Emitting Diodes", IEEE Journal of Quantum Electronics, vol. 36, No. 10, pp. 1123-1130 (Oct. 2000).
Jonathan Fildes, "Wireless Energy Promise Powers Up", BBC News, Jun. 7, 2007 (See http://news.bbc.co.uk/2/hi/6725955.stm ).
Klaus Finkenzeller, RFID Handbook—Fundamentals and Applications in Contactless Smart Cards-, Nikkan Kohgyo-sya, Kanno Taihei, first version, pp. 32-37, 253 (Aug. 21, 2001).
S. L. Ho et al., "A Comparative Study Between Novel Witricity and Traditional Inductive Magnetic Coupling in Wireless Charging", IEEE Transactions on Magnetics, vol. 47, No. 5, pp. 1522-1525 (May 2011).
Will Stewart, "The Power to Set you Free", Science, vol. 317, pp. 55-56 (Jul. 6, 2007).
David C. Yates et al., "Optimal Transmission Frequency for Ultralow-Power Short-Range Radio Links", *IEEE Transactions on Circuits and Systems-1*, Regular Papers, vol. 51, No. 7, pp. 1405-1413 (Jul. 2004).
Ziaie, Babak et al., "A Low-Power Miniature Transmitter Using a Low-Loss Silicon Platform for Biotelemetry", *Proceedings—19th International Conference IEEE/EMBS*, pp. 2221-2224; Oct. 30-Nov. 2, 1997 (4 pages).

\* cited by examiner

Comparison of experimental and theoretical values for κ as a function of the separation between the source and device coils.

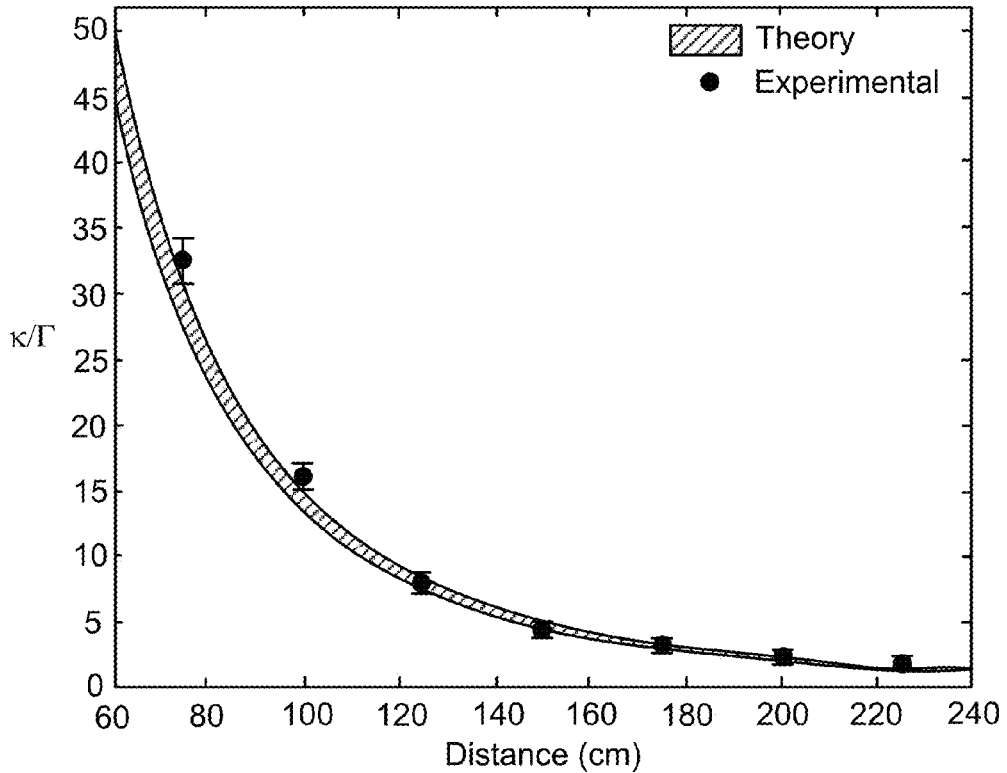

Comparison of experimental and theoretical values for the parameter $\kappa/\Gamma$ as a function of the separation between the two coils. The theory values are obtained by using the theoretically obtained $\kappa$ and the experimentally measured $\Gamma$. The shaded area represents the spread in the theoretical $\kappa/\Gamma$ due to the ~5% uncertainty in Q.

FIG.7

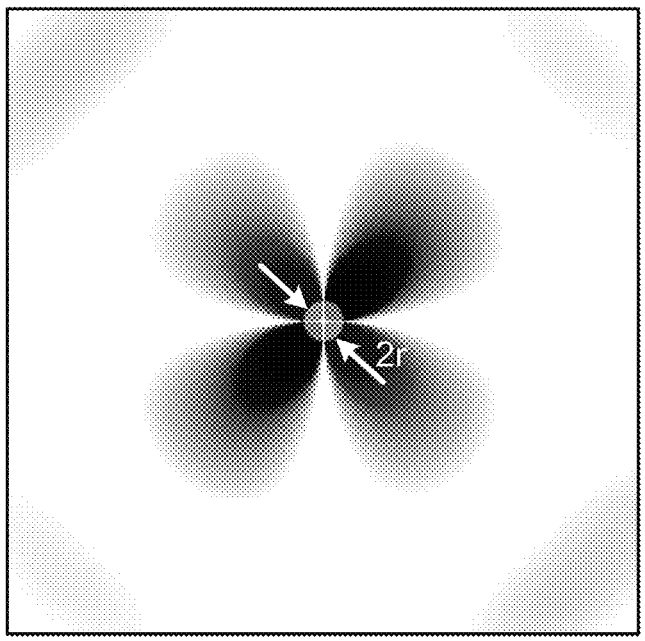
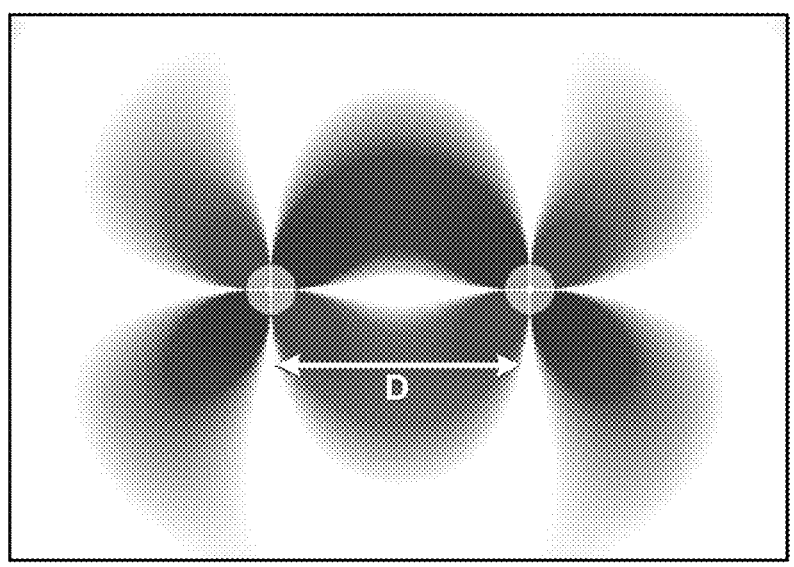
FIG. 15

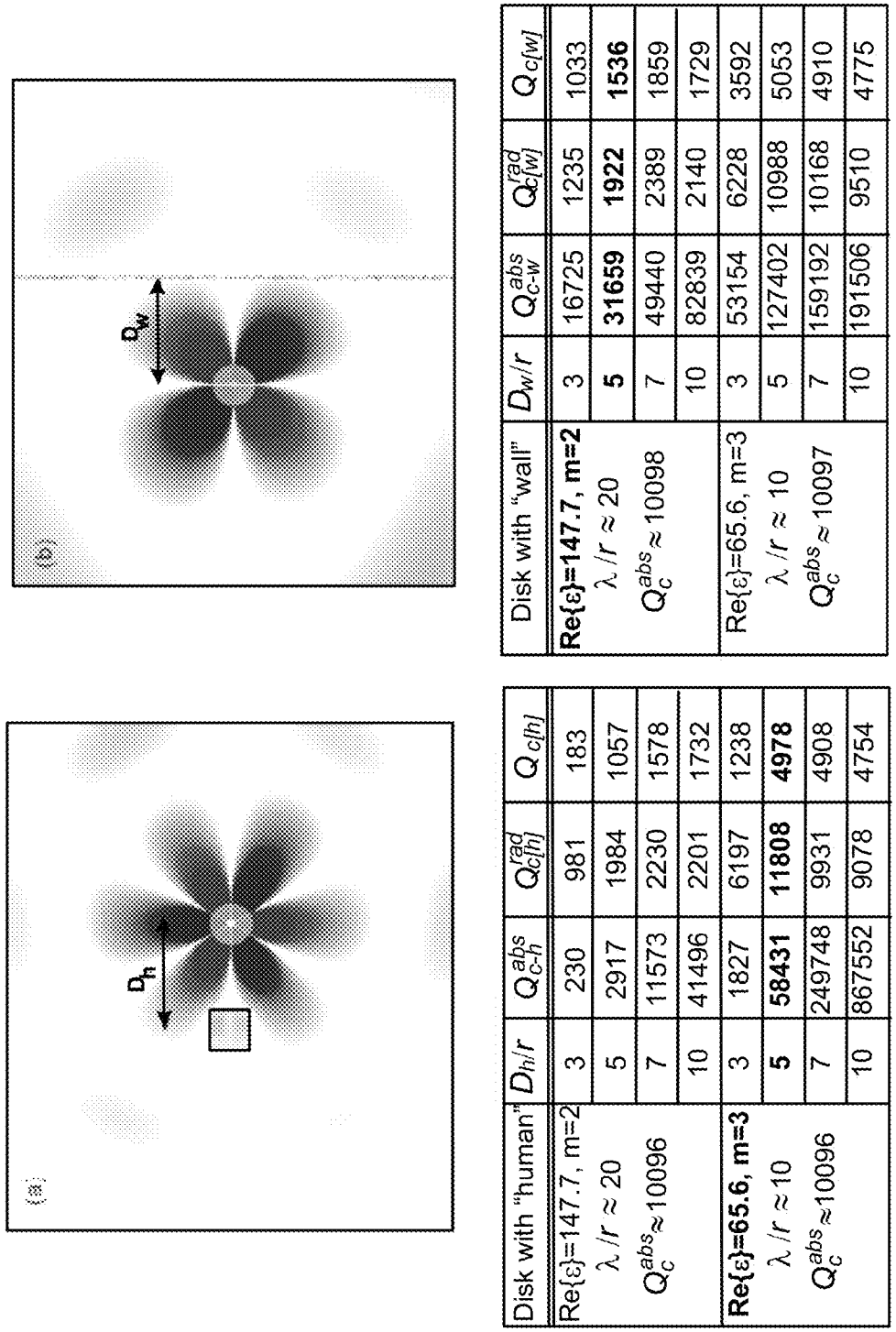

| Two disks with "human" and "wall" | D/r | $Q^{abs}_{c-h}$ | $Q^{abs}_{c-w}$ | $Q^{rad}_{c[hw]}$ | $Q_{c[hw]} = \omega/2\Gamma_{c[hw]}$ | $\omega/2\kappa_{[hw]}$ | $\kappa_{[hw]}/\Gamma_{c[hw]}$ |
|---|---|---|---|---|---|---|---|
| Re{ε}=147.7, m=2 $\lambda/r \approx 20$ $Q^{abs}_c \approx 10100$ | 3 | 3300 | 12774 | 536 | 426 | 48 | 8.8 |
|  | 5 | 5719 | 26333 | 1600 | 1068 | 322 | 3.3 |
|  | 7 | 13248 | 50161 | 3542 | 2097 | 973 | 2.2 |
|  | 10 | 18447 | 68460 | 3624 | 2254 | 1768 | 1.3 |
| Re{ε}=65.6, m=3 $\lambda/r \approx 10$ $Q^{abs}_c \approx 10100$ | 3 | 2088 | 36661 | 6764 | 1328 | 141 | 9.4 |
|  | 5 | 72137 | 90289 | 11945 | 4815 | 2114 | 2.3 |
|  | 7 | 237822 | 129094 | 12261 | 5194 | 8307 | 0.6 |

EFFICIENT NEAR-FIELD WIRELESS ENERGY TRANSFER USING ADIABATIC SYSTEM VARIATIONS

CROSS REFERENCE TO RELATED APPLICATIONS

This application is a continuation, and claims benefit, of U.S. application Ser. No. 12/571,949, filed on Oct. 1, 2009, which claims priority to U.S. Provisional Application Ser. No. 61/101,809, filed Oct. 1, 2008. The contents of the prior applications are incorporated herein by reference in their entirety.

This invention was made with government support under Grant No. DMR0213282 awarded by the National Science Foundation and under Grant No. DE-FG02-99ER45778 awarded by the Department of Energy and under Contract No. W911NF-07-D-0004 awarded by the Army Research Office. The government has certain rights in the invention.

BACKGROUND

The disclosure relates to wireless energy transfer. Wireless energy transfer can for example, be useful in such applications as providing power to autonomous electrical or electronic devices.

Radiative modes of omni-directional antennas (which work very well for information transfer) are not suitable for such energy transfer, because a vast majority of energy is wasted into free space. Directed radiation modes, using lasers or highly-directional antennas, can be efficiently used for energy transfer, even for long distances (transfer distance $L_{TRANS} \gg L_{DEV}$, where $L_{DEV}$ is the characteristic size of the device and/or the source), but may require existence of an uninterruptible line-of-sight and a complicated tracking system in the case of mobile objects. Some transfer schemes rely on induction, but are typically restricted to very close-range ($L_{TRANS} \ll L_{DEV}$) or low power (~mW) energy transfers.

The rapid development of autonomous electronics of recent years (e.g. laptops, cell-phones, house-hold robots, that all typically rely on chemical energy storage) has led to an increased need for wireless energy transfer.

SUMMARY

Disclosed is a method for transferring energy wirelessly. The method includes i) transferring energy wirelessly from a first resonator structure to an intermediate resonator structure, wherein the coupling rate between the first resonator structure and the intermediate resonator structure is $\kappa_{1B}$; ii) transferring energy wirelessly from the intermediate resonator structure to a second resonator structure, wherein the coupling rate between the intermediate resonator structure and the second resonator structure is $\kappa_{B2}$; and iii) during the wireless energy transfers, adjusting at least one of the coupling rates $\kappa_{1B}$ and $\kappa_{B2}$ to reduce energy accumulation in the intermediate resonator structure and improve wireless energy transfer from the first resonator structure to the second resonator structure through the intermediate resonator structure.

Embodiments of the method may include one or more of the following features.

The adjustment of at least one of the coupling rates $\kappa_{1B}$ and $\kappa_{B2}$ can be selected to minimize energy accumulation in the intermediate resonator structure and cause wireless energy transfer from the first resonator structure to the second resonator structure.

The adjustment of at least one of the coupling rates $\kappa_{1B}$ and $\kappa_{B2}$ can be selected to maintain energy distribution in the field of the three-resonator system in an eigenstate having substantially no energy in the intermediate resonator structure. For example, the adjustment of at least one of the coupling rates $\kappa_{1B}$ and $\kappa_{B2}$ can further cause the eigenstate to evolve substantially adiabatically from an initial state with substantially all energy in the resonator structures in the first resonator structure to a final state with substantially all of the energy in the resonator structures in the second resonator structure.

The adjustment of at least one of the coupling rates $\kappa_{1B}$ and $\kappa_{B2}$ can be selected to include adjustments of both coupling rates $\kappa_{1B}$ and $\kappa_{B2}$ during wireless energy transfer.

The resonator structures can each have a quality factor larger than 10.

The first and second resonator structures can each have a quality factor greater than 50.

The first and second resonator structures can each have a quality factor greater than 100.

The resonant energy in each of the resonator structures can include electromagnetic fields. For example, the maximum value of the coupling rate $\kappa_{1B}$ and the maximum value of the coupling rate $\kappa_{B2}$ for inductive coupling between the intermediate resonator structure and each of the first and second resonator structures can each be larger than twice the loss rate $\Gamma$ for each of the first and second resonators. Moreover, The maximum value of the coupling rate $\kappa_{1B}$ and the maximum value of the coupling rate $\kappa_{B2}$ for inductive coupling between the intermediate resonator structure and each of the first and second resonator structures can each be larger than four (4) times the loss rate $\Gamma$ for each of the first and second resonators.

Each resonator structure can have a resonant frequency between 50 KHz and 500 MHz.

The maximum value of the coupling rate $\kappa_{1B}$ and the maximum value of the coupling rate $\kappa_{B2}$ can each be at least five (5) times greater than the coupling rate between the first resonator structure and the second resonator structure.

The intermediate resonator structure can have a rate of radiative energy loss that is at least twenty (20) times greater than that for either the first resonator structure or the second resonator structure.

The first and second resonator structures can be substantially identical.

The adjustment of at least one of the coupling rates $\kappa_{1B}$ and $\kappa_{B2}$ can be selected to cause peak energy accumulation in the intermediate resonator structure to be less than five percent (5%) of the peak total energy in the three resonator structures.

The adjustment of at least one of the coupling rates $\kappa_{1B}$ and $\kappa_{B2}$ can be selected to cause peak energy accumulation in the intermediate resonator structure during the wireless energy transfers to be less than ten percent (10%) of the peak total energy in the three resonator structures.

Adjusting at least one of the coupling rates $\kappa_{1B}$ and $\kappa_{B2}$ can include adjusting a relative position and/or orientation between one or more pairs of the resonator structures. Moreover, adjusting at least one of the coupling rates $\kappa_{1B}$ and $\kappa_{B2}$ can include adjusting a resonator property of one or more of the resonator structures, such as mutual inductance.

The resonator structures can include a capacitively loaded loop or coil of at least one of a conducting wire, a conducting Litz wire, and a conducting ribbon.

The resonator structures can include an inductively loaded rod of at least one of a conducting wire, a conducting Litz wire, and a conducting ribbon.

The wireless energy transfers are non-radiative energy transfers mediated by a coupling of a resonant field evanescent tail of the first resonator structure and a resonant field evanescent tail of the intermediate resonator structure and a coupling of the resonant field evanescent tail of the intermediate resonator structure and a resonant field evanescent tail of the second resonator structure.

The adjustment of the at least one of the coupling rates can define a first mode of operation, wherein the reduction in the energy accumulation in the intermediate resonator structure is relative to energy accumulation in the intermediate resonator structure for a second mode of operation of wireless energy transfer among the three resonator structures having a coupling rate $\kappa'_{1B}$ for wireless energy transfer from the first resonator structure to the intermediate resonator structure and a coupling rate $\kappa'_{B2}$ for wireless energy transfer from the intermediate resonator structure to the second resonator structure with $\kappa'_{1B}$ and $\kappa'_{B2}$ each being substantially constant during the second mode of wireless energy transfer, and wherein the adjustment of the coupling rates $\kappa_{1B}$ and $\kappa_{2B}$ in the first mode of operation can be selected to $\kappa_{1B}, \kappa_{B2} < \sqrt{(\kappa'_{1B}{}^2 + \kappa'_{B2}{}^2)/2}$. Moreover, the first mode of operation can have a greater efficiency of energy transferred from the first resonator to the second resonator compared to that for the second mode of operation. Further, the first and second resonator structures can be substantially identical and each one can have a loss rate $\Gamma_A$, the intermediate resonator structure can have a loss rate $\Gamma_B$, and wherein $\Gamma_B/\Gamma_A$ can be greater than 50.

Also, a ratio of energy lost to radiation and total energy wirelessly transferred between the first and second resonator structures in the first mode of operation is less than that for the second mode of operation. Moreover, the first and second resonator structures can be substantially identical and each one can have a loss rate $\Gamma_A$ and a loss rate only due to radiation $\Gamma_{A,rad}$, the intermediate resonator structure can have a loss rate $\Gamma_B$ and a loss rate only due to radiation $\Gamma_{B,rad}$ and wherein $\Gamma_{B,rad}/\Gamma_B > \Gamma_{A,rad}/\Gamma_A$.

The first mode of operation the intermediate resonator structure interacts less with extraneous objects than it does in the second mode of operation.

During the wireless energy transfer from the first resonator structure to the second resonator structure at least one of the coupling rates can be adjusted so that $\kappa_{1B} \ll \kappa_{B2}$ at a start of the energy transfer and $\kappa_{1B} \gg \kappa_{B2}$ by a time a substantial portion of the energy has been transferred from the first resonator structure to the second resonator structure.

The coupling rate $\kappa_{B2}$ can be maintained at a fixed value and the coupling rate $\kappa_{1B}$ is increased during the wireless energy transfer from the first resonator structure to second resonator structure.

The coupling rate $\kappa_{1B}$ can be maintained at a fixed value and the coupling rate $\kappa_{B2}$ is decreased during the wireless energy transfer from the first resonator structure to second resonator structure.

During the wireless energy transfer from the first resonator structure to second resonator structure, the coupling rate $\kappa_{1B}$ can be increased and the coupling rate $\kappa_{B2}$ is decreased.

The method may further include features corresponding to those listed for one or more of the apparatuses and methods described below.

In another aspect, disclosed is an apparatus including: first, intermediate, and second resonator structures, wherein a coupling rate between the first resonator structure and the intermediate resonator structure is $\kappa_{1B}$ and a coupling rate between the intermediate resonator structure and the second resonator structure is $\kappa_{B2}$; and means for adjusting at least one of the coupling rates $\kappa_{1B}$ and $\kappa_{B2}$ during wireless energy transfers among the resonator structures to reduce energy accumulation in the intermediate resonator structure and improve wireless energy transfer from the first resonator structure to the second resonator structure through the intermediate resonator structure.

Embodiments for the apparatus can include one or more of the following features.

The means for adjusting can include a rotation stage for adjusting the relative orientation of the intermediate resonator structure with respect to the first and second resonator structures.

The means for adjusting can include a translation stage for moving the first and/or second resonator structures relative to the intermediate resonator structure.

The means for adjusting can include a mechanical, electro-mechanical, or electrical staging system for dynamically adjusting the effective size of one or more of the resonator structures.

The apparatus may further include features corresponding to those listed for the method described above, and one or more of the apparatuses and methods described below.

In another aspect, a method for transferring energy wirelessly includes i): transferring energy wirelessly from a first resonator structure to a intermediate resonator structure, wherein the coupling rate between the first resonator structure and the intermediate resonator structure is $\kappa_{1B}$; ii) transferring energy wirelessly from the intermediate resonator structure to a second resonator, wherein the coupling rate between the intermediate resonator structure and the second resonator structure is $\kappa_{B2}$; and iii) during the wireless energy transfers, adjusting at least one of the coupling rates $\kappa_{1B}$ and $\kappa_{B2}$ to cause an energy distribution in the field of the three-resonator system to have substantially no energy in the intermediate resonator structure while wirelessly transferring energy from the first resonator structure to the second resonator structure through the intermediate resonator structure.

Embodiments for the method above can include one or more of the following features.

Having substantially no energy in the intermediate resonator structure can mean that peak energy accumulation in the intermediate resonator structure is less than ten percent (10%) of the peak total energy in the three resonator structures throughout the wireless energy transfer.

Having substantially no energy in the intermediate resonator structure can mean that peak energy accumulation in the intermediate resonator structure is less than five percent (5%) of the peak total energy in the three resonator structures throughout the wireless energy transfer.

The adjustment of at least one of the coupling rates $\kappa_{1B}$ and $\kappa_{B2}$ can be selected to maintain the energy distribution in the field of the three-resonator system in an eigenstate having the substantially no energy in the intermediate resonator structure.

The adjustment of at least one of the coupling rates $\kappa_{1B}$ and $\kappa_{B2}$ can be selected to further cause the eigenstate to evolve substantially adiabatically from an initial state with substantially all energy in the resonator structures in the first resonator structure to a final state with substantially all of the energy in the resonator structures in the second resonator structure.

The adjustment of at least one of the coupling rates $\kappa_{1B}$ and $\kappa_{B2}$ can include adjustments of both coupling rates $\kappa_{1B}$ and $\kappa_{B2}$ during wireless energy transfers.

The resonant energy in each of the resonator structures comprises electromagnetic fields. For example, the maximum value of the coupling rate $\kappa_{1B}$ and the maximum value of the coupling rate $\kappa_{B2}$ for inductive coupling between the intermediate resonator structure and each of the first and second resonator structures can each be larger than twice the loss rate $\Gamma$ for each of the first and second resonators. Moreover, the maximum value of the coupling rate $\kappa_{1B}$ and the maximum value of the coupling rate $\kappa_{B2}$ for inductive coupling between the intermediate resonator structure and each of the first and second resonator structures can each be larger than four (4) times the loss rate $\Gamma$ for each of the first and second resonators.

The resonator structure can have a resonant frequency between 50 KHz and 500 MHz.

The maximum value of the coupling rate $\kappa_{1B}$ and the maximum value of the coupling rate $\kappa_{B2}$ can each be at least five (5) times greater than the coupling rate between the first resonator structure and the second resonator structure.

The intermediate resonator structure can have a rate of radiative energy loss that is at least twenty (20) times greater than that for either the first resonator structure or the second resonator structure.

The first and second resonator structures can be substantially identical.

Adjusting at least one of the coupling rates $\kappa_{1B}$ and $\kappa_{B2}$ can include adjusting a relative position and/or orientation between one or more pairs of the resonator structures.

Adjusting at least one of the coupling rates $\kappa_{1B}$ and $\kappa_{B2}$ can include adjusting a resonator property of one or more of the resonator structures, such as mutual inductance.

The resonator structures can include a capacitively loaded loop or coil of at least one of a conducting wire, a conducting Litz wire, and a conducting ribbon.

The resonator structures can include an inductively loaded rod of at least one of a conducting wire, a conducting Litz wire, and a conducting ribbon.

The wireless energy transfers can be non-radiative energy transfers mediated by a coupling of a resonant field evanescent tail of the first resonator structure and a resonant field evanescent tail of the intermediate resonator structure and a coupling of the resonant field evanescent tail of the intermediate resonator structure and a resonant field evanescent tail of the second resonator structure.

The first and second resonator structures can each have a quality factor greater than 50.

The first and second resonator structures can each have a quality factor greater than 100.

The adjustment of at least one of the coupling rates $\kappa_{1B}$ and $\kappa_{B2}$ can be selected to cause the energy distribution in the field of the three-resonator system to have substantially no energy in the intermediate resonator structure improves wireless energy transfer between the first and second resonator structures.

The adjustment of the at least one of the coupling rates can be selected to define a first mode of operation, wherein energy accumulation in the intermediate resonator structure during the wireless energy transfer from the first resonator structure to second resonator structure is smaller than that for a second mode of operation of wireless energy transfer among the three resonator structures having a coupling rate $\kappa'_{1B}$ for wireless energy transfer from the first resonator structure to the intermediate resonator structure and a coupling rate ic $\kappa'_{B2}$ for wireless energy transfer from the intermediate resonator structure to the second resonator structure with $\kappa'_{1B}$ and $\kappa'_{B2}$ each being substantially constant during the second mode of wireless energy transfer, and wherein the adjustment of the coupling rates $\kappa_{1B}$ and $\kappa_{B2}$ in the first mode of operation can be selected to satisfy $\kappa_{1B}, \kappa_{B2} < \sqrt{(\kappa'_{1B}{}^2 + \kappa'_{B2}{}^2)/2}$.

The first mode of operation can have a greater efficiency of energy transferred from the first resonator to the second resonator compared to that for the second mode of operation.

The first and second resonator structures can be substantially identical and each one can have a loss rate $\Gamma_A$, the intermediate resonator structure can have a loss rate $\Gamma_B$, and wherein $\Gamma_B/\Gamma_A$ can be greater than 50.

A ratio of energy lost to radiation and total energy wirelessly transferred between the first and second resonator structures in the first mode of operation can be less than that for the second mode of operation.

The first and second resonator structures can be substantially identical and each one can have a loss rate $\Gamma_A$ and a loss rate only due to radiation $\Gamma_{A,rad}$, the intermediate resonator structure can have a loss rate $\Gamma_B$ and a loss rate only due to radiation $\Gamma_{B,rad}$ and wherein $\Gamma_{B,rad}/\Gamma_B > \Gamma_{A,rad}/\Gamma_A$.

The first mode of operation the intermediate resonator structure interacts less with extraneous objects than it does in the second mode of operation.

During the wireless energy transfer from the first resonator structure to the second resonator structure at least one of the coupling rates can be adjusted so that $\kappa_{1B} \ll \kappa_{B2}$ at a start of the energy transfer and $\kappa_{1B} \gg \kappa_{B2}$ by a time a substantial portion of the energy has been transferred from the first resonator structure to the second resonator structure.

The coupling rate $\kappa_{B2}$ can be maintained at a fixed value and the coupling rate $\kappa_{1B}$ can be increased during the wireless energy transfer from the first resonator structure to second resonator structure.

The coupling rate $\kappa_{1B}$ can be maintained at a fixed value and the coupling rate $\kappa_{B2}$ can be decreased during the wireless energy transfer from the first resonator structure to second resonator structure.

During the wireless energy transfer from the first resonator structure to second resonator structure, the coupling rate $\kappa_{1B}$ can be increased and the coupling rate $\kappa_{B2}$ can be decreased.

The method may further include features corresponding to those listed for the apparatus and method described above, and one or more of the apparatuses and methods described below.

In another aspect, disclosed is an apparatus including: first, intermediate, and second resonator structures, wherein a coupling rate between the first resonator structure and the intermediate resonator structure is $\kappa_{1B}$ and a coupling rate between the intermediate resonator structure and the second resonator structure is $\kappa_{B2}$; and means for adjusting at least one of the coupling rates $\kappa_{1B}$ and $\kappa_{B2}$ during wireless energy transfers among the resonator structures to cause an energy distribution in the field of the three-resonator system to have substantially no energy in the intermediate resonator structure while wirelessly transferring energy from the first resonator structure to the second resonator structure through the intermediate resonator structure.

Embodiments for the apparatus can include one or more of the following features.

Having substantially no energy in the intermediate resonator structure can mean that peak energy accumulation in the intermediate resonator structure is less than ten percent (10%) of the peak total energy in the three resonator structures throughout the wireless energy transfers.

Having substantially no energy in the intermediate resonator structure can mean that peak energy accumulation in the intermediate resonator structure is less than five percent (5%) of the peak total energy in the three resonator structures throughout the wireless energy transfers.

The means for adjusting can be configured to maintain the energy distribution in the field of the three-resonator system in an eigenstate having the substantially no energy in the intermediate resonator structure.

The means for adjusting can include a rotation stage for adjusting the relative orientation of the intermediate resonator structure with respect to the first and second resonator structures.

The means for adjusting can include a translation stage for moving the first and/or second resonator structures relative to the intermediate resonator structure.

The means for adjusting can include a mechanical, electromechanical, or electrical staging system for dynamically adjusting the effective size of one or more of the resonator structures.

The resonator structures can include a capacitively loaded loop or coil of at least one of a conducting wire, a conducting Litz wire, and a conducting ribbon.

The resonator structures can include an inductively loaded rod of at least one of a conducting wire, a conducting Litz wire, and a conducting ribbon.

A source can be coupled to the first resonator structure and a load can be coupled to the second resonator structure.

The apparatus may further include features corresponding to those listed for the apparatus and methods described above, and the apparatus and method described below.

In another aspect, disclosed is a method for transferring energy wirelessly that includes: i) transferring energy wirelessly from a first resonator structure to a intermediate resonator structure, wherein the coupling rate between the first resonator structure and the intermediate resonator structure is $\kappa_{1B}$; ii) transferring energy wirelessly from the intermediate resonator structure to a second resonator, wherein the coupling rate between the intermediate resonator structure and the second resonator structure with a coupling rate is $\kappa_{B2}$; and iii) during the wireless energy transfers, adjusting at least one of the coupling rates $\kappa_{1B}$ and $\kappa_{B2}$ to define a first mode of operation in which energy accumulation in the intermediate resonator structure is reduced relative to that for a second mode of operation of wireless energy transfer among the three resonator structures having a coupling rate $\kappa'_{1B}$ for wireless energy transfer from the first resonator structure to the intermediate resonator structure and a coupling rate $\kappa'_{B2}$ for wireless energy transfer from the intermediate resonator structure to the second resonator structure with $\kappa'_{1B}$ and $\kappa'_{B2}$ each being substantially constant during the second mode of wireless energy transfer, and wherein the adjustment of the coupling rates $\kappa_{1B}$ and $\kappa_{B2}$ in the first mode of operation can be selected to satisfy $\kappa_{1B},\kappa_{B2}<\sqrt{(\kappa'_{1B}{}^2+\kappa'_{B2}{}^2)/2}$.

The method may further include features corresponding to those listed for the apparatuses and methods described above.

In another aspect, disclosed is an apparatus that includes: first, intermediate, and second resonator structures, wherein a coupling rate between the first resonator structure and the intermediate resonator structure is $\kappa_{1B}$ and a coupling rate between the intermediate resonator structure and the second resonator structure is $\kappa_{B2}$; and means for adjusting at least one of the coupling rates $\kappa_{1B}$ and $\kappa_{B2}$ during wireless energy transfers among the resonator structures to define a first mode of operation in which energy accumulation in the intermediate resonator structure is reduced relative to that for a second mode of operation for wireless energy transfer among the three resonator structures having a coupling rate $\kappa'_{1B}$ for wireless energy transfer from the first resonator structure to the intermediate resonator structure and a coupling rate $\kappa'_{B2}$ for wireless energy transfer from the intermediate resonator structure to the second resonator structure with $\kappa'_{1B}$ and $\kappa'_{B2}$ each being substantially constant during the second mode of wireless energy transfer, and wherein the adjustment of the coupling rates $\kappa_{12}$ and $\kappa_{B2}$ in the first mode of operation can be selected to satisfy $\kappa_{1B},\kappa_{B2}<\sqrt{(\kappa'_{1B}{}^2+\kappa'_{B2}{}^2)/2}$.

The apparatus may further include features corresponding to those listed for the apparatuses and methods described above.

Unless otherwise defined, all technical and scientific terms used herein have the same meaning as commonly understood by one of ordinary skill in the art. Although methods and materials similar or equivalent to those described herein can be used in the practice or testing of the present disclosure, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

The details of one or more embodiments are set forth in the accompanying drawings and the description below, including the documents appended hereto. Other features and advantages will be apparent from this disclosure and from the claims.

BRIEF DESCRIPTION OF THE DRAWINGS

FIG. 7 shows a comparison between experimental and theoretical results for the strong-coupling factor of the system shown schematically in FIG. 5.

FIG. 15 shows (a) an example of a resonant dielectric disk, and illustrates the surrounding field and (b) a wireless energy transfer scheme featuring two resonant dielectric disks, and illustrates the surrounding field.

FIGS. 24(a)-(c) illustrate a wireless energy transfer scheme using two dielectric disks in the presence of various extraneous objects.

DETAILED DESCRIPTION

Figure 1:
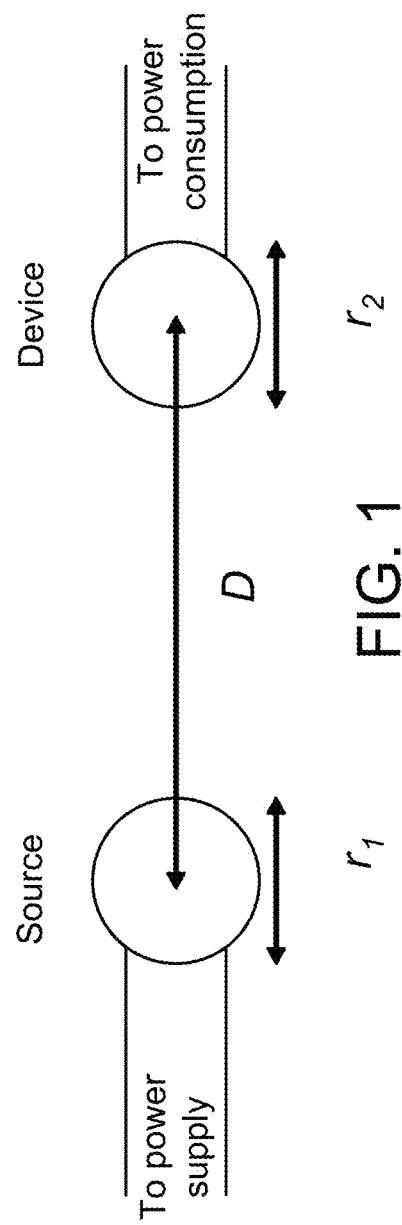
FIG. 1 shows a schematic of an example wireless energy transfer scheme.

Efficient wireless energy-transfer between two similar-frequency resonant objects can be achieved at mid-range distances, provided these resonant objects are designed to operate in the 'strong-coupling' regime. 'Strong coupling' can be realized for a wide variety of resonant objects, including electromagnetic resonant objects such as inductively-loaded conducting rods and dielectric disks. Recently, we have demonstrated wireless energy transfer between strongly coupled electromagnetic self-resonant conducting coils and capacitively-loaded conducting coils, bearing high-Q electromagnetic resonant modes. See, for example, the following commonly owned U.S. patent applications, all of which are incorporated herein by reference: U.S. application Ser. No. 11/481,077, filed on Jul. 5, 2006, and published as U.S. Patent Publication No. US 2007-0222542 A1; U.S. application Ser. No. 12/055,963, filed on Mar. 26, 2008, and published as U.S. Patent Publication No. US 2008-0278264 A1; and U.S. patent application Ser. No. 12/466,065, filed on May 14, 2009, and published as U.S. Patent Publication No. 20090284083. In general, the energy-transfer efficiency between similar-frequency, strongly coupled resonant objects decreases as the distance between the objects is increased.

In this work, we explore a further scheme of efficient energy transfer between resonant objects that extends the range over which energy may be efficiently transferred. Instead of transferring energy directly between two resonant objects, as has been described in certain embodiments of the cross-referenced patents, in certain embodiments, an intermediate resonant object, with a resonant frequency equal or nearly-equal to that of the two energy-exchanging resonant objects is used to mediate the transfer. The intermediate resonant object may be chosen so that it couples more strongly to each of the resonant objects involved in the energy transfer than those two resonant objects couple to each other. One way to design such an intermediate resonator is to make it larger than either of the resonant objects involved in the energy transfer. However, increasing the size of the intermediate resonant object may lower its quality factor, or Q, by increasing its radiation losses. Surprisingly enough, this new "indirect" energy transfer scheme may be shown to be very efficient and only weakly-radiative by introducing a meticulously chosen time variation of the resonator coupling rates.

The advantage of this method over the prior commonly owned wireless energy transfer techniques is that, in certain embodiments, it can enable energy to be transferred wirelessly between two objects with a larger efficiency and/or with a smaller radiation loss and/or with fewer interactions with extraneous objects.

Accordingly, in certain embodiments, we disclose an efficient wireless energy transfer scheme between two similar resonant objects, strongly coupled to an intermediate resonant object of substantially different properties, but with the same resonance frequency. The transfer mechanism essentially makes use of the adiabatic evolution of an instantaneous (so called 'dark') resonant state of the coupled three-object system. Our analysis is based on temporal coupled mode theory (CMT), and is general. Of particular commercial interest is the application of this technique to strongly-coupled electromagnetic resonators used for mid-range wireless energy transfer applications. We show that in certain parameter regimes of interest, this scheme can be more efficient, and/or less radiative than other wireless energy transfer approaches.

While the technique described herein is primarily directed to tangible resonator structures, the technique shares certain features with a quantum interference phenomenon known in the atomic physics community as Electromagnetically Induced Transparency (EIT). In EIT, three atomic states participate. Two of them, which are non-lossy, are coupled to one that has substantial losses. However, by meticulously controlling the mutual couplings between the states, one can establish a coupled system which is overall non-lossy. This phenomena has been demonstrated using carefully timed optical pulses, referred to as probe laser pulses and Stokes laser pulses, to reduce the opacity of media with the appropriate collection of atomic states. A closely related phenomenon known as Stimulated Raman Adiabatic Passage (STIRAP) may take place in a similar system; namely, the probe and Stokes laser beams may be used to achieve complete coherent population transfer between two molecular states of a medium. Hence, we may refer to the currently proposed scheme as the "EIT-like" energy transfer scheme.

In certain embodiments, we disclose an efficient near-field energy transfer scheme between two similar resonant objects, based on an EIT-like transfer of the energy through a mediating resonant object with the same resonant frequency. In embodiments, this EIT-like energy transfer may be realized using electromagnetic resonators as have been described in the cross-referenced patents, but the scheme is not bound only to wireless energy transfer applications. Rather, this scheme is general and may find applications in various other types of coupling between general resonant objects. In certain embodiments described below, we describe particular examples of electromagnetic resonators, but the nature of the resonators and their coupling mechanisms could be quite different (e.g. acoustic, mechanical, etc.). To the extent that many resonant phenomena can be modeled with nearly identical CMT equations, similar behavior to that described herein would occur.

1. Efficient Energy-Transfer by Two 'Strongly Coupled' Resonances

FIG. 1 shows a schematic that generally describes one example of the invention, in which energy is transferred wirelessly between two resonant objects. Referring to FIG. 1, energy is transferred over a distance D, between a resonant source object having a characteristic size $r_1$ and a resonant device object of characteristic size $r_2$. Both objects are resonant objects. The wireless near-field energy transfer is performed using the field (e.g. the electromagnetic field or acoustic field) of the system of two resonant objects.

The characteristic size of an object can be regarded as being equal to the radius of the smallest sphere which can fit around the entire object. The characteristic thickness of an object can be regarded as being, when placed on a flat surface in any arbitrary configuration, the smallest possible height of the highest point of the object above a flat surface. The characteristic width of an object can be regarded as being the radius of the smallest possible circle that the object can pass through while traveling in a straight line. For example, the characteristic width of a cylindrical object is the radius of the cylinder.

Initially, we present a theoretical framework for understanding near-field wireless energy transfer. Note however that it is to be understood that the scope of the invention is not bound by theory.

Different temporal schemes can be employed, depending on the application, to transfer energy between two resonant objects. Here we will consider two particularly simple but important schemes: a one-time finite-amount energy-transfer scheme and a continuous finite-rate energy-transfer (power) scheme.

1.1 Finite-Amount Energy-Transfer Efficiency

Let the source and device objects be 1, 2 respectively and their resonance modes, which we will use for the energy exchange, have angular frequencies $\omega_{1,2}$, frequency-widths due to intrinsic (absorption, radiation etc.) losses $\Gamma_{1,2}$ and (generally) vector fields $F_{1,2}(r)$, normalized to unity energy.

Once the two resonant objects are brought in proximity, they can interact and an appropriate analytical framework for modeling this resonant interaction is that of the well-known coupled-mode theory (CMT). This model works well, when the resonances are well defined by having large quality factors and their resonant frequencies are relatively close to each other. In this picture, the field of the system of the two resonant objects 1, 2 can be approximated by $F(r,t)=a_1(t)F_1(r)+a_2(t)F_2(r)$, where $a_{1,2}(t)$ are the field amplitudes, with $|a_{1,2}(t)|^2$ equal to the energy stored inside the object 1, 2 respectively, due to the normalization. Then, using $e^{-i\omega t}$ time dependence, the field amplitudes can be shown to satisfy, to lowest order:

$$\frac{d}{dt}a_1(t) = -i(\omega_1 - i\Gamma_1)a_1(t) + i\kappa_{11}a_1(t) + i\kappa_{12}a_2(t) \qquad (1)$$

$$\frac{d}{dt}a_2(t) = -i(\omega_2 - i\Gamma_2)a_2(t) + i\kappa_{21}a_1(t) + i\kappa_{22}a_2(t)$$

where $\kappa_{11,22}$ are the shifts in each object's frequency due to the presence of the other, which are a second-order correction and can be absorbed into the resonant frequencies (eigenfrequencies) by setting $\omega_{1,2}\to\omega_{1,2}+\kappa_{11,22}$, and $\kappa_{12,21}$ are the coupling coefficients, which from the reciprocity requirement of the system satisfy $\kappa_{21}=\kappa_{12}\equiv\kappa$.

The resonant modes of the combined system are found by substituting $[a_1(t),a_2(t)]=[A_1,A_2]e^{-i\overline{\omega}t}$. They have complex resonant frequencies $$\overline{\omega}_\pm = \omega_{12} \pm \sqrt{(\Delta\omega_{12})^2 + \kappa^2} \qquad (2a)$$

where $\omega_{12}=[(\omega_1+\omega_2)-i(\Gamma_1+\Gamma_2)]/2$, $\Delta\omega_{12}=[(\omega_1-\omega_2)-i(\Gamma_1-\Gamma_2)]/2$ and whose splitting we denote as $\delta_E\equiv\overline{\omega}_+-\overline{\omega}_-$, and corresponding resonant field amplitudes $$\vec{V}_\pm = \begin{bmatrix} A_1 \\ A_2 \end{bmatrix}_\pm = \begin{bmatrix} \kappa \\ \Delta\omega_{12} \mp \sqrt{(\Delta\omega_{12})^2 + \kappa^2} \end{bmatrix}. \qquad (2b)$$

Note that, at exact resonance $\omega_1=\omega_2=\omega_A$ and for $\Gamma_1=\Gamma_2=\Gamma_A$, we get $\Delta\omega_{12}=0$, $\delta_E=2\kappa$, and then $$\overline{\omega}_\pm = \omega_A \pm \kappa - i\Gamma_A$$

$$\vec{V}_\pm = \begin{bmatrix} A_1 \\ A_2 \end{bmatrix}_\pm = \begin{bmatrix} 1 \\ \mp 1 \end{bmatrix},$$

namely we get the known result that the resonant modes split to a lower frequency even mode and a higher frequency odd mode.

Assume now that at time t=0 the source object 1 has finite energy $|a_1(0)|^2$, while the device object has $|a_2(0)|^2=0$. Since the objects are coupled, energy will be transferred from 1 to 2. With these initial conditions, Eqs. (1) can be solved, predicting the evolution of the device field-amplitude to be $$\frac{a_2(t)}{|a_1(0)|} = \frac{2\kappa}{\delta_E}\sin\left(\frac{\delta_E t}{2}\right)e^{-\frac{\Gamma_1+\Gamma_2}{2}t}e^{-i\frac{\omega_1+\omega_2}{2}t}. \qquad (3)$$

The energy-transfer efficiency will be $\eta_E\equiv|a_2(t)|^2/|a_1(0)|^2$. The ratio of energy converted to loss due to a specific loss mechanism in resonators 1 and 2, with respective loss rates $\Gamma_{1,loss}$ and $\Gamma_{2,loss}$ will be $\eta_{loss,E}=\int_0^t d\tau[2\Gamma_{1,loss}|a_1(\tau)|^2+$ $2\Gamma_{2,loss}|a_2(\tau)|^2]/|a_1(0)|^2$. Note that, at exact resonance $\omega_1=\omega_2=\omega_A$ (an optimal condition), Eq. (3) can be written as $$\frac{a_2(T)}{|a_1(0)|} = \frac{\sin(\sqrt{1-\Delta^2}\,T)}{\sqrt{1-\Delta^2}} \cdot e^{-T/U} e^{-i\omega_A t} \quad (4)$$

where $\equiv \kappa t$, $\Delta^{-1}=2\kappa/(\Gamma_2-\Gamma_1)$ and $U=2\kappa/(\Gamma_1+\Gamma_2)$.

In some examples, the system designer can adjust the duration of the coupling t at will. In some examples, the duration t can be adjusted to maximize the device energy (and thus efficiency $\eta_E$). Then, it can be inferred from Eq. (4) that $\eta_E$ is maximized for $$T_* = \frac{\tan^{-1}(U\sqrt{1-\Delta^2})}{\sqrt{1-\Delta^2}} \quad (5)$$

resulting in an optimal energy-transfer efficiency $$\eta_{E*} \equiv \eta_E(T_*) = \frac{U^2}{1+U^2(1-\Delta^2)} \exp\left(-\frac{2\tan^{-1}(U\sqrt{1-\Delta^2})}{U\sqrt{1-\Delta^2}}\right). \quad (6a)$$

which is a monotonically increasing function of the coupling-to-loss ratio $U=2\kappa/(\Gamma_1+\Gamma_2)$ and tends to unity when $U \gg 1$ $\Rightarrow |\Delta|^{-1} \gg 1$. Therefore, the energy transfer is nearly perfect, when the coupling rate is much faster than all loss rates ($\kappa/\Gamma_{1,2} \gg 1$). In FIG. 2(c) we show the optimal energy-transfer efficiency when $\Gamma_1=\Gamma_2=\Gamma_A \Leftrightarrow \Delta=0$:

$$\eta_E(T_*, \Delta=0) = \frac{U^2}{1+U^2}\exp\left(-\frac{2\tan^{-1}U}{U}\right). \quad (6b)$$

In a real wireless energy-transfer system, the source object can be connected to a power generator (not shown in FIG. 1), and the device object can be connected to a power consuming load (e.g. a resistor, a battery, an actual device, not shown in FIG. 1). The generator will supply the energy to the source object, the energy will be transferred wirelessly and non-radiatively from the source object to the device object, and the load will consume the energy from the device object. To incorporate such supply and consumption mechanisms into this temporal scheme, in some examples, one can imagine that the generator is very briefly but very strongly coupled to the source at time t=0 to almost instantaneously provide the energy, and the load is similarly very briefly but very strongly coupled to the device at the optimal time $t=t_*$ to almost instantaneously drain the energy. For a constant powering mechanism, at time $t=t_*$ also the generator can again be coupled to the source to feed a new amount of energy, and this process can be repeated periodically with a period $t_*$.

1.2 Finite-Rate Energy-Transfer (Power-Transmission) Efficiency

Let the generator be continuously supplying energy to the source object 1 at a rate $\kappa_1$ and the load continuously draining energy from the device object 2 at a rate $\kappa_2$. Field amplitudes $s_{\pm1,2}(t)$ are then defined, so that $|s_{\pm1,2}(t)|^2$ is equal to the power ingoing to (for the + sign) or outgoing from (for the − sign) the object 1, 2 respectively, and the CMT equations are modified to $$\frac{d}{dt}a_1(t) = -i(\omega_1 - i\Gamma_1)a_1(t) + i\kappa_{11}a_1(t) + i\kappa_{12}a_2(t) - \kappa_1 a_1(t) + \sqrt{2\kappa_1}\,s_{+1}(t) \quad (7)$$

$$\frac{d}{dt}a_2(t) = -i(\omega_2 - i\Gamma_2)a_2(t) + i\kappa_{21}a_1(t) + i\kappa_{22}a_2(t) - \kappa_2 a_2(t)$$

$$s_{-1}(t) = \sqrt{2\kappa_1}\,a_1(t) - s_{+1}(t)$$

$$s_{-2}(t) = \sqrt{2\kappa_2}\,a_2(t)$$

where again we can set $\omega_{1,2} \to \omega_{1,2}+\kappa_{11,22}$ and $\kappa_{21}=\kappa_{12}\equiv\kappa$.

Assume now that the excitation is at a fixed frequency $\omega$, namely has the form $s_{+1}(t)=S_{+1}e^{-i\omega t}$. Then the response of the linear system will be at the same frequency, namely $a_{1,2}(t)=A_{1,2}e^{-i\omega t}$ and $s_{-1,2}(t)=S_{-1,2}e^{-i\omega t}$. By substituting these into Eqs. (7), using $\delta_{1,2}\equiv\omega-\omega_{1,2}$, and solving the system, we find the field-amplitude transmitted to the load ($S_{21}$ scattering-matrix element)

$$S_{21} \equiv \frac{S_{-2}}{S_{+1}} \quad (8)$$

$$= \frac{2i\kappa\sqrt{\kappa_1\kappa_2}}{(\Gamma_1+\kappa_1-i\delta_1)(\Gamma_2+\kappa_2-i\delta_2)+\kappa^2}$$

$$= \frac{2iU\sqrt{U_1U_2}}{(1+U_1-iD_1)(1+U_2-iD_2)+U^2}$$

and the field-amplitude reflected to the generator ($S_{11}$ scattering-matrix element)

$$S_{11} \equiv \frac{S_{-1}}{S_{+1}} \quad (9)$$

$$= \frac{(\Gamma_1-\kappa_1-i\delta_1)(\Gamma_2+\kappa_2-i\delta_2)+\kappa^2}{(\Gamma_1+\kappa_1-i\delta_1)(\Gamma_2+\kappa_2-i\delta_2)+\kappa^2}$$

$$= \frac{(1-U_1-iD_1)(1+U_2-iD_2)+U^2}{(1+U_1-iD_1)(1+U_2-iD_2)+U^2}$$

where $D_{1,2}\equiv\delta_{1,2}/\Gamma_{1,2}$, $U_{1,2}\equiv\kappa_{1,2}/\Gamma_{1,2}$ and $U\equiv\kappa/\sqrt{\Gamma_1\Gamma_2}$. Similarly, the scattering-matrix elements $S_{12}$, $S_{22}$ are given by interchanging $1 \leftrightarrow 2$ in Eqs. (8), (9) and, as expected from reciprocity, $S_{21}=S_{12}$. The coefficients for power transmission (efficiency) and reflection and loss are respectively $\eta_P\equiv|S_{21}|^2=|S_{-2}|^2/|S_{+1}|^2$ and $|S_{11}|^2=|S_{-1}|^2/|S_{+1}|^2$ and $1-|S_{21}|^2-|S_{11}|^2=(2\Gamma_1|A_1|^2+2\Gamma_2|A_2|^2)/|S_{+1}|^2$.

In some implementations, the parameters $D_{1,2}$, $U_{1,2}$ can be designed (engineered), since one can adjust the resonant frequencies $\omega_{1,2}$ (compared to the desired operating frequency $\omega$) and the generator/load supply/drain rates $\kappa_{1,2}$. Their choice can target the optimization of some system performance-characteristic of interest.

In some examples, a goal can be to maximize the power transmission (efficiency) $\eta_P\equiv|S_{21}|^2$ of the system, so one would require $$\eta_P'(D_{1,2})=\eta_P'(U_{1,2})=0 \quad (10)$$

Figure 2:
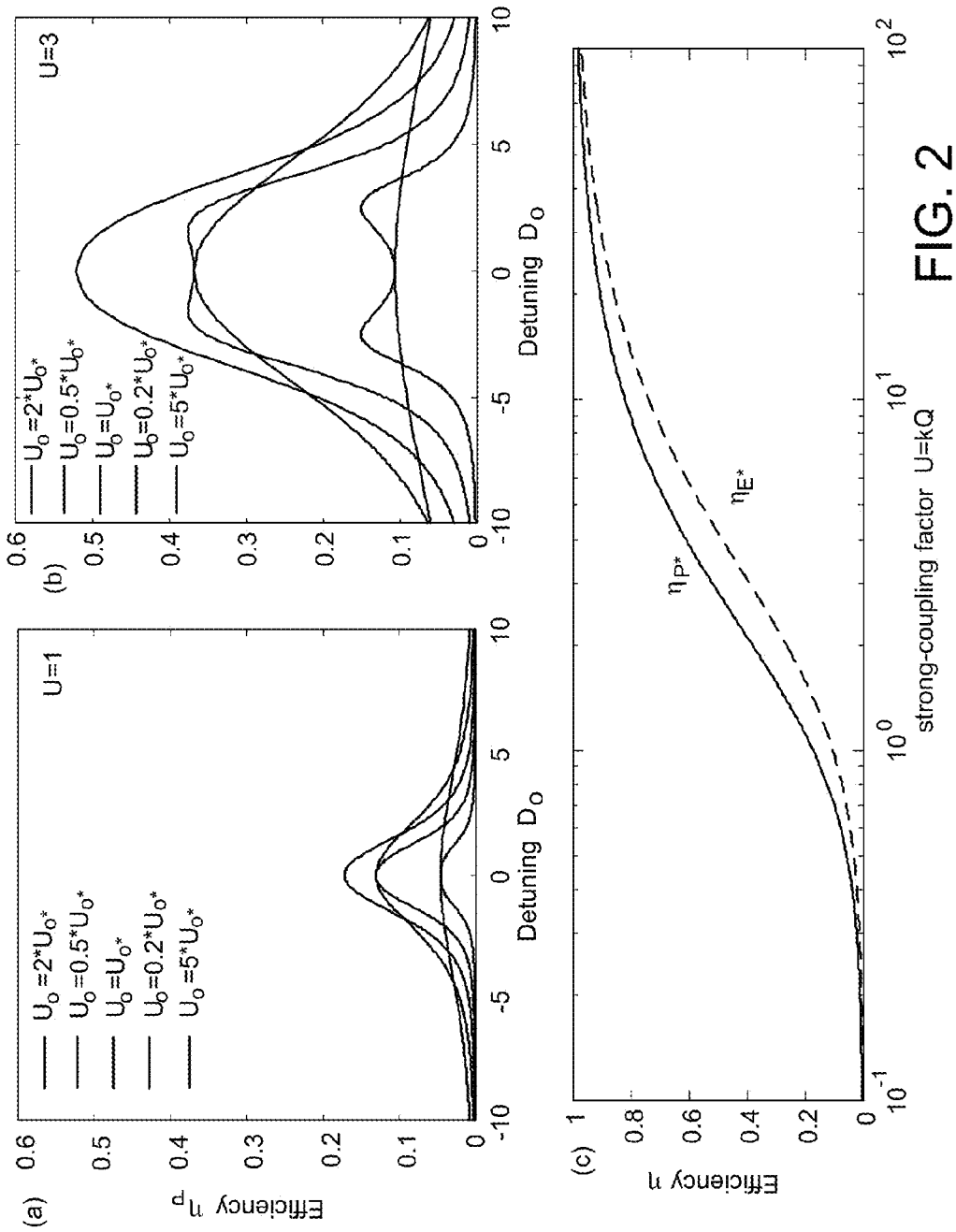
FIGS. 2(a)-(b) show the efficiency of power transmission $\eta_P$ for (a) U=1 and (b) U=3, as a function of the frequency detuning $D_o$ and for different values of the loading rate $U_o$.
FIG. 2(c) shows the optimal (for zero detuning and under conditions of impedance matching) efficiency for energy transfer $\eta_{E^*}$ and power transmission $\eta_{P^*}$, as a function of the coupling-to-loss figure-of-merit U.

Since $S_{21}$ (from Eq. (8)) is symmetric upon interchanging $1 \leftrightarrow 2$, the optimal values for $D_{1,2}$ (determined by Eqs. (10)) will be equal, namely $D_1=D_2\equiv D_o$, and similarly $U_1=U_2\equiv U_o$. Then, $$S_{21} = \frac{2iUU_o}{(1+U_o-iD_o)^2+U^2} \quad (11)$$

and from the condition $\eta_P'(D_o)=0$ we get that, for fixed values of U and $U_o$, the efficiency can be maximized for the following values of the symmetric detuning $$D_o = \begin{cases} \pm\sqrt{U^2 - (1+U_o)^2}, & \text{if } U > 1 + U_o \\ 0, & \text{if } U \leq 1 + U_o \end{cases} \quad (12)$$

which, in the case $U > 1+U_o$, can be rewritten for the two frequencies at which the efficiency peaks as $$\omega_\pm = \frac{\omega_1 \Gamma_2 + \omega_2 \Gamma_1}{\Gamma_1 + \Gamma_2} \pm \frac{2\sqrt{\Gamma_1 \Gamma_2}}{\Gamma_1 + \Gamma_2} \sqrt{\kappa^2 - (\Gamma_1 + \kappa_1)(\Gamma_2 + \kappa_2)}, \quad (13)$$

whose splitting we denote as $\delta_P \equiv \overline{\omega}_+ - \overline{\omega}_-$. Note that, at exact resonance $\omega_1 = \omega_2$, and for $\Gamma_1 = \Gamma_2 \equiv \Gamma_o$ and $\kappa_1 = \kappa_2 \equiv \kappa_o$, we get $\delta_P = 2\sqrt{\kappa^2 - (\Gamma_o + \kappa_o)^2} < \delta_E$, namely the transmission-peak splitting is smaller than the normal-mode splitting. Then, by substituting $D_o$ into $\eta_P$ from Eq. (12), from the condition $\eta_P'(U_o) = 0$ we get that, for fixed value of U, the efficiency can be maximized for $$U_{o^*} = \sqrt{1+U^2} \xrightarrow{Eq.(12)} D_{o^*} = 0 \quad (14)$$

which is known as 'critical coupling' condition, whereas for $U_o < U_{o^*}$ the system is called 'undercoupled' and for $U_o > U_{o^*}$ it is called 'overcoupled'. The dependence of the efficiency on the frequency detuning $D_o$ for different values of $U_o$ (including the 'critical-coupling' condition) are shown in FIG. 2(a, b). The overall optimal power efficiency using Eqs. (14) is $$\eta_{P*} \equiv \eta_P(D_{o^*}, U_{o^*}) = \frac{U_{o^*} - 1}{U_{o^*} + 1} = \left(\frac{U}{1 + \sqrt{1+U^2}}\right)^2, \quad (15)$$

which is again only a function of the coupling-to-loss ratio $U = \kappa/\sqrt{\Gamma_1 \Gamma_2}$ and tends to unity when $U \gg 1$, as depicted in FIG. 2(c).

In some examples, a goal can be to minimize the power reflection at the side of the generator $|S_{11}|^2$ and the load $|S_{22}|^2$, so one would then need $$S_{11,22} = 0 \Rightarrow (1 \mp U_1 - iD_1)(1 \pm U_2 - iD_2) + U^2 = 0, \quad (16)$$

The equations above present 'impedance matching' conditions. Again, the set of these conditions is symmetric upon interchanging $1 \leftrightarrow 2$, so, by substituting $D_1 = D_2 \equiv D_o$ and $U_1 = U_2 \equiv U_o$ into Eqs. (16), we get $$(1 - iD_o)^2 - U_o^2 + U^2 = 0, \quad (17)$$

from which we easily find that the values of $D_o$ and $U_o$ that cancel all reflections are again exactly those in Eqs. (14).

It can be seen that, the two goals and their associated sets of conditions (Eqs. (10) and Eqs. (16)) result in the same optimized values of the intra-source and intra-device parameters $D_{1,2}, U_{1,2}$. Note that for a lossless system this would be an immediate consequence of power conservation (Hermiticity of the scattering matrix), but this is not apparent for a lossy system.

Accordingly, for any temporal energy-transfer scheme, once the parameters specific only to the source or to the device (such as their resonant frequencies and their excitation or loading rates respectively) have been optimally designed, the efficiency monotonically increases with the ratio of the source-device coupling-rate to their loss rates. Using the definition of a resonance quality factor $Q = \omega/2\Gamma$ and defining by analogy the coupling factor $k \equiv 1/Q_\kappa \equiv 2\kappa/\sqrt{\omega_1 \omega_2}$, it is therefore exactly this ratio $$U = \frac{\kappa}{\sqrt{\Gamma_1 \Gamma_2}} = k\sqrt{Q_1 Q_2} \quad (18)$$

that has been set as a figure-of-merit for any system under consideration for wireless energy-transfer, along with the distance over which this ratio can be achieved (clearly, U will be a decreasing function of distance). The operating regime $U > 1$ is sometimes called 'strong-coupling' regime and is a sufficient condition for efficient energy-transfer. In particular, for $U > 1$ we get, from Eq. (15), $\eta_{P*} > 17\%$, large enough for many practical applications. Note that in some applications, $U > 0.1$ may be sufficient. In applications where it is impossible or impractical to run wires to supply power to a device, $U < 0.1$ may be considered sufficient. One skilled in the art will recognize that the sufficient U is application and specification dependent. The figure-of-merit U may be called the strong-coupling factor. We will further show how to design systems with a large strong-coupling factor.

To achieve a large strong-coupling factor U, in some examples, the energy-transfer application preferably uses resonant modes of high quality factors Q, corresponding to low (i.e. slow) intrinsic-loss rates $\Gamma$. This condition can be satisfied by designing resonant modes where all loss mechanisms, typically radiation and absorption, are sufficiently suppressed.

This suggests that the coupling be implemented using, not the lossy radiative far-field, which should rather be suppressed, but the evanescent (non-lossy) stationary near-field. To implement an energy-transfer scheme, usually more appropriate are finite objects, namely ones that are topologically surrounded everywhere by air, into where the near field extends to achieve the coupling. Objects of finite extent do not generally support electromagnetic states that are exponentially decaying in all directions in air away from the objects, since Maxwell's Equations in free space imply that $k^2 = \omega^2/c^2$, where k is the wave vector, $\omega$ the angular frequency, and c the speed of light, because of which one can show that such finite objects cannot support states of infinite Q, rather there always is some amount of radiation. However, very long-lived (so-called "high-Q") states can be found, whose tails display the needed exponential or exponential-like decay away from the resonant object over long enough distances before they turn oscillatory (radiative). The limiting surface, where this change in the field behavior happens, is called the "radiation caustic", and, for the wireless energy-transfer scheme to be based on the near field rather than the far/radiation field, the distance between the coupled objects must be such that one lies within the radiation caustic of the other. One typical way of achieving a high radiation-Q ($Q_{rad}$) is to design subwavelength resonant objects. When the size of an object is much smaller than the wavelength of radiation in free space, its electromagnetic field couples to radiation very weakly. Since the extent of the near-field into the area surrounding a finite-sized resonant object is set typically by the wavelength, in some examples, resonant objects of subwavelength size have significantly longer evanescent field-tails. In other words, the radiation caustic is pushed far away from the object, so the electromagnetic mode enters the radiative regime only with a small amplitude.

Moreover, most realistic materials exhibit some nonzero amount of absorption, which can be frequency dependent, and thus cannot support states of infinite Q, rather there always is some amount of absorption. However, very long-lived ("high-Q") states can be found, where electromagnetic modal energy is only weakly dissipated. Some typical ways of achieving a high absorption-Q ($Q_{abs}$) is to use materials which exhibit very small absorption at the resonant frequency and/or to shape the field to be localized more inside the least lossy materials.

Furthermore, to achieve a large strong-coupling factor U, in some examples, the energy-transfer application may use systems that achieve a high coupling factor k, corresponding to strong (i.e. fast) coupling rate K, over distances larger than the characteristic sizes of the objects.

Since finite-sized subwavelength resonant objects can often be designed to have high Q, as was discussed above and will be seen in examples later on, such objects may typically be chosen for the resonant device-object. In these cases, the electromagnetic field is, in some examples, of a quasi-static nature and the distance, up to which sufficient coupling can be achieved, is dictated by the decay-law of this quasi-static field.

Note that in some examples, the resonant source-object may be immobile and thus less restricted in its allowed geometry and size. It can be therefore chosen to be large enough that the near-field extent is not limited by the wavelength, and can thus have nearly infinite radiation-Q. Some objects of nearly infinite extent, such as dielectric waveguides, can support guided modes, whose evanescent tails are decaying exponentially in the direction away from the object, slowly if tuned close to cutoff, therefore a good coupling can also be achieved over distances quite a few times larger than a characteristic size of the source- and/or device-object.

2 'Strongly-Coupled' Resonances at Mid-Range Distances for Realistic Systems

In the following, examples of systems suitable for energy transfer of the type described above are described. We will demonstrate how to compute the CMT parameters $\omega_{1,2}$, $Q_{1,2}$ and k described above and how to choose or design these parameters for particular examples in order to produce a desirable figure-of-merit $U=\kappa/\sqrt{\Gamma_1\Gamma_2}=k\sqrt{Q_1Q_2}$ at a desired distance D. In some examples, this figure-of-merit is maximized when $\omega_{1,2}$ are tuned close to a particular angular frequency $\omega_U$.

2.1 Self-Resonant Conducting Coils

Figure 3:
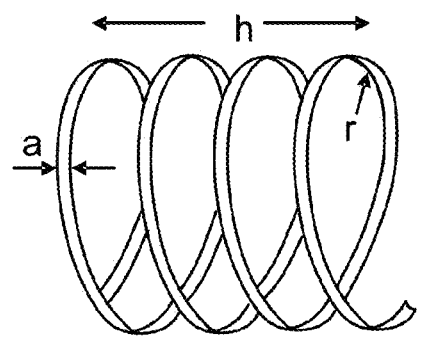
FIG. 3 shows an example of a self-resonant conducting-wire coil.

In some examples, one or more of the resonant objects are self-resonant conducting coils. Referring to FIG. 3, a conducting wire of length, l, and cross-sectional radius, a, is wound into a helical coil of radius, r, and height, h, (namely with $N=\sqrt{l^2-h^2}/2\pi r$ number of turns), surrounded by air. As described below, the wire has distributed inductance and distributed capacitance, and therefore it supports a resonant mode of angular frequency $\omega$. The nature of the resonance lies in the periodic exchange of energy from the electric field within the capacitance of the coil, due to the charge distribution $\rho(x)$ across it, to the magnetic field in free space, due to the current distribution $j(x)$ in the wire. In particular, the charge conservation equation $\nabla \cdot j = i\omega\rho$ implies that: (i) this periodic exchange is accompanied by a $\pi/2$ phase-shift between the current and the charge density profiles, namely the energy W contained in the coil is at certain points in time completely due to the current and at other points in time completely due to the charge, and (ii) if $\rho_l(x)$ and $I(x)$ are respectively the linear charge and current densities in the wire, where x runs along the wire, $$q_o = \frac{1}{2}\int dx |\rho_l(x)|$$

is the maximum amount of positive charge accumulated in one side of the coil (where an equal amount of negative charge always also accumulates in the other side to make the system neutral) and $I_o=\max\{|I(x)|\}$ is the maximum positive value of the linear current distribution, then $I_o=\omega q_o$. Then, one can define an effective total inductance L and an effective total capacitance C of the coil through the amount of energy W inside its resonant mode:

$$W \equiv \frac{1}{2}I_o^2 L \Rightarrow L = \frac{\mu_o}{4\pi I_o^2}\int\int dx dx' \frac{j(x)\cdot j(x')}{|x-x'|}, \quad (19)$$

$$W \equiv \frac{1}{2}q_o^2\frac{1}{C} \Rightarrow \frac{1}{C} = \frac{1}{4\pi\varepsilon_o q_o^2}\int\int dx dx' \frac{\rho(x)\rho(x')}{|x-x'|}, \quad (20)$$

where $\mu_o$ and $\varepsilon_o$ are the magnetic permeability and electric permittivity of free space.

With these definitions, the resonant angular frequency and the effective impedance can be given by the formulas $\omega=1/\sqrt{LC}$ and $Z=\sqrt{L/C}$ respectively.

Losses in this resonant system consist of ohmic (material absorption) loss inside the wire and radiative loss into free space. One can again define a total absorption resistance $R_{abs}$ from the amount of power absorbed inside the wire and a total radiation resistance $R_{rad}$ from the amount of power radiated due to electric- and magnetic-dipole radiation:

$$P_{abs} \equiv \frac{1}{2}I_o^2 R_{abs} \Rightarrow R_{abs} \approx \zeta_c \frac{l}{2\pi a}\cdot\frac{I_{rms}^2}{I_o^2} \quad (21)$$

$$P_{rad} \equiv \frac{1}{2}I_o^2 R_{rad} \Rightarrow R_{rad} \approx \frac{\zeta_o}{6\pi}\left[\left(\frac{\omega|p|}{c}\right)^2 + \left(\frac{\omega\sqrt{|m|}}{c}\right)^4\right], \quad (22)$$

where $c=1/\sqrt{\mu_o\varepsilon_o}$ and $\zeta_o=\sqrt{\mu_o/\varepsilon_o}$ are the light velocity and light impedance in free space, the impedance $\zeta_c$ is $\zeta_c=1/\sigma\delta=\sqrt{\mu_o\omega/2\sigma}$ with $\sigma$ the conductivity of the conductor and $\delta$ the skin depth at the frequency $\omega$, $$I_{rms}^2 = \frac{1}{l}\int dx |I(x)|^2,$$

$$p = \int dx\, r\,\rho_l(x)$$

is the electric-dipole moment of the coil and $$m = \frac{1}{2}\int dx\, r\times j(x)$$

is the magnetic-dipole moment of the coil. For the radiation resistance formula Eq. (22), the assumption of operation in the quasi-static regime ($h,r \ll \lambda=2\pi c/\omega$) has been used, which is the desired regime of a subwavelength resonance. With these definitions, the absorption and radiation quality factors of the resonance may be given by $Q_{abs}=Z/R_{abs}$ and $Q_{rad}=Z/R_{rad}$ respectively.

From Eq. (19)-(22) it follows that to determine the resonance parameters one simply needs to know the current distribution j in the resonant coil. Solving Maxwell's equations to rigorously find the current distribution of the resonant electromagnetic eigenmode of a conducting-wire coil is more involved than, for example, of a standard LC circuit, and we can find no exact solutions in the literature for coils of finite length, making an exact solution difficult. One could in principle write down an elaborate transmission-line-like model, and solve it by brute force. We instead present a model that is (as described below) in good agreement (~5%) with experiment. Observing that the finite extent of the conductor forming each coil imposes the boundary condition that the current has to be zero at the ends of the coil, since no current can leave the wire, we assume that the resonant mode of each coil is well approximated by a sinusoidal current profile along the length of the conducting wire. We shall be interested in the lowest mode, so if we denote by x the coordinate along the conductor, such that it runs from −l/2 to +l/2, then the current amplitude profile would have the form $I(x)=I_o \cos(\pi x/l)$, where we have assumed that the current does not vary significantly along the wire circumference for a particular x, a valid assumption provided $a \ll r$. It immediately follows from the continuity equation for charge that the linear charge density profile should be of the form $\rho_l(x)=\rho_o \sin(\pi x/l)$, and thus $q_o=\int_0^{l/2} dx \rho_o |\sin(\pi x/l)|=\rho_o l/\pi$. Using these sinusoidal profiles we find the so-called "self-inductance" $L_s$ and "self-capacitance" $C_s$ of the coil by computing numerically the integrals Eq. (19) and (20); the associated frequency and effective impedance are $\omega_s$ and $Z_s$ respectively. The "self-resistances" $R_s$ are given analytically by Eq. (21) and (22) using $$I_{rms}^2 = \frac{1}{l}\int_{-l/2}^{l/2} dx |I_o \cos(\pi x/l)|^2 = \frac{1}{2}I_o^2,$$

$$|p| = q_o \sqrt{\left(\frac{2}{\pi}h\right)^2 + \left(\frac{4N\cos(\pi N)}{(4N^2-1)\pi}r\right)^2}$$

and $$|m| = I_o \sqrt{\left(\frac{2}{\pi}N\pi r^2\right)^2 + \left(\frac{\cos(\pi N)(12N^2-1)-\sin(\pi N)\pi N(4N^2-1)}{(16N^4-8N^2+1)\pi}hr\right)^2},$$

and therefore the associated $Q_s$ factors can be calculated.

The results for two examples of resonant coils with sub-wavelength modes of $\lambda_s/r \geq 70$ (i.e. those highly suitable for near-field coupling and well within the quasi-static limit) are presented in Table 1. Numerical results are shown for the wavelength and absorption, radiation and total loss rates, for the two different cases of subwavelength-coil resonant modes. Note that, for conducting material, copper ($\sigma = 5.998 \cdot 10^{-7}$ S/m) was used. It can be seen that expected quality factors at microwave frequencies are $Q_{s,abs} \geq 1000$ and $Q_{s,rad} \geq 5000$.

TABLE 1

| single coil | $\lambda_s/r$ | f (MHz) | $Q_{s,rad}$ | $Q_{s,abs}$ | $Q_s$ |
|---|---|---|---|---|---|
| r = 30 cm, h = 20 cm, a = 1 cm, N = 4 | 74.7 | 13.39 | 4164 | 8170 | 2758 |
| r = 10 cm, h = 3 cm, a = 2 mm, N = 6 | 140 | 21.38 | 43919 | 3968 | 3639 |

Figure 4:
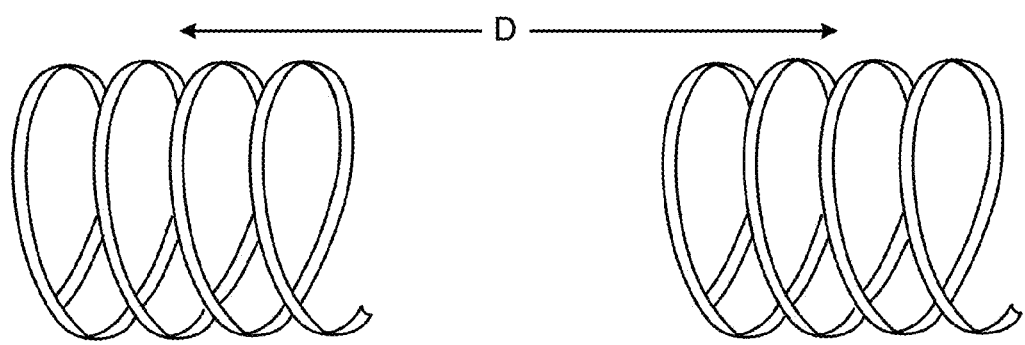
FIG. 4 shows an example of a wireless energy transfer scheme featuring two self-resonant conducting-wire coils.

Referring to FIG. 4, in some examples, energy is transferred between two self-resonant conducting-wire coils. The electric and magnetic fields are used to couple the different resonant conducting-wire coils at a distance D between their centers. Usually, the electric coupling highly dominates over the magnetic coupling in the system under consideration for coils with $h \gg 2r$ and, oppositely, the magnetic coupling highly dominates over the electric coupling for coils with $h \ll 2r$. Defining the charge and current distributions of two coils 1,2 respectively as $\rho_{1,2}(x)$ and $j_{1,2}(x)$, total charges and peak currents respectively as $q_{1,2}$ and $I_{1,2}$, and capacitances and inductances respectively as $C_{1,2}$ and $L_{1,2}$, which are the analogs of $\rho(x)$, $j(x)$, $q_o$, $I_o$, C and L for the single-coil case and are therefore well defined, we can define their mutual capacitance and inductance through the total energy:

$$W \equiv W_1 + W_2 + \frac{1}{2}(q_1^* q_2 + q_2^* q_1)/M_C + \frac{1}{2}(I_1^* I_2 + I_2^* I_1)M_L \Rightarrow 1/M_C = \quad (23)$$

$$\frac{1}{4\pi\varepsilon_o q_1 q_2}\int\int dx dx' \frac{\rho_1(x)\rho_2(x')}{|x-x'|}u,$$

$$M_L = \frac{\mu_o}{4\pi I_1 I_2}\int\int dx dx' \frac{j_1(x) \cdot j_2(x')}{|x-x'|}u,$$

where $$W_1 = \frac{1}{2}q_1^2/C_1 = \frac{1}{2}I_1^2 L_1,$$

$$W_2 = \frac{1}{2}q_2^2/C_2 = \frac{1}{2}I_2^2 L_2$$

and the retardation factor of $u=\exp(i\omega|x-x'|/c)$ inside the integral can been ignored in the quasi-static regime $D \ll 2$ of interest, where each coil is within the near field of the other. With this definition, the coupling factor is given by $k=\sqrt{C_1 C_2}/M_C + M_L/\sqrt{L_1 L_2}$.

Therefore, to calculate the coupling rate between two self-resonant coils, again the current profiles are needed and, by using again the assumed sinusoidal current profiles, we compute numerically from Eq. (23) the mutual capacitance $M_{C,s}$ and inductance $M_{L,s}$ between two self-resonant coils at a distance D between their centers, and thus $k=1/Q_K$ is also determined.

TABLE 2

| pair of coils | D/r | Q | $Q_K = 1/k$ | U |
|---|---|---|---|---|
| r = 30 cm, h = 20 cm, | 3 | 2758 | 38.9 | 70.9 |
| a = 1 cm, N = 4 | 5 | 2758 | 139.4 | 19.8 |
| $\lambda/r \approx 75$ | 7 | 2758 | 333.0 | 8.3 |
| $Q_s^{abs} \approx 8170$, $Q_s^{rad} \approx 4164$ | 10 | 2758 | 818.9 | 3.4 |
| r = 10 cm, h = 3 cm, | 3 | 3639 | 61.4 | 59.3 |
| a = 2 mm, N = 6 | 5 | 3639 | 232.5 | 15.7 |
| $\lambda/r \approx 140$ | 7 | 3639 | 587.5 | 6.2 |
| $Q_s^{abs} \approx 3968$, $Q_s^{rad} \approx 43919$ | 10 | 3639 | 1580 | 2.3 |

Referring to Table 2, relevant parameters are shown for exemplary examples featuring pairs or identical self resonant coils. Numerical results are presented for the average wavelength and loss rates of the two normal modes (individual values not shown), and also the coupling rate and figure-of-merit as a function of the coupling distance D, for the two cases of modes presented in Table 1. It can be seen that for medium distances D/r=10−3 the expected coupling-to-loss ratios are in the range U~2~70.

2.1.1 Experimental Results

Figure 5:
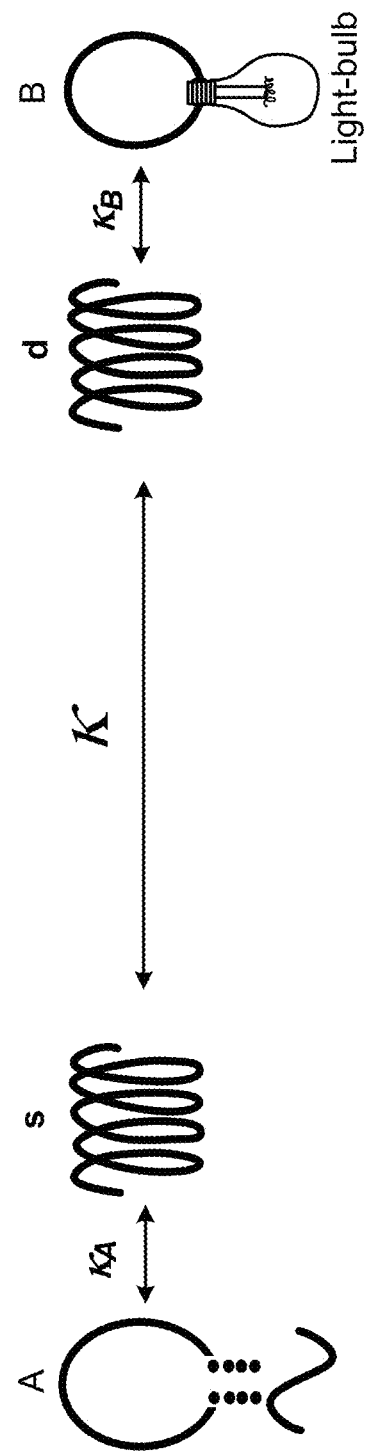
FIG. 5 is a schematic of an experimental system demonstrating wireless energy transfer.

An experimental realization of an example of the above described system for wireless energy transfer consists of two self-resonant coils, one of which (the source coil) is coupled inductively to an oscillating circuit, and the second (the device coil) is coupled inductively to a resistive load, as shown schematically in FIG. 5. Referring to FIG. 5, A is a single copper loop of radius 25 cm that is part of the driving circuit, which outputs a sine wave with frequency 9.9 MHz. s and d are respectively the source and device coils referred to in the text. B is a loop of wire attached to the load ("light-bulb"). The various κ's represent direct couplings between the objects. The angle between coil d and the loop A is adjusted so that their direct coupling is zero, while coils s and d are aligned coaxially. The direct coupling between B and A and between B and s is negligible.

The parameters for the two identical helical coils built for the experimental validation of the power transfer scheme were h=20 cm, a=3 mm, r=30 cm and N=5.25. Both coils are made of copper. Due to imperfections in the construction, the spacing between loops of the helix is not uniform, and we have encapsulated the uncertainty about their uniformity by attributing a 10% (2 cm) uncertainty to h. The expected resonant frequency given these dimensions is $f_0$=10.56±0.3 MHz, which is approximately 5% off from the measured resonance at around 9.90 MHz.

The theoretical Q for the loops is estimated to be ~2500 (assuming perfect copper of resistivity $\rho=1/\sigma=1.7\times10^{-8}$ $\Omega$m) but the measured value is 950±50. We believe the discrepancy is mostly due to the effect of the layer of poorly conducting copper oxide on the surface of the copper wire, to which the current is confined by the short skin depth (~20 μm) at this frequency. We have therefore used the experimentally observed Q (and $\Gamma_1=\Gamma_2=\Gamma=\omega/(2Q)$ derived from it) in all subsequent computations.

Figure 6:
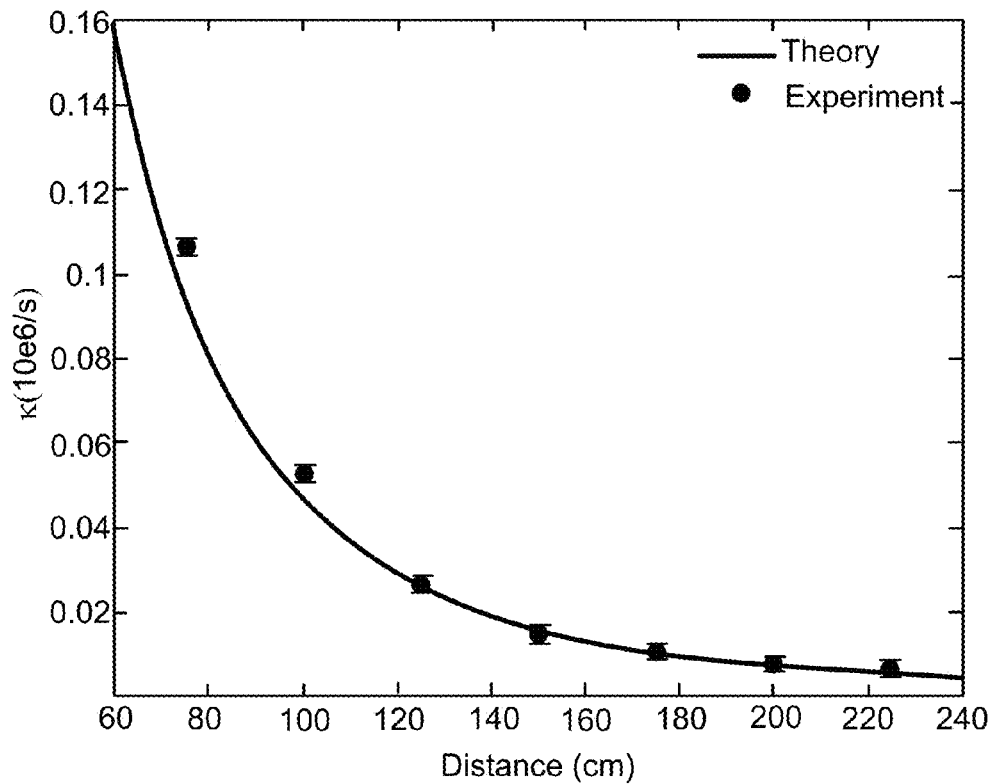
FIG. 6 shows a comparison between experimental and theoretical results for the coupling rate of the system shown schematically in FIG. 5.

The coupling coefficient κ can be found experimentally by placing the two self-resonant coils (fine-tuned, by slightly adjusting h, to the same resonant frequency when isolated) a distance D apart and measuring the splitting in the frequencies of the two resonant modes in the transmission spectrum. According to Eq. (13) derived by coupled-mode theory, the splitting in the transmission spectrum should be $\delta_P=2\sqrt{\kappa^2-\delta^2}$, when $\kappa_{A,B}$ are kept very small by keeping A and B at a relatively large distance. The comparison between experimental and theoretical results as a function of distance when the two the coils are aligned coaxially is shown in FIG. 6.

FIG. 7 shows a comparison of experimental and theoretical values for the strong-coupling factor U=κ/Γ as a function of the separation between the two coils. The theory values are obtained by using the theoretically obtained κ and the experimentally measured Γ. The shaded area represents the spread in the theoretical U due to the ~5% uncertainty in Q. As noted above, the maximum theoretical efficiency depends only on the parameter U, which is plotted as a function of distance in FIG. 7. U is greater than 1 even for D=2.4 m (eight times the radius of the coils), thus the system is in the strongly-coupled regime throughout the entire range of distances probed.

The power-generator circuit was a standard Colpitts oscillator coupled inductively to the source coil by means of a single loop of copper wire 25 cm in radius (see FIG. 5). The load consisted of a previously calibrated light-bulb, and was attached to its own loop of insulated wire, which was in turn placed in proximity of the device coil and inductively coupled to it. Thus, by varying the distance between the light-bulb and the device coil, the parameter $U_B=\kappa_B/\Gamma$ was adjusted so that it matched its optimal value, given theoretically by Eq. (14) as $U_{B*}=\sqrt{1+U^2}$. Because of its inductive nature, the loop connected to the light-bulb added a small reactive component to $\kappa_B$ which was compensated for by slightly retuning the coil. The work extracted was determined by adjusting the power going into the Colpitts oscillator until the light-bulb at the load was at its full nominal brightness.

Figure 8:
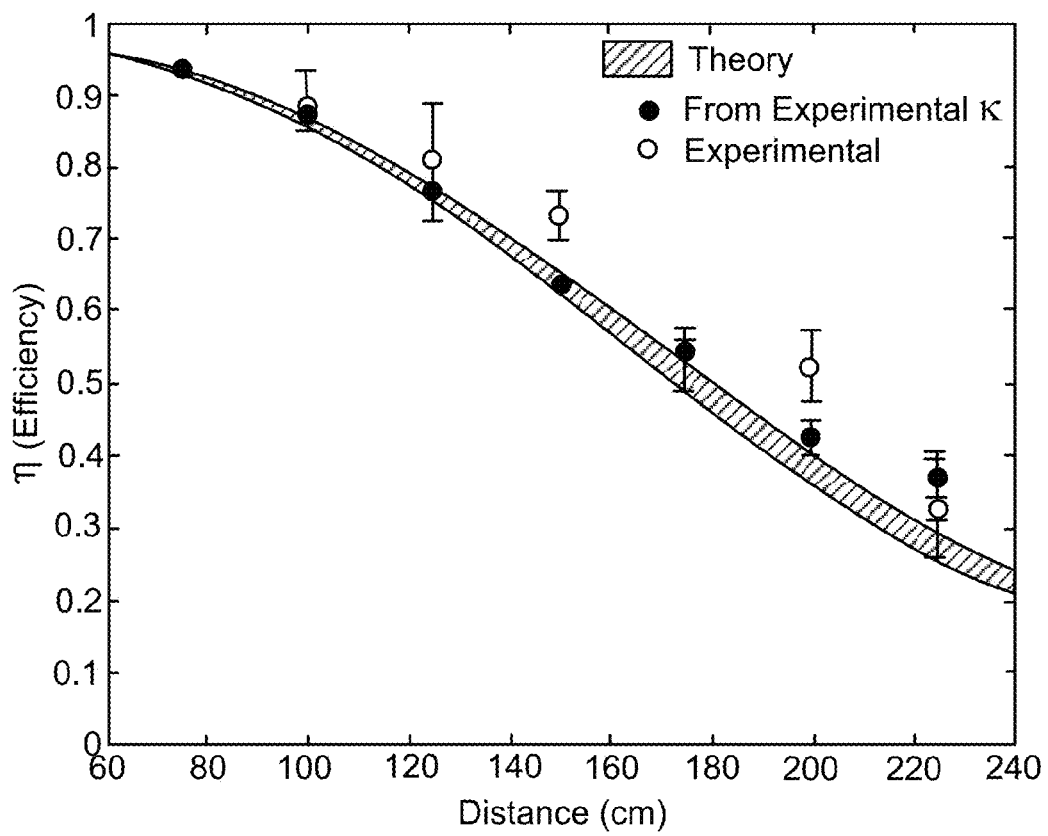
FIG. 8 shows a comparison between experimental and theoretical results for the power-transmission efficiency of the system shown schematically in FIG. 5.

In order to isolate the efficiency of the transfer taking place specifically between the source coil and the load, we measured the current at the mid-point of each of the self-resonant coils with a current-probe (which was not found to lower the Q of the coils noticeably.) This gave a measurement of the current parameters $I_1$ and $I_2$ defined above. The power dissipated in each coil was then computed from $P_{1,2}=\Gamma L|I_{1,2}|^2$, and the efficiency was directly obtained from $\eta=P_B/(P_1+P_2+P_B)$. To ensure that the experimental setup was well described by a two-object coupled-mode theory model, we positioned the device coil such that its direct coupling to the copper loop attached to the Colpitts oscillator was zero. The experimental results are shown in FIG. 8, along with the theoretical prediction for maximum efficiency, given by Eq. (15).

Using this example, we were able to transmit significant amounts of power using this setup from the source coil to the device coil, fully lighting up a 60 W light-bulb from distances more than 2 m away, for example. As an additional test, we also measured the total power going into the driving circuit. The efficiency of the wireless power-transmission itself was hard to estimate in this way, however, as the efficiency of the Colpitts oscillator itself is not precisely known, although it is expected to be far from 100%. Nevertheless, this gave an overly conservative lower bound on the efficiency. When transmitting 60 W to the load over a distance of 2 m, for example, the power flowing into the driving circuit was 400 W. This yields an overall wall-to-load efficiency of ~15%, which is reasonable given the expected ~40% efficiency for the wireless power transmission at that distance and the low efficiency of the driving circuit.

From the theoretical treatment above, we see that in typical examples it is important that the coils be on resonance for the power transmission to be practical. We found experimentally that the power transmitted to the load dropped sharply as one of the coils was detuned from resonance. For a fractional detuning $\Delta f/f_0$ of a few times the inverse loaded Q, the induced current in the device coil was indistinguishable from noise.

The power transmission was not found to be visibly affected as humans and various everyday objects, such as metallic and wooden furniture, as well as electronic devices large and small, were placed between the two coils, even when they drastically obstructed the line of sight between source and device. External objects were found to have an effect only when they were closer than 10 cm from either one of the coils. While some materials (such as aluminum foil, styrofoam and humans) mostly just shifted the resonant frequency, which could in principle be easily corrected with a feedback circuit of the type described earlier, others (cardboard, wood, and PVC) lowered Q when placed closer than a few centimeters from the coil, thereby lowering the efficiency of the transfer.

This method of power transmission is believed safe for humans. When transmitting 60 W (more than enough to power a laptop computer) across 2 m, we estimated that the magnitude of the magnetic field generated is much weaker than the Earth's magnetic field for all distances except for less than about 1 cm away from the wires in the coil, an indication of the safety of the scheme even after long-term use. The power radiated for these parameters was ~5 W, which is roughly an order of magnitude higher than cell phones but could be drastically reduced, as discussed below.

Although the two coils are currently of identical dimensions, it is possible to make the device coil small enough to fit into portable devices without decreasing the efficiency. One could, for instance, maintain the product of the characteristic sizes of the source and device coils constant.

These experiments demonstrated experimentally a system for power transmission over medium range distances, and found that the experimental results match theory well in multiple independent and mutually consistent tests.

The efficiency of the scheme and the distances covered can be improved by silver-plating the coils, which may increase their Q, or by working with more elaborate geometries for the resonant objects. Nevertheless, the performance characteristics of the system presented here are already at levels where they could be useful in practical applications.

2.2 Capacitively-Loaded Conducting Loops or Coils

Figure 9:
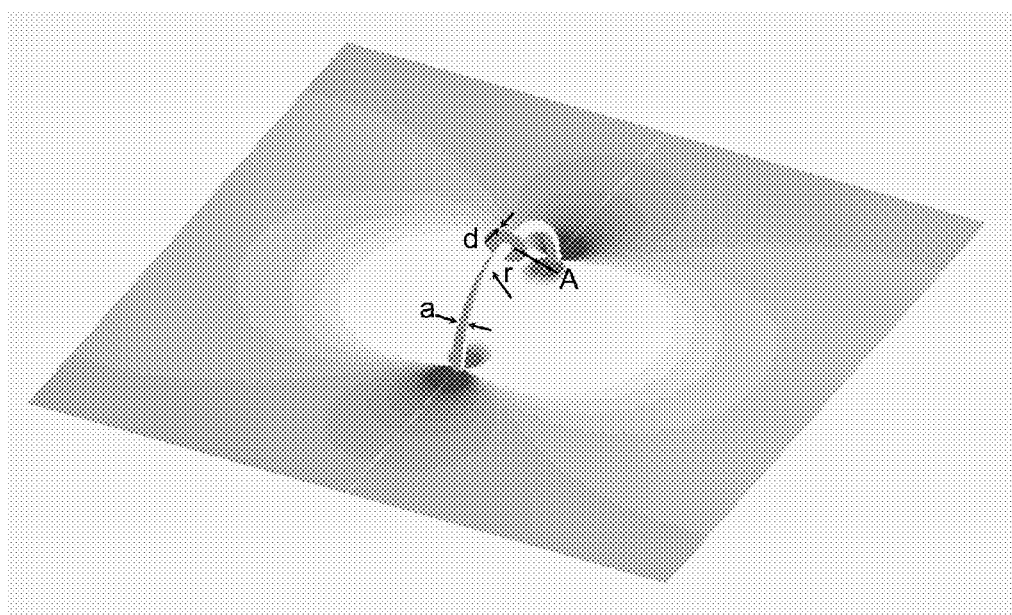
FIG. 9 shows an example of a capacitively-loaded conducting-wire coil, and illustrates the surrounding field.

In some examples, one or more of the resonant objects are capacitively-loaded conducting loops or coils. Referring to FIG. 9 a helical coil with N turns of conducting wire, as described above, is connected to a pair of conducting parallel plates of area A spaced by distance d via a dielectric material of relative permittivity $\in$, and everything is surrounded by air (as shown, N=1 and h=0). The plates have a capacitance $C_p = \in_o \in A/d$, which is added to the distributed capacitance of the coil and thus modifies its resonance. Note however, that the presence of the loading capacitor may modify the current distribution inside the wire and therefore the total effective inductance L and total effective capacitance C of the coil may be different respectively from $L_s$ and $C_s$, which are calculated for a self-resonant coil of the same geometry using a sinusoidal current profile. Since some charge may accumulate at the plates of the external loading capacitor, the charge distribution $\rho$ inside the wire may be reduced, so $C < C_s$, and thus, from the charge conservation equation, the current distribution $j$ may flatten out, so $L > L_s$. The resonant frequency for this system may be $\omega = 1/\sqrt{L(C+C_p)} < \omega_s = 1/\sqrt{L_s C_s}$, and $I(x) \to I_o \cos(\pi x/l) \Rightarrow C \to C_s \Rightarrow \omega \to \omega_s$, as $C_p \to 0$.

In general, the desired CMT parameters can be found for this system, but again a very complicated solution of Maxwell's Equations is required. Instead, we will analyze only a special case, where a reasonable guess for the current distribution can be made. When $C_p \gg C_s > C$, then $\omega \approx 1/\sqrt{LC_p} \ll \omega_s$ and $Z \approx \sqrt{L/C_p} \ll Z_s$, while all the charge is on the plates of the loading capacitor and thus the current distribution is constant along the wire. This allows us now to compute numerically L from Eq. (19). In the case h=0 and N integer, the integral in Eq. (19) can actually be computed analytically, giving the formula $L = \mu_o r[\ln(8r/a)-2]N^2$. Explicit analytical formulas are again available for R from Eq. (21) and (22), since $I_{rms} = I_o$, $|p| \approx 0$ and $|m| = I_o N \pi r^2$ (namely only the magnetic-dipole term is contributing to radiation), so we can determine also $Q_{abs} = \omega L/R_{abs}$ and $Q_{rad} = \omega L/R_{rad}$. At the end of the calculations, the validity of the assumption of constant current profile is confirmed by checking that indeed the condition $C_p \gg C_s \Leftrightarrow \omega \ll \omega_s$ is satisfied. To satisfy this condition, one could use a large external capacitance, however, this would usually shift the operational frequency lower than the optimal frequency, which we will determine shortly; instead, in typical examples, one often prefers coils with very small self-capacitance $C_s$ to begin with, which usually holds, for the types of coils under consideration, when N=1, so that the self-capacitance comes from the charge distribution across the single turn, which is almost always very small, or when N>1 and $h \gg 2Na$, so that the dominant self-capacitance comes from the charge distribution across adjacent turns, which is small if the separation between adjacent turns is large.

The external loading capacitance $C_p$ provides the freedom to tune the resonant frequency (for example by tuning A or d). Then, for the particular simple case h=0, for which we have analytical formulas, the total $Q = \omega L/(R_{abs}+R_{rad})$ becomes highest at the optimal frequency $$\omega_Q = \left[\frac{c^4}{\pi}\sqrt{\frac{\varepsilon_o}{2\sigma}} \cdot \frac{1}{aNr^3}\right]^{2/7}, \quad (24)$$

reaching the value $$Q_{max} = \frac{6}{7\pi}\left(2\pi^2 \eta_o \frac{\sigma a^2 N^2}{r}\right)^{3/7} \cdot \left[\ln\left(\frac{8r}{a}\right)-2\right]. \quad (25)$$

At lower frequencies Q is dominated by ohmic loss and at higher frequencies by radiation. Note, however, that the formulas above are accurate as long as $\omega_Q \ll \omega_s$ and, as explained above, this holds almost always when N=1, and is usually less accurate when N>1, since h=0 usually implies a large self-capacitance. A coil with large h can be used, if the self-capacitance needs to be reduced compared to the external capacitance, but then the formulas for L and $\omega_Q$, $Q_{max}$ are again less accurate. Similar qualitative behavior is expected, but a more complicated theoretical model is needed for making quantitative predictions in that case.

The results of the above analysis for two examples of subwavelength modes of $\lambda/r \geq 70$ (namely highly suitable for near-field coupling and well within the quasi-static limit) of coils with N=1 and h=0 at the optimal frequency Eq. (24) are presented in Table 3. To confirm the validity of constant-current assumption and the resulting analytical formulas, mode-solving calculations were also performed using another completely independent method: computational 3D finite-element frequency-domain (FEFD) simulations (which solve Maxwell's Equations in frequency domain exactly apart for spatial discretization) were conducted, in which the boundaries of the conductor were modeled using a complex impedance $\zeta_c = \sqrt{\mu_o \omega/2\sigma}$ boundary condition, valid as long as $\zeta_c/\zeta_o \ll 1$ ($<10^{-5}$ for copper in the microwave). Table 3 shows Numerical FEFD (and in parentheses analytical) results for the wavelength and absorption, radiation and total loss rates, for two different cases of subwavelength-loop resonant modes. Note that copper was used for the conducting material ($6=5.998 \cdot 10^7$ S/m). Specific parameters of the plot in FIG. 4 are highlighted in bold in the table. The two methods (analytical and computational) are in good agreement and show that, in some examples, the optimal frequency is in the low-MHz microwave range and the expected quality factors are $Q_{abs} \geq 1000$ and $Q_{rad} \geq 10000$.

TABLE 3

| single coil | $\lambda$/r | f | $Q_{rad}$ | $Q_{abs}$ | Q |
|---|---|---|---|---|---|
| r = 30 cm, a = 2 cm<br>$\epsilon$ = 10, A = 138 cm$^2$,<br>d = 4 mm | 111.4 (112.4) | 8.976 (8.897) | 29546 (30512) | 4886 (5117) | 4193 (4381) |
| r = 10 cm, a = 2 mm<br>$\epsilon$ = 10, A = 3.14 cm$^2$,<br>d = 1 mm | 69.7 (70.4) | 43.04 (42.61) | 10702 (10727) | 1545 (1604) | 1350 (1395) |

Figure 10:
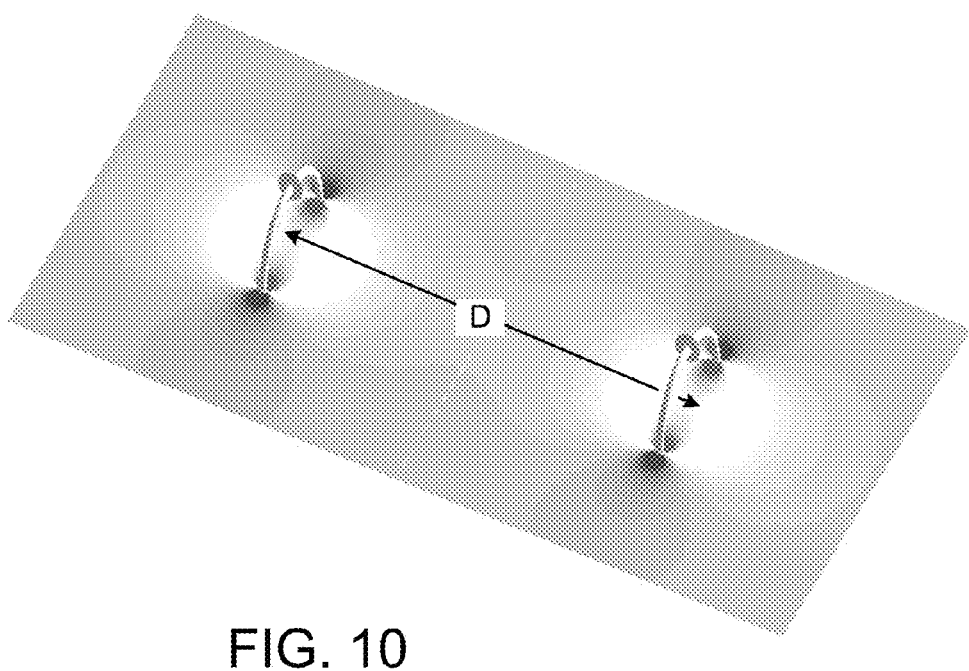
FIG. 10 shows an example wireless energy transfer scheme featuring two capacitively-loaded conducting-wire coils, and illustrates the surrounding field.

Referring to FIG. 10, in some examples, energy is transferred between two capacitively-loaded coils. For the rate of energy transfer between two capacitively-loaded coils 1 and 2 at distance D between their centers, the mutual inductance $M_L$ can be evaluated numerically from Eq. (23) by using constant current distributions in the case $\omega \ll \omega_s$. In the case h=0, the coupling may be only magnetic and again we have an analytical formula, which, in the quasi-static limit $r \ll D \ll \lambda$ and for the relative orientation shown in FIG. 10, is $M_L \approx \pi \mu_o/2 \cdot (r_1 r_2)^2 N_1 N_2/D^3$, which means that $k \propto (\sqrt{r_1 r_2}/D)^3$ may be independent of the frequency $\omega$ and the number of turns $N_1, N_2$. Consequently, the resultant coupling figure-of-merit of interest is $$U = k\sqrt{Q_1 Q_2} \approx \left(\frac{\sqrt{r_1 r_2}}{D}\right)^3 \cdot \frac{\pi^2 \eta_o \frac{\sqrt{r_1 r_2}}{\lambda} \cdot N_1 N_2}{\prod_{j=1,2}\left(\sqrt{\frac{\pi \eta_o}{\lambda \sigma}} \cdot \frac{r_j}{a_j} N_j + \frac{8}{3}\pi^5 \eta_o \left(\frac{r_j}{\lambda}\right)^4 N_j^2\right)^{1/2}}, \quad (26)$$

which again is more accurate for $N_1 = N_2 = 1$.

From Eq. (26) it can be seen that the optimal frequency $\omega_U$, where the figure-of-merit is maximized to the value $U_{max}$, is close to the frequency $\omega_{Q_1 Q_2}$ at which $Q_1 Q_2$ is maximized, since k does not depend much on frequency (at least for the distances $D \ll \lambda$ of interest for which the quasi-static approximation is still valid). Therefore, the optimal frequency $\omega_U \approx \omega_{Q_1 Q_2}$ may be mostly independent of the distance D between the two coils and may lie between the two frequencies $\omega_{Q_1}$ at and $\omega_{Q_2}$ at which the single-coil $Q_1$ and $Q_2$ respectively peak. For same coils, this optimal frequency is given by Eq. (24) and then the strong-coupling factor from Eq. (26) becomes $$U_{max} = kQ_{max} \approx \left(\frac{r}{D}\right)^3 \cdot \frac{3}{7}\left(2\pi^2 \eta_o \frac{\sigma a^2 N^2}{r}\right)^{3/7}. \quad (27)$$

In some examples, one can tune the capacitively-loaded conducting loops or coils, so that their angular resonant frequencies are close to $\omega_U$ within $\Gamma_U$, which is half the angular frequency width for which $U > U_{max}/2$.

Referring to Table 4, numerical FEFD and, in parentheses, analytical results based on the above are shown for two systems each composed of a matched pair of the loaded coils described in Table 3. The average wavelength and loss rates are shown along with the coupling rate and coupling to loss ratio figure-of-merit $U=\kappa/\Gamma$ as a function of the coupling distance D, for the two cases. Note that the average numerical $\Gamma_{rad}$ shown are slightly different from the single-loop value of FIG. 3. Analytical results for $\Gamma_{rad}$ are not shown but the single-loop value is used. (The specific parameters corresponding to the plot in FIG. 10 are highlighted with bold in the table.) Again we chose N=1 to make the constant-current assumption a good one and computed $M_L$ numerically from Eq. (23). Indeed the accuracy can be confirmed by their agreement with the computational FEFD mode-solver simulations, which give $\kappa$ through the frequency splitting of the two normal modes of the combined system ($\delta_E = 2\kappa$ from Eq. (4)). The results show that for medium distances D/r=10–3 the expected coupling-to-loss ratios are in the range $U \sim 0.5$–50.

TABLE 4

| pair of coils | D/r | $Q^{rad}$ | $Q = \omega/2\Gamma$ | $Q_\kappa = \omega/2\kappa$ | $\kappa/\Gamma$ |
|---|---|---|---|---|---|
| r = 30 cm, a = 2 cm | 3 | 30729 | 4216 | 62.6 (63.7) | 67.4 (68.7) |
| $\epsilon$ = 10, A = 138 cm², | 5 | 29577 | 4194 | 235 (248) | 17.8 (17.6) |
| d = 4 mm | 7 | 29128 | 4185 | 589 (646) | 7.1 (6.8) |
| $\lambda/r \approx 112$ | 10 | 28833 | 4177 | 1538 (1828) | 2.7 (2.4) |
| $Q^{abs} \approx 4886$ | | | | | |
| r = 10 cm, a = 2 mm | 3 | 10955 | 1355 | 85.4 (91.3) | 15.9 (15.3) |
| $\epsilon$ = 10, A = | 5 | 10740 | 1351 | 313 (356) | 4.32 (3.92) |
| 3.14 cm², d = 1 mm | 7 | 10759 | 1351 | 754 (925) | 1.79 (1.51) |
| $\lambda/r \approx 70$ | 10 | 10756 | 1351 | 1895 (2617) | 0.71 (0.53) |
| $Q^{abs} \approx 1546$ | | | | | |

2.2.1 Derivation of Optimal Power-Transmission Efficiency

Figure 11:
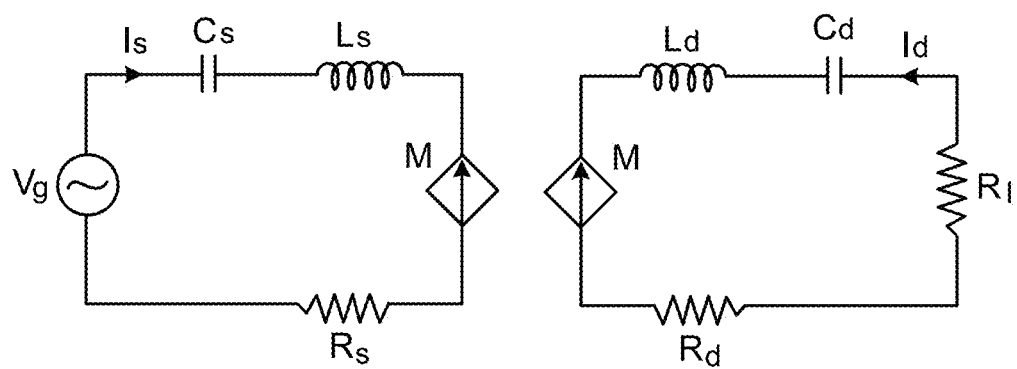
FIG. 11 illustrates an example circuit model for wireless energy transfer.

Referring to FIG. 11, to rederive and express Eq. (15) in terms of the parameters which are more directly accessible from particular resonant objects, such as the capacitively-loaded conducting loops, one can consider the following circuit-model of the system, where the inductances $L_s, L_d$ represent the source and device loops respectively, $R_s, R_d$ their respective losses, and $C_s, C_d$ are the required corresponding capacitances to achieve for both resonance at frequency $\omega$. A voltage generator $V_g$ is considered to be connected to the source and a load resistance $R_l$ to the device. The mutual inductance is denoted by M.

Then from the source circuit at resonance ($\omega L_s = 1/\omega C_s$):

$$V_g = I_s R_s - j\omega M I_d \Rightarrow \frac{1}{2}V_g^* I_s = \frac{1}{2}|I_s|^2 R_s + \frac{1}{2}j\omega M I_d^* I_s, \quad (28)$$

and from the device circuit at resonance ($\omega L_d = 1/\omega C_d$):

$$0 = I_d(R_d + R_l) - j\omega M I_s \Rightarrow j\omega M I_s = I_d(R_d + R_l) \quad (29)$$

So by substituting Eq. (29) to Eq. (28) and taking the real part (for time-averaged power) we get:

$$P_g = \text{Re}\left\{\frac{1}{2}V_g^* I_s\right\} = \frac{1}{2}|I_s|^2 R_s + \frac{1}{2}|I_d|^2(R_d + R_l) = P_s + P_d + P_l, \quad (30)$$

where we identified the power delivered by the generator $P_g = \text{Re}\{V_g^* I_s/2\}$, the power lost inside the source $P_s = |I_s|^2 R_s/2$, the power lost inside the device $P_d = |I_d|^2 R_d/2$ and the power delivered to the load $P_l = |I_d|^2 R_l/2$. Then, the power transmission efficiency is:

$$\eta_P \equiv \frac{P_l}{P_g} = \frac{R_l}{\left|\frac{I_s}{I_d}\right|^2 R_s + (R_d + R_l)} \stackrel{(29)}{=} \frac{R_l}{\frac{(R_d + R_l)^2}{(\omega M)^2} R_s + (R_d + R_l)}. \quad (31)$$

If we now choose the load impedance $R_l$ to optimize the efficiency by $\eta_P'(R_l)=0$, we get the optimal load impedance $$\frac{R_{l*}}{R_d} = \sqrt{1 + \frac{(\omega M)^2}{R_s R_d}} \quad (32)$$

and the maximum possible efficiency $$\eta_{P*} = \frac{R_{l*}/R_d - 1}{R_{l*}/R_d + 1} = \left[\frac{\omega M/\sqrt{R_s R_d}}{1 + \sqrt{1 + \left(\omega M/\sqrt{R_s R_d}\right)^2}}\right]^2. \quad (33)$$

To check now the correspondence with the CMT model, note that $\kappa_f = R_f/2L_d$, $\Gamma_d = R_d/2L_d$, $\Gamma_s = R_s/2L_s$, and $\kappa = \omega M/2\sqrt{L_sL_d}$, so then $U_f = \kappa_f/\delta_d = R_f/R_d$ and $U = \kappa/\sqrt{\Gamma_s\Gamma_d} = \omega M/\sqrt{R_sR_d}$. Therefore, the condition Eq. (32) is identical to the condition Eq. (14) and the optimal efficiency Eq. (33) is identical to the general Eq. (15). Indeed, as the CMT analysis predicted, to get a large efficiency, we need to design a system that has a large strong-coupling factor U.

2.2.2 Optimization of U

The results above can be used to increase or optimize the performance of a wireless energy transfer system, which employs capacitively-loaded coils. For example, from the scaling of Eq. (27) with the different system parameters, one sees that to maximize the system figure-of-merit U, in some examples, one can:

Decrease the resistivity of the conducting material. This can be achieved, for example, by using good conductors (such as copper or silver) and/or lowering the temperature. At very low temperatures one could use also superconducting materials to achieve extremely good performance.

Increase the wire radius a. In typical examples, this action can be limited by physical size considerations. The purpose of this action is mainly to reduce the resistive losses in the wire by increasing the cross-sectional area through which the electric current is flowing, so one could alternatively use also a Litz wire, or ribbon, or any low AC-resistance structure, instead of a circular wire.

For fixed desired distance D of energy transfer, increase the radius of the loop r. In typical examples, this action can be limited by physical size considerations.

For fixed desired distance vs. loop-size ratio D/r, decrease the radius of the loop r. In typical examples, this action can be limited by physical size considerations.

Increase the number of turns N. (Even though Eq. (27) is expected to be less accurate for N>1, qualitatively it still provides a good indication that we expect an improvement in the coupling-to-loss ratio with increased N.) In typical examples, this action can be limited by physical size and possible voltage considerations, as will be discussed in following paragraphs.

Adjust the alignment and orientation between the two coils. The figure-of-merit is optimized when both cylindrical coils have exactly the same axis of cylindrical symmetry (namely they are "facing" each other). In some examples, particular mutual coil angles and orientations that lead to zero mutual inductance (such as the orientation where the axes of the two coils are perpendicular and the centers of the two coils are on one of the two axes) should be avoided.

Finally, note that the height of the coil h is another available design parameter, which can have an impact on the performance similar to that of its radius r, and thus the design rules can be similar.

The above analysis technique can be used to design systems with desired parameters. For example, as listed below, the above described techniques can be used to determine the cross sectional radius a of the wire used to design a system including two same single-turn loops with a given radius in order to achieve a specific performance in terms of $U=\kappa/\Gamma$ at a given D/r between them, when the loop material is copper ($\sigma = 5.998 \cdot 10^7$ S/m):

D/r=5, U≥10, r=30 cm ⇒ a≥9 mm
D/r=5, U≥10, r=5 cm ⇒ a≥3.7 mm
D/r=5, U≥20, r=30 cm ⇒ a≥20 mm
D/r=5, U≥20, r=5 cm ⇒ a≥8.3 mm
D/r=10, U≥1, r=30 cm ⇒ a≥7 mm
D/r=10, U≥1, r=5 cm ⇒ a≥2.8 mm
D/r=10, U≥3, r=30 cm ⇒ a≥25 mm
D/r=10, U≥3, r=5 cm ⇒ a≥10 mm

Similar analysis can be done for the case of two dissimilar loops. For example, in some examples, the device under consideration may be identified specifically (e.g. a laptop or a cell phone), so the dimensions of the device object ($r_d,h_d,a_d,N_d$) may be restricted. However, in some such examples, the restrictions on the source object ($r_s,h_s,a_s,N_s$) may be much less, since the source can, for example, be placed under the floor or on the ceiling. In such cases, the desired distance between the source and device may be fixed; in other cases it may be variable. Listed below are examples (simplified to the case $N_s=N_d=1$ and $h_s=h_d=0$) of how one can vary the dimensions of the source object to achieve a desired system performance in terms of $U_{sd}=\kappa/\sqrt{\Gamma_s\Gamma_d}$, when the material is again copper ($\sigma = 5.998 \cdot 10^7$ S/m):

D=1.5 m, $U_{sd}$≥15, $r_d$=30 cm, $a_d$=6 mm ⇒ $r_s$=1.158 m, $a_s$≥5 mm
D=1.5 m, $U_{sd}$≥30, $r_d$=30 cm, $a_d$=6 mm ⇒ $r_s$=1.15 m, $a_s$≥33 mm
D=1.5 m, $U_{sd}$≥1, $r_d$=5 cm, $a_d$=4 mm ⇒ $r_s$=1.119 m, $a_s$≥7 mm
D=1.5 m, $U_{sd}$≥2, $r_d$=5 cm, $a_d$=4 mm ⇒ $r_s$=1.119 m, a, ≥52 mm
D=2 m, $U_{sd}$≥10, $r_d$=30 cm, $a_d$=6 mm ⇒ $r_s$=1.518 m, $a_s$≥7 mm
D=2 m, $U_{sd}$≥20, $r_d$=30 cm, $a_d$=6 mm ⇒ $r_s$=1.514 m, $a_s$≥50 mm
D=2 m, $U_{sd}$≥0.5, $r_d$=5 cm, $a_d$=4 mm ⇒ $r_s$=1.491 m, $a_s$≥5 mm
D=2 m, $U_{sd}$≥1, $r_d$=5 cm, $a_d$=4 mm ⇒ $r_s$=1.491 m, $a_s$≥36 mm 2.2.3 Optimization of k As described below, in some examples, the quality factor Q of the resonant objects may be limited from external perturbations and thus varying the coil parameters may not lead to significant improvements in Q. In such cases, one can opt to increase the strong-coupling factor U by increasing the coupling factor k. The coupling does not depend on the frequency and may weakly depend on the number of turns. Therefore, in some examples, one can:

Increase the wire radii $a_1$ and $a_2$. In typical examples, this action can be limited by physical size considerations.

For fixed desired distance D of energy transfer, increase the radii of the coils $r_1$ and $r_2$. In typical examples, this action can be limited by physical size considerations.

For fixed desired distance vs. coil-sizes ratio $D/\sqrt{r_1r_2}$, only the weak (logarithmic) dependence of the inductance remains, which suggests that one should decrease the radii of the coils $r_1$ and $r_2$. In typical examples, this action can be limited by physical size considerations.

Adjust the alignment and orientation between the two coils. In typical examples, the coupling is optimized when both cylindrical coils have exactly the same axis of cylindrical symmetry (namely they are "facing" each other). Particular mutual coil angles and orientations that lead to zero mutual inductance (such as the orientation where the axes of the two coils are perpendicular and the centers of the two coils are on one of the two axes) should obviously be avoided.

Finally, note that the heights of the coils $h_1$ and $h_2$ are other available design parameters, which can have an impact to the coupling similar to that of their radii $r_1$ and $r_2$, and thus the design rules can be similar.

Further practical considerations apart from efficiency, e.g. physical size limitations, will be discussed in detail below.

2.2.4 Optimization of Overall System Performance

In embodiments, the dimensions of the resonant objects may be determined by the particular application. For example, when the application is powering a laptop or a cell-phone, the device resonant object cannot have dimensions that exceed those of the laptop or cell-phone respectively. For a system of two loops of specified dimensions, in terms of loop radii $r_{s,d}$ and wire radii $a_{s,d}$, the independent parameters left to adjust for the system optimization are: the number of turns $N_{s,d}$, the frequency f, the power-load consumption rate $\kappa_l = R_l/2L_d$ and the power-generator feeding rate $\kappa_g = R_g/2L_s$, where $R_g$ is the internal (characteristic) impedance of the generator.

In general, in various examples, the dependent variable that one may want to increase or optimize may be the overall efficiency η. However, other important variables may need to be taken into consideration upon system design. For example, in examples featuring capacitively-loaded coils, the designs can be constrained by, the currents flowing inside the wires $I_{s,d}$ and other components and the voltages across the capacitors $V_{s,d}$. These limitations can be important because for ~Watt power applications the values for these parameters can be too large for the wires or the capacitors respectively to handle. Furthermore, the total loaded (by the load) quality factor of the device $Q_{d[l]} = \omega/2(\Gamma_d + \Gamma_l) = \omega L_d/(R_d + R_l)$ and the total loaded (by the generator) quality factor of the source $Q_{s[g]} = \omega/2(\Gamma_s + \Gamma_g) = \omega L_s/(R_s + R_g)$ are quantities that should be preferably small, because to match the source and device resonant frequencies to within their Q's, when those are very large, can be challenging experimentally and more sensitive to slight variations. Lastly, the radiated powers $P_{s,rad}$ and $P_{d,rad}$ may need to be minimized for concerns about far-field interference and safety, even though, in general, for a magnetic, non-radiative scheme they are already typically small. In the following, we examine then the effects of each one of the independent variables on the dependent ones.

We define a new variable wp to express the power-load consumption rate for some particular value of U through $U_l = \kappa_l/\Gamma_d = \sqrt{1 + wp \cdot U^2}$. Then, in some examples, values which may impact the choice of this rate are: $U_l = 1 \Leftrightarrow wp = 0$ to minimize the required energy stored in the source (and therefore $I_s$ and $V_s$), $U_l = \sqrt{1 + U^2} > 1 \Leftrightarrow wp = 1$ to maximize the efficiency, as seen earlier, or $U_l \gg 1 \gg wp \Leftrightarrow 1$ to decrease the required energy stored in the device (and therefore $I_d$ and $V_d$) and to decrease or minimize $Q_{d[l]}$. Similar is the impact of the choice of the power-generator feeding rate $U_g = \kappa_g/\Gamma_s$, with the roles of the source/device and generator/load reversed.

In some examples, increasing $N_s$ and $N_d$ may increase $Q_s$ and $Q_d$, and thus U and the efficiency significantly. It also may decrease the currents $I_s$ and $I_d$, because the inductance of the loops may increase, and thus the energy $W_{s,d} = L_{s,d} |I_{s,d}|^2/2$ required for given output power $P_l$ can be achieved with smaller currents. However, in some examples, increasing $N_d$ and thus $Q_d$ can increase $Q_{d[l]}$, $P_{d,rad}$ and the voltage across the device capacitance $V_d$. Similar can be the impact of increasing $N_s$ on $Q_{s[g]}$, $P_{s,rad}$ and $V_s$. As a conclusion, in some examples, the number of turns $N_s$ and $N_d$ may be chosen large enough (for high efficiency) but such that they allow for reasonable voltages, loaded Q's and/or powers radiated.

With respect to the resonant frequency, again, there may be an optimal one for efficiency. Close to that optimal frequency $Q_{d[l]}$ and/or $Q_{s[g]}$ can be approximately maximum. In some examples, for lower frequencies the currents may typically get larger but the voltages and radiated powers may get smaller. In some examples, one may choose the resonant frequency to maximize any of a number of system parameters or performance specifications, such as efficiency.

Figure 12:
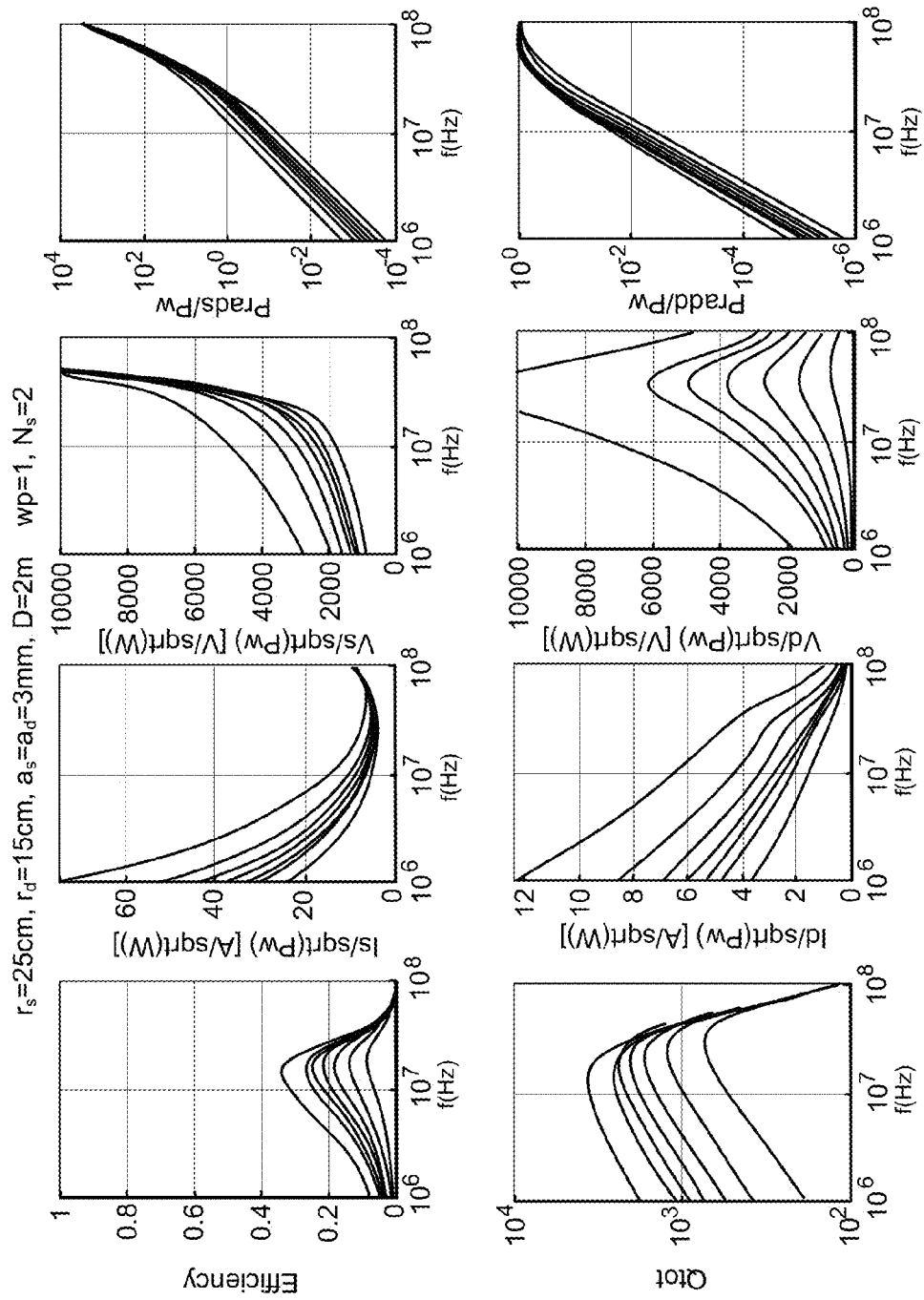
FIG. 12 shows the efficiency, total (loaded) device Q, and source and device currents, voltages and radiated powers (normalized to 1 Watt of output power to the load) as functions of the resonant frequency, for a particular choice of source and device loop dimensions, wp and $N_s$ and different choices of $N_d$=1, 2, 3, 4, 5, 6, 10.
Figure 13:
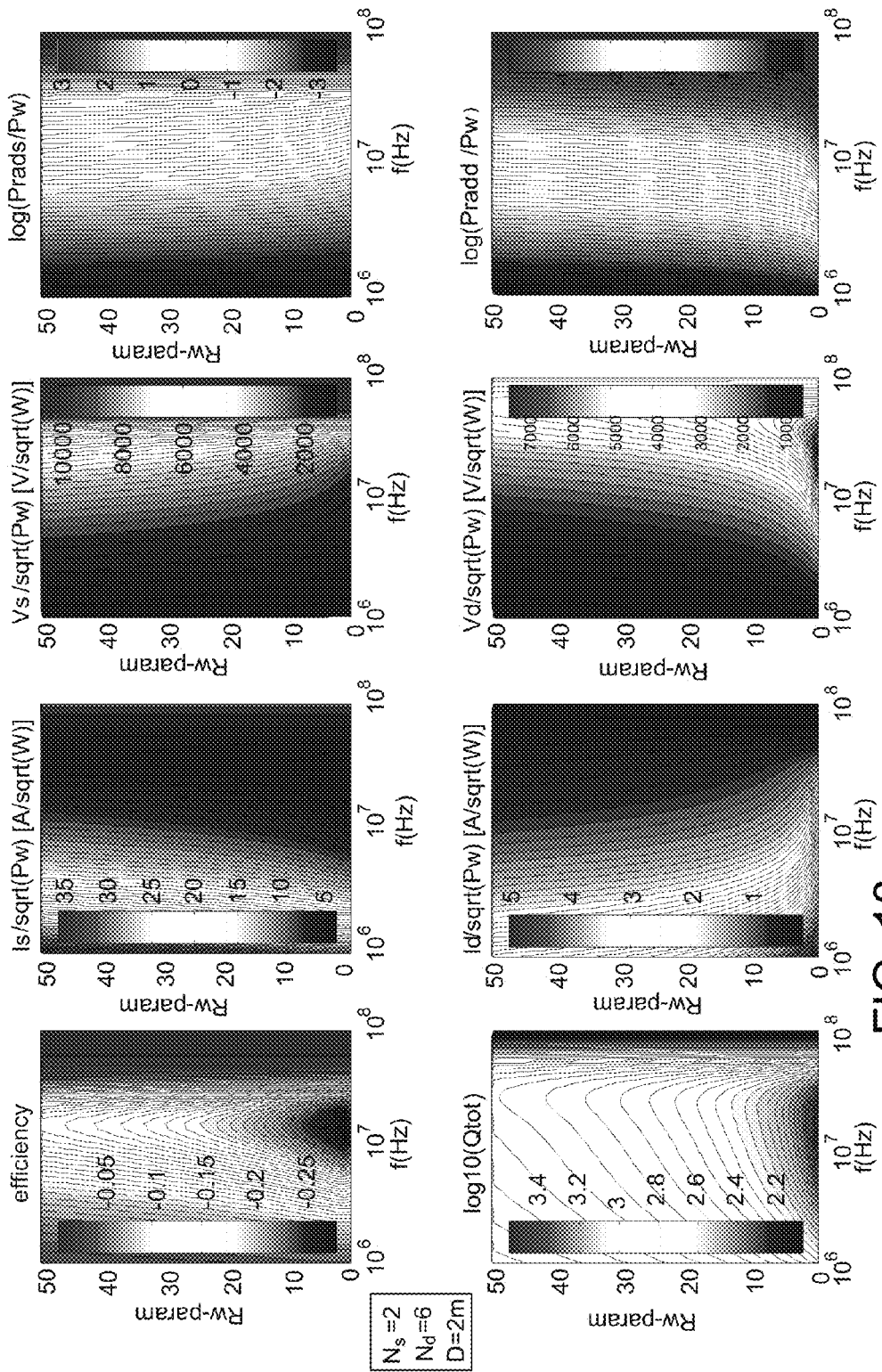
FIG. 13 shows the efficiency, total (loaded) device Q, and source and device currents, voltages and radiated powers (normalized to 1 Watt of output power to the load) as functions of frequency and wp for a particular choice of source and device loop dimensions, and number of turns $N_s$ and $N_d$.

One way to decide on an operating regime for the system may be based on a graphical method. Consider two loops of $r_s = 25$ cm, $r_d = 15$ cm, $h_s = h_d = 0$, $a_s = a_d = 3$ mm and distance D=2 m between them. In FIG. 12, we plot some of the above dependent variables (currents, voltages and radiated powers normalized to 1 Watt of output power) in terms of frequency f and $N_d$, given some choice for wp and $N_s$. FIG. 12 depicts the trend of system performance explained above. In FIG. 13, we make a contour plot of the dependent variables as functions of both frequency and wp but for both $N_s$ and $N_d$ fixed. For example, in embodiments, a reasonable choice of parameters for the system of two loops with the dimensions given above may be: $N_s = 2$, $N_d = 6$, f=10 MHz and wp=10, which gives the following performance characteristics: η=20.6%, $Q_{d[l]} = 1264$, $I_s = 7.2$ A, $I_d = 1.4$ A, $V_s = 2.55$ kV, $V_d = 2.30$ kV, $P_{s,rad} = 0.15$ W, $P_{d,rad} = 0.006$ W. Note that the results in FIGS. 12, 13 and the calculated performance characteristics are made using the analytical formulas provided above, so they are expected to be less accurate for large values of $N_s$, $N_d$, but still may give a good estimate of the scalings and the orders of magnitude.

Finally, in embodiments, one could additionally optimize for the source dimensions, if, for example, only the device dimensions are limited. Namely, one can add $r_s$ and $a_s$ in the set of independent variables and optimize with respect to these all the dependent variables of the system. In embodiments, such an optimization may lead to improved results.

2.3 Inductively-Loaded Conducting Rods

A straight conducting rod of length 2h and cross-sectional radius a has distributed capacitance and distributed inductance, and therefore can support a resonant mode of angular frequency ω. Using the same procedure as in the case of self-resonant coils, one can define an effective total inductance L and an effective total capacitance C of the rod through formulas Eqs. (19) and (20). With these definitions, the resonant angular frequency and the effective impedance may be given again by the common formulas $\omega = 1/\sqrt{LC}$ and $Z = \sqrt{L/C}$ respectively. To calculate the total inductance and capacitance, one can assume again a sinusoidal current profile along the length of the conducting wire. When interested in the lowest mode, if we denote by x the coordinate along the conductor, such that it runs from −h to +h, then the current amplitude profile may have the form $I(x) = I_o \cos(\pi x/2h)$, since it has to be zero at the open ends of the rod. This is the well-known half-wavelength electric dipole resonant mode.

Figure 14:
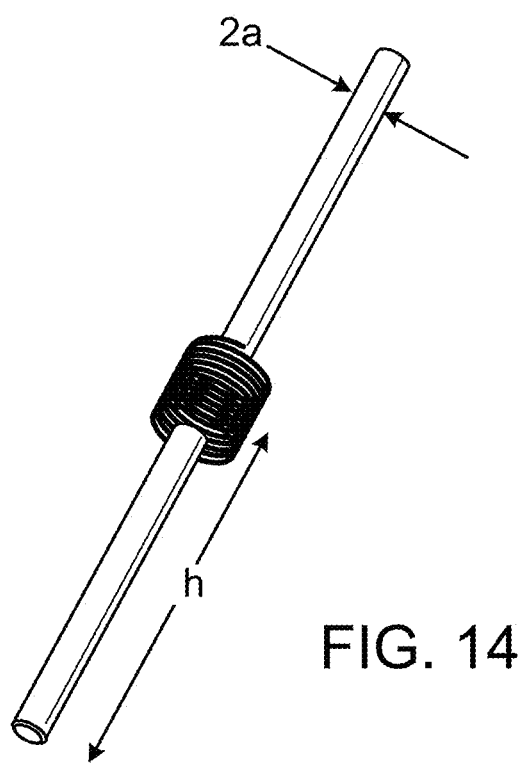
FIG. 14 shows an example of an inductively-loaded conducting-wire coil.

In some examples, one or more of the resonant objects may be inductively-loaded conducting rods. Referring to FIG. 14, a straight conducting rod of length 2h and cross-sectional radius a, as in the previous paragraph, is cut into two equal pieces of length h, which may be connected via a coil wrapped around a magnetic material of relative permeability μ, and everything is surrounded by air. The coil has an inductance $L_c$, which is added to the distributed inductance of the rod and thus modifies its resonance. Note however, that the presence of the center-loading inductor may modify the current distribution inside the wire and therefore the total effective inductance L and total effective capacitance C of the rod may be different respectively from $L_s$ and $C_s$, which are calculated for a self-resonant rod of the same total length using a sinusoidal current profile, as in the previous paragraph. Since some current may be running inside the coil of the external loading inductor, the current distribution j inside the rod may be reduced, so $L < L_s$, and thus, from the charge conservation equation, the linear charge distribution $\rho_l$ may flatten out towards the center (being positive in one side of the rod and negative in the other side of the rod, changing abruptly through the inductor), so $C > C_s$. The resonant frequency for this system may be $\omega = 1/\sqrt{(L+L_c)C} < \omega_s = 1/\sqrt{L_s C_s}$, and $I(x) \to I_o \cos(\pi x/2h) \Rightarrow L \to L_s \Rightarrow \omega \to \omega_s$, as $L_c \to 0$.

In general, the desired CMT parameters can be found for this system, but again a very complicated solution of Maxwell's Equations is generally required. In a special case, a reasonable estimate for the current distribution can be made. When $L_c \gg L_s > L$, then $\omega \approx 1/\sqrt{L_c C} \ll \omega_s$ and $Z \approx \sqrt{L_c/C} \gg Z_s$, while the current distribution is triangular along the rod (with maximum at the center-loading inductor and zero at the ends) and thus the charge distribution may be positive constant on one half of the rod and equally negative constant on the other side of the rod. This allows us to compute numerically C from Eq. (20). In this case, the integral in Eq. (20) can actually be computed analytically, giving the formula $1/C = 1/(\pi\epsilon_o h)[\ln(h/a)-1]$. Explicit analytical formulas are again available for R from Eq. (21) and (22), since $I_{rms} = I_o$, $|p| = q_o h$ and $|m| = 0$ (namely only the electric-dipole term is contributing to radiation), so we can determine also $Q_{abs} = 1/\omega C R_{abs}$ and $Q_{rad} = 1/\omega C R_{rad}$. At the end of the calculations, the validity of the assumption of triangular current profile may be confirmed by checking that indeed the condition $L_c \gg L_s \Leftrightarrow \omega \ll \omega_s$ is satisfied. This condition may be relatively easily satisfied, since typically a conducting rod has very small self-inductance $L_s$ to begin with.

Another important loss factor in this case is the resistive loss inside the coil of the external loading inductor $L_c$ and it may depend on the particular design of the inductor. In some examples, the inductor may be made of a Brooks coil, which is the coil geometry which, for fixed wire length, may demonstrate the highest inductance and thus quality factor. The Brooks coil geometry has $N_{Bc}$ turns of conducting wire of cross-sectional radius $a_{Bc}$ wrapped around a cylindrically symmetric coil former, which forms a coil with a square cross-section of side $r_{Bc}$, where the inner side of the square is also at radius $r_{Bc}$ (and thus the outer side of the square is at radius $2r_{Bc}$), therefore $N_{Bc} \approx (r_{Bc}/2a_{Bc})^2$. The inductance of the coil is then $L_c = 2.0285\mu_o r_{Bc} N_{Bc}^2 \approx 2.0285\mu_o r_{Bc}^5/8a_{Bc}^4$ and its resistance $$R_c \approx \frac{1}{\sigma} \frac{l_{Bc}}{\pi a_{Bc}^2} \sqrt{1 + \frac{\mu_o \omega \sigma}{2}\left(\frac{a_{Bc}}{2}\right)^2},$$

where the total wire length is $l_{Bc} \approx 2\pi(3r_{Bc}/2)N_{Bc} \approx 3\pi r_{Bc}^3/4a_{Bc}^2$ and we have used an approximate square-root law for the transition of the resistance from the dc to the ac limit as the skin depth varies with frequency.

The external loading inductance $L_c$ provides the freedom to tune the resonant frequency. For example, for a Brooks coil with a fixed size $r_{Bc}$, the resonant frequency can be reduced by increasing the number of turns $N_{Bc}$ by decreasing the wire cross-sectional radius $a_{Bc}$. Then the desired resonant angular frequency $\omega = 1/\sqrt{L_c C}$ may be achieved for $a_{Bc} \approx (2.0285\mu_o r_{Bc}^5 \omega^2 C)^{1/4}$ and the resulting coil quality factor may be $$Q_c \approx 0.169\mu_o \sigma r_{Bc}^2 \omega \Big/ \sqrt{1 + \omega^2 \mu_o^2 \sigma \sqrt{2.0285\ \mu_0 (r_{Bc}/4)^5 C}}.$$

Then, for the particular simple case $L_c \gg L_s$, for which we have analytical formulas, the total $Q = 1/\omega C(R_c + R_{abs} + R_{rad})$ becomes highest at some optimal frequency $\omega_Q$, reaching the value $Q_{max}$, that may be determined by the loading-inductor specific design. For example, for the Brooks-coil procedure described above, at the optimal frequency $Q_{max} \approx Q_c \approx 0.8(\mu_o \sigma^2 r_{Bc}^3/C)^{1/4}$. At lower frequencies it is dominated by ohmic loss inside the inductor coil and at higher frequencies by radiation. Note, again, that the above formulas are accurate as long as $\omega_Q \ll \omega_s$ and, as explained above, this may be easy to design for by using a large inductance.

The results of the above analysis for two examples, using Brooks coils, of subwavelength modes of $\lambda/h \geq 200$ (namely highly suitable for near-field coupling and well within the quasi-static limit) at the optimal frequency $\omega_Q$ are presented in Table 5.

Table 5 shows in parentheses (for similarity to previous tables) analytical results for the wavelength and absorption, radiation and total loss rates, for two different cases of sub-wavelength-rod resonant modes. Note that copper was used for the conducting material ($\sigma = 5.998 \cdot 10^7$ S/m). The results show that, in some examples, the optimal frequency may be in the low-MHz microwave range and the expected quality factors may be $Q_{abs} \geq 1000$ and $Q_{rad} \geq 100000$.

TABLE 5

| single rod | $\lambda/h$ | f (MHz) | $Q_{rad}$ | $Q_{abs}$ | Q |
|---|---|---|---|---|---|
| h = 30 cm, a = 2 cm<br>$\mu = 1$, $r_{Bc} = 2$ cm,<br>$a_{Bc} = 0.88$ mm,<br>$N_{Bc} = 129$ | (403.8) | (2.477) | (2.72 * 10$^6$) | (7400) | (7380) |
| h = 10 cm, a = 2 mm<br>$\mu = 1$, $r_{Bc} = 5$ mm,<br>$a_{Bc} = 0.25$ mm,<br>$N_{Bc} = 103$ | (214.2) | (14.010) | (6.92 * 10$^5$) | (3908) | (3886) |

In some examples, energy may be transferred between two inductively-loaded rods. For the rate of energy transfer between two inductively-loaded rods 1 and 2 at distance D between their centers, the mutual capacitance $M_C$ can be evaluated numerically from Eq. (23) by using triangular current distributions in the case $\omega \ll \omega_s$. In this case, the coupling may be only electric and again we have an analytical formula, which, in the quasi-static limit $h \ll D \ll \lambda$ and for the relative orientation such that the two rods are aligned on the same axis, is $1/M_C \approx 1/2\pi\epsilon_o \cdot (h_1 h_2)^2/D^3$, which means that $k \propto (\sqrt{h_1 h_2}/D)^3$ is independent of the frequency $\omega$. One can then get the resultant strong-coupling factor U.

It can be seen that the frequency $\omega_U$, where the figure-of-merit is maximized to the value $U_{max}$, is close to the frequency $\omega_{Q_1 Q_2}$, where $Q_1 Q_2$ is maximized, since k does not depend much on frequency (at least for the distances $D \ll \lambda$ of interest for which the quasi-static approximation is still valid). Therefore, the optimal frequency $\omega_U \approx \omega_{Q_1 Q_2}$ may be mostly independent of the distance D between the two rods and may lie between the two frequencies $\omega_{Q_1}$ and $\omega_{Q_2}$ at which the single-rod $Q_1$ and $Q_2$ respectively peak. In some typical examples, one can tune the inductively-loaded conducting rods, so that their angular eigenfrequencies are close to $\omega_U$ within $\Gamma_U$, which is half the angular frequency width for which $U > U_{max}/2$.

Referring to Table 6, in parentheses (for similarity to previous tables) analytical results based on the above are shown for two systems each composed of a matched pair of the loaded rods described in Table 5. The average wavelength and loss rates are shown along with the coupling rate and coupling to loss ratio figure-of-merit $U = \kappa/\Gamma$ as a function of the coupling distance D, for the two cases. Note that for $\Gamma_{rad}$ the single-rod value is used. Again we chose $L_c \gg L_s$ to make the triangular-current assumption a good one and computed $M_C$ numerically from Eq. (23). The results show that for medium distances D/h=10–3 the expected coupling-to-loss ratios are in the range U~0.5-100.

TABLE 6

| pair of rods | D/h | $Q_\kappa = 1/k$ | U |
|---|---|---|---|
| h = 30 cm, a = 2 cm | 3 | (70.3) | (105.0) |
| $\mu = 1, r_{Bc} = 2$ cm, $a_{Bc} = 0.88$ mm, $N_{Bc} = 129$ | 5 | (389) | (19.0) |
| λ/h ≈ 404 | 7 | (1115) | (6.62) |
| Q ≈ 7380 | 10 | (3321) | (2.22) |
| h = 10 cm, a = 2 mm | 3 | (120) | (32.4) |
| $\mu = 1, r_{Bc} = 5$ mm, $a_{Bc} = 0.25$ mm, $N_{Bc} = 103$ | 5 | (664) | (5.85) |
| λ/h ≈ 214 | 7 | (1900) | (2.05) |
| Q ≈ 3886 | 10 | (5656) | (0.69) |

2.4 Dielectric Disks

In some examples, one or more of the resonant objects are dielectric objects, such as disks. Consider a two dimensional dielectric disk object, as shown in FIG. 15(a), of radius r and relative permittivity $\in$ surrounded by air that supports high-Q "whispering-gallery" resonant modes. The loss mechanisms for the energy stored inside such a resonant system are radiation into free space and absorption inside the disk material. High-$Q_{rad}$ and long-tailed subwavelength resonances can be achieved when the dielectric permittivity $\in$ is large and the azimuthal field variations are slow (namely of small principal number m). Material absorption is related to the material loss tangent: $Q_{abs} \cup Re\{\in\}/Im\{\in\}$. Mode-solving calculations for this type of disk resonances were performed using two independent methods: numerically, 2D finite-difference frequency-domain (FDFD) simulations (which solve Maxwell's Equations in frequency domain exactly apart for spatial discretization) were conducted with a resolution of 30pts/r; analytically, standard separation of variables (SV) in polar coordinates was used.

TABLE 7

| single disk | λ/r | $Q^{abs}$ | $Q^{rad}$ | Q |
|---|---|---|---|---|
| Re{∈} = 147.7, m = 2 | 20.01 (20.00) | 10103 (10075) | 1988 (1992) | 1661 (1663) |
| Re{∈} = 65.6, m = 3 | 9.952 (9.950) | 10098 (10087) | 9078 (9168) | 4780 (4802) |

The results for two TE-polarized dielectric-disk subwavelength modes of λ/r≥10 are presented in Table 7. Table 7 shows numerical FDFD (and in parentheses analytical SV) results for the wavelength and absorption, radiation and total loss rates, for two different cases of subwavelength-disk resonant modes. Note that disk- material loss-tangent Im{∈}/Re{∈}=$10^{-4}$ was used. (The specific parameters corresponding to the plot in FIG. 15(a) are highlighted with bold in the table.) The two methods have excellent agreement and imply that for a properly designed resonant low-loss-dielectric object values of $Q_{rad}$≥2000 and $Q_{abs}$~10000 are achievable. Note that for the 3D case the computational complexity would be immensely increased, while the physics would not be significantly different. For example, a spherical object of $\in$=147.7 has a whispering gallery mode with m=2, $Q_{rad}$=13962, and λ/r=17.

The required values of $\in$, shown in Table 7, might at first seem unrealistically large. However, not only are there in the microwave regime (appropriate for approximately meter-range coupling applications) many materials that have both reasonably high enough dielectric constants and low losses (e.g. Titania, Barium tetratitanate, Lithium tantalite etc.), but also $\in$ could signify instead the effective index of other known subwavelength surface-wave systems, such as surface modes on surfaces of metallic materials or plasmonic (metal-like, negative-$\in$) materials or metallo-dielectric photonic crystals or plasmono-dielectric photonic crystals.

To calculate now the achievable rate of energy transfer between two disks 1 and 2, as shown in FIG. 15(b) we place them at distance D between their centers. Numerically, the FDFD mode-solver simulations give κ through the frequency splitting of the normal modes of the combined system ($\delta_E$=2κ from Eq. (4)), which are even and odd superpositions of the initial single-disk modes; analytically, using the expressions for the separation-of-variables eigenfields $E_{1,2(r)}$ CMT gives κ through $$\kappa = \omega_1/2 \cdot \int d^3r \in_2(r) E_2^*(r) E_1(r) / \int d^3r \in(r) |E_1(r)|^2,$$

where $\in_j(r)$ and $\in(r)$ are the dielectric functions that describe only the disk j (minus the constant $\in_o$ background) and the whole space respectively. Then, for medium distances D/r=10–3 and for non-radiative coupling such that D<$2r_c$, where $r_c$=mλ/2π is the radius of the radiation caustic, the two methods agree very well, and we finally find, as shown in Table 8, strong-coupling factors in the range U~1-50. Thus, for the analyzed examples, the achieved figure-of-merit values are large enough to be useful for typical applications, as discussed below.

TABLE 8

| two disks | D/r | $Q^{rad}$ | Q = ω/2Γ | ω/2κ | κ/Γ |
|---|---|---|---|---|---|
| Re{∈} =147.7, | 3 | 2478 | 1989 | 46.5(47.5) | 42.4 (35.0) |
| m = 2 | 5 | 2411 | 1946 | 298.0 (298.0) | 6.5 (5.6) |
| λ/r = 20 | 7 | 2196 | 1804 | 769.7 (770.2) | 2.3(2.2) |
| $Q^{abs}$ ≈ 10093 | 10 | 2017 | 1681 | 1714 (1601) | 0.98 (1.04) |
| Re{∈}= 65.6, m = 3 | 3 | 7972 | 4455 | 144(140) | 30.9(34.3) |
| λ/r ≈ 10 | 5 | 9240 | 4824 | 2242 (2083) | 2.2(2.3) |
| $Q^{abs}$ ≈ 10096 | 7 | 9187 | 4810 | 7485 (7417) | 0.64 (0.65) |

Note that even though particular examples are presented and analyzed above as examples of systems that use resonant electromagnetic coupling for wireless energy transfer, those of self-resonant conducting coils, capacitively-loaded resonant conducting coils, inductively-loaded resonant conducting rods and resonant dielectric disks, any system that supports an electromagnetic mode with its electromagnetic energy extending much further than its size can be used for transferring energy. For example, there can be many abstract geometries with distributed capacitances and inductances that support the desired kind of resonances. In some examples, the resonant structure can be a dielectric sphere. In any one of these geometries, one can choose certain parameters to increase and/or optimize U or, if the Q's are limited by external factors, to increase and/or optimize for k or, if other system performance parameters are of importance, to optimize those.

Illustrative Example

In one example, consider a case of wireless energy transfer between two identical resonant conducting loops, labeled by $L_1$ and $L_2$. The loops are capacitively-loaded and couple inductively via their mutual inductance. Let $r_A$ denote the loops' radii, $N_A$ their numbers of turns, and $b_A$ the radii of the wires making the loops. We also denote by $D_{12}$ the center-to-center separation between the loops.

Resonant objects of this type have two main loss mechanisms: ohmic absorption and far-field radiation. Using the same theoretical method as in previous sections, we find that for $r_A$=7 cm, $b_A$=6 mm, and $N_A$=15 turns, the quality factors for absorption, radiation and total loss are respectively, $Q_{A,abs}=\pi f/\delta_{A,abs}=3.19\times10^4$, $Q_{A,rad}=\pi f/\Gamma_{A,rad}=2.6\times10^8$ and $Q_A=\pi f/\Gamma_A=2.84\times10^4$ at a resonant frequency $f=1.8\times10^7$ Hz (remember that $L_1$ and $L_2$ are identical and have the same properties). $\Gamma_{A,abs}$, $\Gamma_{A,rad}$ are respectively the rates of absorptive and radiative loss of $L_1$ and $L_2$, and the rate of coupling between $L_1$ and $L_2$ is denoted by $\kappa_{12}$.

Figure 17A:
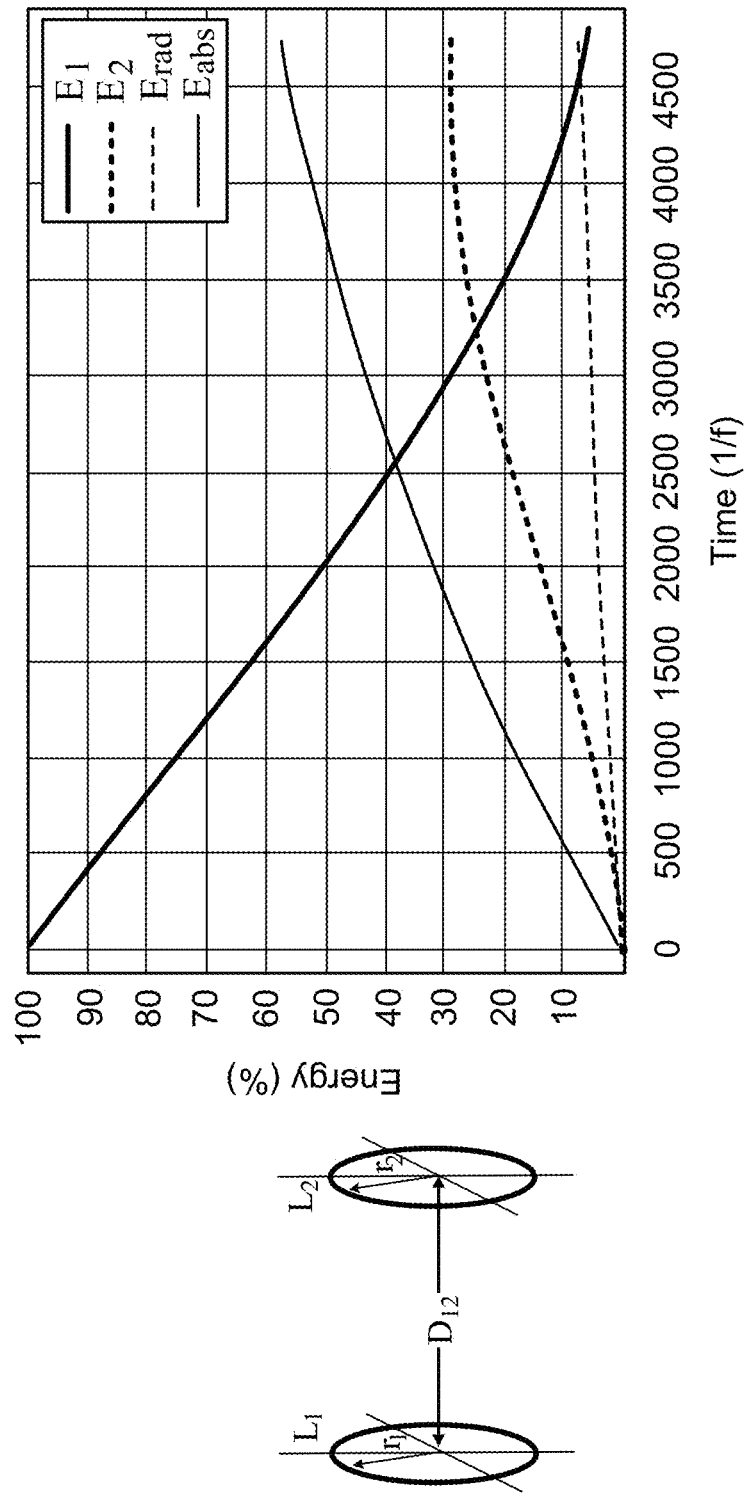
FIG. 17 shows an example of a wireless energy transfer system: (a) (Left) Schematic of loops configuration in two-object direct transfer. (Right) Time evolution of energies in the two-object direct energy transfer case. (b) (Left) Schematic of three-loops configuration in the constant-κ case. (Right) Dynamics of energy transfer for the configuration in (b. Left). Note that the total energy transferred $E_2$ is 2 times larger than in (a. Right), but at the price of the total energy radiated being 4 times larger. (c) (Left) Loop configuration at t=0 in the adiabatic-κ scheme. (Center) Dynamics of energy transfer with adiabatically rotating loops. (Right) Loop configuration at t=$t_{EIT}$. Note that $E_2$ is comparable to (b. Right), but the radiated energy is now much smaller: In fact, it is comparable to (a. Right).

When the loops are in fixed distinct parallel planes separated by $D_{12}$=1.4 m and have their centers on an axis (C) perpendicular to their planes, as shown in FIG. 17a(Left), the coupling factor for inductive coupling (ignoring retardation effects) is $k_{12} \equiv \kappa_{12}/\pi f=7.68\times10^{-5}$, independent of time, and thus the strong-coupling factor is $U_{12}=k_{12}Q_A=2.18$. This configuration of parallel loops corresponds to the largest possible coupling rate $\kappa_{12}$ at the particular separation $D_{12}$.

We find that the energy transferred to $L_2$ is maximum at time $T_*=\kappa t_*=\tan^{-1}(2.18)=1.14 \Rightarrow t_*=4775(1/f)$ from Eq. (5), and constitutes $\eta_{E*}$=29% of the initial total energy from Eq. (6a), as shown in FIG. 17a(Right). The energies radiated and absorbed are respectively $\eta_{rad,E}(t_*)$=7.2% and $\eta_{abs,E}(t_*)$=58.1% of the initial total energy, with 5.8% of the energy remaining in $L_1$.

We would like to be able to further increase the efficiency of energy transfer between these two resonant objects at their distance $D_{12}$. In some examples, one can use an intermediate resonator between the source and device resonators, so that energy is transferred more efficiently from the source to the device resonator indirectly through the intermediate resonator.

Figure 16:
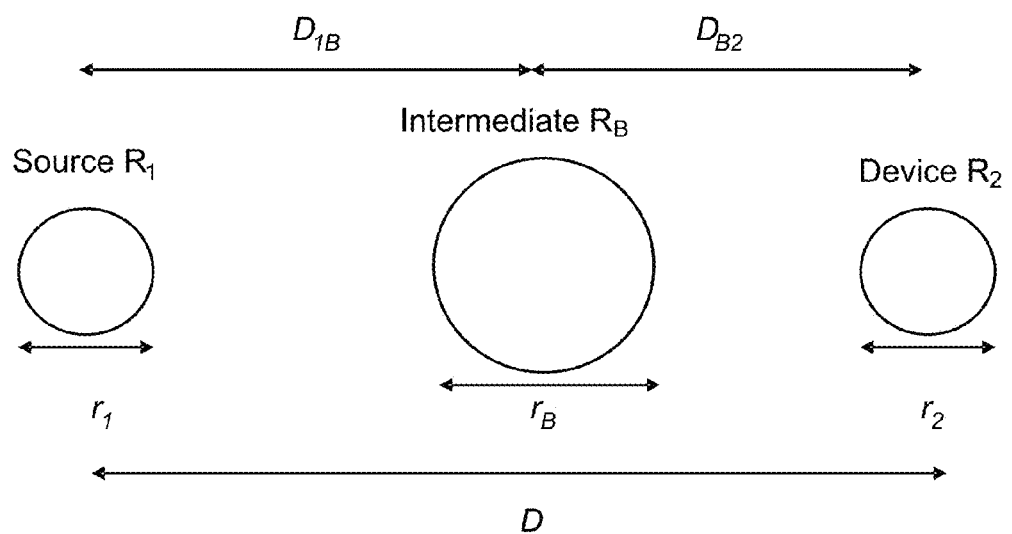
FIG. 16 shows a schematic of an example wireless energy transfer scheme with one source resonator and one device resonator exchanging energy indirectly through an intermediate resonator.

3. Efficient Energy-Transfer by a Chain of Three 'Strongly Coupled' Resonances FIG. 16 shows a schematic that generally describes one example of the invention, in which energy is transferred wirelessly among three resonant objects. Referring to FIG. 16, energy is transferred, over a distance $D_{1B}$, from a resonant source object $R_1$ of characteristic size $r_1$ to a resonant intermediate object $R_B$ of characteristic size $r_B$, and then, over an additional distance $D_{B2}$, from the resonant intermediate object $R_B$ to a resonant device object $R_2$ of characteristic size $r_2$, where $D_{1B}+D_{B2}=D$. As described above, the source object $R_1$ can be supplied power from a power generator that is coupled to the source object $R_1$. In some examples, the power generator can be wirelessly, e.g., inductively, coupled to the source object $R_1$. In some examples, the power generator can be connected to the source object $R_1$ by means of a wire or cable. Also, the device object $R_2$ can be connected to a power load that consumes energy transferred to the device object $R_2$. For example, the device object can be connected to e.g. a resistor, a battery, or other device. All objects are resonant objects. The wireless near-field energy transfer is performed using the field (e.g. the electromagnetic field or acoustic field) of the system of three resonant objects.

Different temporal schemes can be employed, depending on the application, to transfer energy among three resonant objects. Here we will consider a particularly simple but important scheme: a one-time finite-amount energy-transfer scheme

3.1 Finite-Amount Energy-Transfer Efficiency

Let again the source, intermediate and device objects be 1, B, 2 respectively and their resonance modes, which we will use for the energy exchange, have angular frequencies $\omega_{1,B,2}$, frequency-widths due to intrinsic (absorption, radiation etc.) losses $\Gamma_{1,B,2}$ and (generally) vector fields $F_{1,B,2}(r)$, normalized to unity energy. Once the three resonant objects are brought in proximity, they can interact and an appropriate analytical framework for modeling this resonant interaction is again that of the well-known coupled-mode theory (CMT), which can give a good description of the system for resonances having quality factors of at least, for example, 10. Then, using $e^{-i\omega t}$ time dependence, for the chain arrangement shown in FIG. 16, the field amplitudes can be shown to satisfy, to lowest order:

$$\frac{d}{dt}a_1(t) = -i(\omega_1 - i\Gamma_1)a_1(t) + i\kappa_{11}a_1(t) + i\kappa_{1B}a_B(t) \qquad (34)$$

$$\frac{d}{dt}a_B(t) = -i(\omega_B - i\Gamma_B)a_B(t) + i\kappa_{BB}a_B(t) + i\kappa_{B1}a_1(t) + i\kappa_{B2}a_2(t)$$

$$\frac{d}{dt}a_2(t) = -i(\omega_2 - i\Gamma_2)a_2(t) + i\kappa_{22}a_2(t) + i\kappa_{2B}a_B(t)$$

where $\kappa_{11,BB,22}$ are the shifts in each object's frequency due to the presence of the other, which are a second-order correction and can be absorbed into the eigenfrequencies by setting $\kappa_{1,B,2} \rightarrow \omega_{1,B,2} + \kappa_{11,BB,22}$, and $\kappa_{ij}$ are the coupling coefficients, which from the reciprocity requirement of the system must satisfy $\kappa_{ij}=\kappa_{ji}$. Note that, in some examples, the direct coupling coefficient $\kappa_{12}$ between the resonant objects 1 and 2 may be much smaller than the coupling coefficients $\kappa_{1B}$ and $\kappa_{B2}$ between these two resonant objects with the intermediate object B, implying that the direct energy transfer between 1 and 2 is substantially dominated by the indirect energy transfer through the intermediate object. In some examples, if the coupling rates $\kappa_{1B}$ and $\kappa_{B2}$ are at least 5 times larger than the direct coupling rate $\kappa_{12}$, using an intermediate resonator may lead to an improvement in terms of energy transfer efficiency, as the indirect transfer may dominate the direct transfer. Therefore, in the CMT Eqs. (34) above, the direct coupling coefficient $\kappa_{12}$ has been ignored, to analyze those particular examples.

The three resonant modes of the combined system are found by substituting $[a_1(t)\ a_B(t),\ a_2(t)]=[A_1,A_B,A_2]e^{-i\bar{\omega}t}$. When the resonators 1 and 2 are at exact resonance $\omega_1=\omega_2=\omega_A$ and for $\Gamma_1=\Gamma_2=\Gamma_A$, the resonant modes have complex resonant frequencies $$\bar{\omega}_\pm = \omega_{AB} \pm \sqrt{(\Delta\omega_{AB})^2 + \kappa_{1B}^2 + \kappa_{B2}^2} \text{ and } \bar{\omega}_{ds}=\omega_A - i\Gamma_A$$

where $\omega_{AB}=[(\omega_A+\omega_B)-i(\Gamma_A+\Gamma_B)]/2$, $\Delta\omega_{AB}=[(\omega_A-\omega_B)-i(\Gamma_A-\Gamma_B)]/2$ and whose splitting we denote as $\delta_E \equiv \bar{\omega}_+ - \bar{\omega}_-$, and corresponding resonant field amplitudes $$\vec{V}_\pm = \begin{bmatrix} A_1 \\ A_B \\ A_2 \end{bmatrix}_\pm = \begin{bmatrix} \kappa_{1B} \\ \Delta\omega_{AB} \mp \sqrt{(\Delta\omega_{AB})^2 + \kappa_{1B}^2 + \kappa_{B2}^2} \\ \kappa_{B2} \end{bmatrix} \qquad (35b)$$

and $$\vec{V}_{ds} = \begin{bmatrix} A_1 \\ A_B \\ A_2 \end{bmatrix}_{ds} = \begin{bmatrix} -\kappa_{B2} \\ 0 \\ \kappa_{1B} \end{bmatrix}$$

Note that, when all resonators are at exact resonance $\omega_1=\omega_2(=\omega_A)=\omega_B$ and for $\Gamma_1=\Gamma_2(=\Gamma_A)=\Gamma_B$, we get $\Delta\omega_{AB}=0$, $\delta_E=2\sqrt{\kappa_{1B}^2+\kappa_{B2}^2}$, and then $$\bar{\omega}_\pm = \omega_A \pm \sqrt{\kappa_{1B}^2 + \kappa_{B2}^2} - i\Gamma_A \qquad (36a)$$

and $$\bar{\omega}_{ds} = \omega_A - i\Gamma_A$$

-continued $$\vec{V}_\pm = \begin{bmatrix} A_1 \\ A_B \\ A_2 \end{bmatrix}_\pm = \begin{bmatrix} \kappa_{1B} \\ \mp\sqrt{\kappa_{1B}^2 + \kappa_{B2}^2} \\ \kappa_{B2} \end{bmatrix} \quad (36b)$$

and $$\vec{V}_{ds} = \begin{bmatrix} A_1 \\ A_B \\ A_2 \end{bmatrix}_{ds} = \begin{bmatrix} -\kappa_{B2} \\ 0 \\ \kappa_{1B} \end{bmatrix},$$

namely we get that the resonant modes split to a lower frequency, a higher frequency and a same frequency mode.

Assume now that at time t=0 the source object 1 has finite energy $|a_1(0)|^2$, while the intermediate and device objects have $|a_B(0)|^2=|a_2(0)|^2=0$. Since the objects are coupled, energy will be transferred from 1 to B and from B to 2. With these initial conditions, Eqs. (34) can be solved, predicting the evolution of the field-amplitudes. The energy-transfer efficiency will be $\tilde{\eta}_E \equiv |a_2(t)|^2/|a_1(0)|^2$. The ratio of energy converted to loss due to a specific loss mechanism in resonators 1, B and 2, with respective loss rates $\Gamma_{1,loss}$, $\Gamma_{B,loss}$ and $\Gamma_{2,loss}$ will be $\tilde{\eta}_{loss,E}=\int_0^t d\tau [2\Gamma_{1,loss}|a_1(\tau)|^2+2\Gamma_{B,loss}|a_B(\tau)|^2+2\Gamma_{2,loss}|a_2(\tau)|^2]/|a_1(0)|^2$. At exact resonance $\omega_1=\omega_2(=\omega_A)=\omega_B$ (an optimal condition) and in the special symmetric case $\Gamma_1=\Gamma_2=\Gamma_A$ and $\kappa_{1B}=\kappa_{B2}=\kappa$, the field amplitudes are $$a_1(\tilde{T}) = \quad (37a)$$
$$\frac{1}{2}e^{-i\omega_A t}e^{-\tilde{T}/\tilde{U}}\left[\tilde{\Delta}\frac{\sin\left(\sqrt{1-\tilde{\Delta}^2}\,\tilde{T}\right)}{\sqrt{1-\tilde{\Delta}^2}}+\cos\left(\sqrt{1-\tilde{\Delta}^2}\,\tilde{T}\right)+e^{-\tilde{\Delta}\tilde{T}}\right]$$

$$a_B(\tilde{T}) = \frac{1}{2}e^{-i\omega_A t}e^{-\tilde{T}/\tilde{U}}\frac{\sin\left(\sqrt{1-\tilde{\Delta}^2}\,\tilde{T}\right)}{\sqrt{1-\tilde{\Delta}^2}} \quad (37b)$$

$$a_2(\tilde{T}) = \quad (37c)$$
$$\frac{1}{2}e^{-i\omega_A t}e^{-\tilde{T}/\tilde{U}}\left[\tilde{\Delta}\frac{\sin\left(\sqrt{1-\tilde{\Delta}^2}\,\tilde{T}\right)}{\sqrt{1-\tilde{\Delta}^2}}+\cos\left(\sqrt{1-\tilde{\Delta}^2}\,\tilde{T}\right)-e^{-\tilde{\Delta}\tilde{T}}\right]$$

where $\tilde{T} \equiv \sqrt{2}\kappa t$, $\tilde{\Delta}^{-1}=2\sqrt{2}\kappa/(\Gamma_B-\Gamma_A)$ and $\tilde{U}=2\sqrt{2}\kappa/(\Gamma_A+\Gamma_B)$.

In some examples, the system designer can adjust the duration of the coupling t at will. In some examples, the duration t can be adjusted to maximize the device energy (and thus efficiency $\eta_E$). Then, in the special case above, it can be inferred from Eq. (37c) that $\tilde{\Gamma}_E$ is maximized for the $\tilde{T}=\tilde{T}_*$ that satisfies $$[\tilde{\Delta}-\tilde{U}(1-\tilde{\Delta}^2)]\frac{\sin\left(\sqrt{1-\tilde{\Delta}^2}\,\tilde{T}\right)}{\sqrt{1-\tilde{\Delta}^2}}+ \quad (38)$$
$$(1-\tilde{\Delta}\tilde{U})\left[\cos\left(\sqrt{1-\tilde{\Delta}^2}\,\tilde{T}\right)-e^{-\tilde{\Delta}\tilde{T}}\right]=0.$$

In general, this equation may not have an obvious analytical solution, but it does admit a simple solution in the following two cases:

When $\Gamma_A=\Gamma_B \Leftrightarrow \tilde{\Delta}=0$, $\tilde{U}=\sqrt{2}\kappa/\Gamma_B$, the energy transfer from resonator 1 to resonator 2 is maximized at $$\tilde{T}_*(\tilde{\Delta}=0)=2\tan^{-1}\tilde{U} \quad (39)$$

resulting in an energy-transfer efficiency $$\tilde{\eta}_E(\tilde{T}_*,\tilde{\Delta}=0)=\left[\frac{\tilde{U}^2}{1+\tilde{U}^2}\exp\left(-\frac{2\tan^{-1}\tilde{U}}{\tilde{U}}\right)\right]^2, \quad (40)$$

which has the form of the two-object energy-transfer efficiency of Eq. (6b) but squared.

When $\Gamma_A=0 \Leftrightarrow \tilde{\Delta}^{-1}=\tilde{U}=2\sqrt{2}\kappa/\Gamma_B$, the energy transfer from resonator 1 to resonator 2 is maximized at $$\tilde{T}_*(\tilde{\Delta}^{-1}=\tilde{U})=\begin{cases} \pi\tilde{U}/\sqrt{\tilde{U}^2-1}, & \tilde{U}>1 \\ \infty, & \tilde{U}\leq 1 \end{cases} \quad (41)$$

resulting in an energy-transfer efficiency $$\eta_E(\tilde{T}_*,\tilde{\Delta}^{-1}=\tilde{U})=\frac{1}{4}\cdot\begin{cases} [1+\exp\left(-\pi/\sqrt{\tilde{U}^2-1}\right)]^2, & \tilde{U}>1 \\ 1, & \tilde{U}\leq 1. \end{cases} \quad (42)$$

In both cases, and in general for any $\tilde{\Delta}$, the efficiency is an increasing function of $\tilde{U}$. Therefore, once more resonators that have high quality factors are preferred. In some examples, one may design resonators with Q>50. In some examples, one may design resonators with Q>100.

Illustrative Example

Figure 17B:
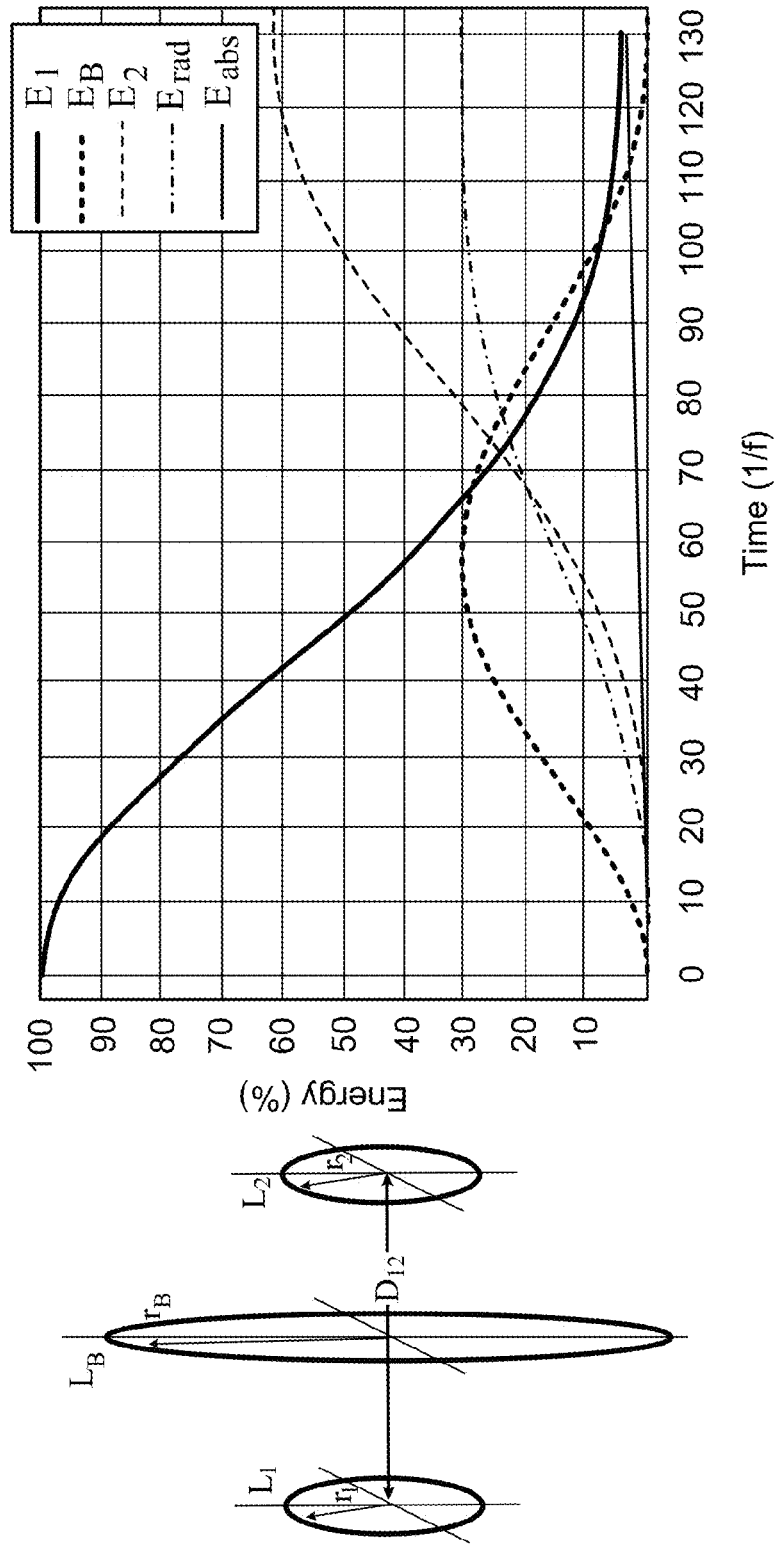

Returning to our illustrative example, in order to improve the ~29% efficiency of the energy transfer from $L_1$ to $L_2$, while keeping the distance $D_{12}$ separating them fixed, we propose to introduce an intermediate resonant object that couples strongly to both $L_1$ and $L_2$, while having the same resonant frequency as both of them. In one example, we take that mediator to also be a capacitively-loaded conducting-wire loop, which we label by $L_B$. We place $L_B$ at equal distance ($D_{1B}=D_{B2}=D_{12}/2=0.7$ m) from $L_1$ and $L_2$ such that its axis also lies on the same axis (C), and we orient it such that its plane is parallel to the planes of $L_1$ and $L_2$, which is the optimal orientation in terms of coupling. A schematic diagram of the three-loops configuration is depicted in FIG. 17b(Left).

In order for $L_B$ to couple strongly to $L_1$ and $L_2$, its size needs to be substantially larger than the size of $L_1$ and $L_2$. However, this increase in the size of $L_B$ has considerable drawback in the sense that it may also be accompanied by significant decrease in its radiation quality factor. This feature may often occur for the resonant systems of this type: stronger coupling can often be enabled by increasing the objects' size, but it may imply stronger radiation from the object in question. Large radiation may often be undesirable, because it could lead to far-field interference with other RF systems, and in some systems also because of safety concerns. For $r_B=70$ cm, $b_B=1.5$ cm, and $N_B=1$ turn, we get $Q_{B,abs}=\pi f/\Gamma_{B,abs}=7706$, $Q_{B,rad}=\pi f/\Gamma_{B,rad}=400$, so $Q_B=\pi f/\Gamma_B=380$, and $k_{1B}\equiv\kappa_{1B}\pi f=k_{B2}=0.0056$, so $\tilde{U}=2\sqrt{2}\kappa/(\Gamma_A+\Gamma_B)=5.94$ and $\tilde{\Delta}^{-1}=2\sqrt{2}\kappa/(\Gamma_B-\Gamma_A)=6.1$, at $f=1.8\times 10^7$ Hz. Note that since the coupling rates $\kappa_{1B}$ and $\kappa_{B2}$ are ≈70 times larger than $\kappa_{12}$, indeed we can ignore the direct coupling between $L_1$ and $L_2$, and focus only on the indirect energy transfer through the intermediate loop $L_B$, therefore the analysis of the previous section can be used.

The optimum in energy transferred to $L_2$ occurs at time $\tilde{T}_* = \sqrt{2}\kappa t_* = 3.21 \Rightarrow t_* = 129(1/f)$, calculated from Eq. (38), and is equal to $\tilde{\eta}_{E*} = 61.5\%$ of the initial energy from Eq. (37c). [Note that, since $Q_A \gg Q_B$, we could have used the analytical conclusions of the case $\tilde{\Delta}^{-1} = \tilde{U}$ and then we would have gotten a very close approximation of $\tilde{T}_* = 3.19$ from Eq. (41).] The energy radiated is $\tilde{\eta}_{rad,E}(t_*) = 31.1\%$, while the energy absorbed is $\tilde{\eta}_{abs,E}(t_*) = 3.3\%$, and 4.1% of the initial energy is left in $L_1$. Thus, the energy transferred, now indirectly, from $L_1$ to $L_2$ has increased by factor of 2 relative to the two-loops direct transfer case. Furthermore, the transfer time in the three-loops case is now $\approx 35$ times shorter than in the two-loops direct transfer, because of the stronger coupling rate. The dynamics of the energy transfer in the three-loops case is shown in FIG. 17b(Right).

Note that the energy radiated in the three-loop system has undesirably increased by factor of 4 compared to the two-loop system. We would like to be able to achieve a similar improvement in energy-transfer efficiency, while not allowing the radiated energy to increase. In this specification, we disclose that, in some examples, this can be achieved by appropriately varying the values of the coupling strengths between the three resonators.

4. Efficient Energy-Transfer by a Chain of Three Resonances with Adiabatically Varying Coupling Strengths Consider again the system of a source resonator $R_1$, a device resonator $R_2$ and an intermediate resonator $R_B$. For the purposes of the present analysis, $R_1$ and $R_2$ will be assumed to have negligible mutual interactions with each other, while each of them can be strongly coupled to $R_B$, with coupling rates $\kappa_{1B}$ and $\kappa_{B2}$ respectively. Note that, in some examples of wireless energy transfer systems, for the resonant object $R_B$ to be able to have strong coupling with other resonant objects, it may be accompanied with inferior loss properties compared to $R_1$ and $R_2$, usually in terms of substantially larger radiation losses.

Figure 20:
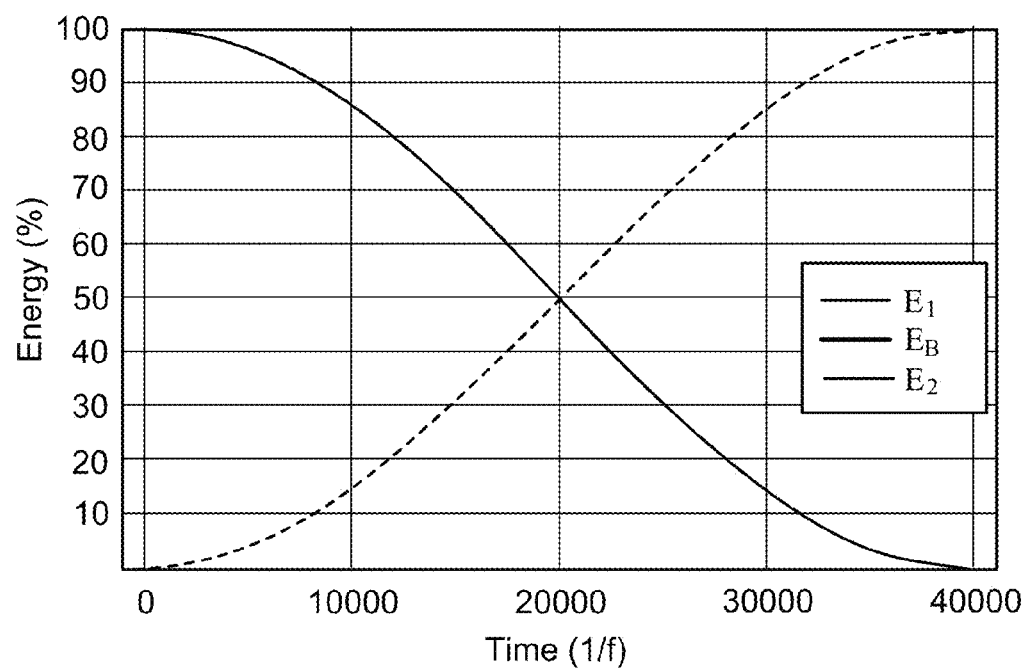
FIG. 20 shows the energy distribution in a wireless energy transfer system as in FIG. 18 as a function of time when the coupling rates are time-varying, for $\Gamma_A=0$, $\kappa/\Gamma_B=10$, $\kappa_{1B}=\kappa \sin[\pi t/(2t_{EIT})]$, and $\kappa_{B2}=\kappa \cos[\pi t/(2t_{EIT})]$.

It was seen in a previous section that, when the resonators 1 and 2 are at exact resonance $\omega_1 = \omega_2 = \omega_A$ and for $\Gamma_1 = \Gamma_2 = \Gamma_A$, the system supports a resonant state (eigenstate) with resonant frequency (eigenfrequency) $\bar{\omega}_{ds} = \omega_A - i\Gamma_A$ and resonant field amplitudes $\vec{V}_{ds} = [-\kappa_{B2} \ 0 \ \kappa_{1B}]^T / \sqrt{\kappa_{1B}^2 + \kappa_{B2}^2}$, where here we normalized it. This eigenstate $\vec{V}_{ds}$ we call the "dark state" in analogy with atomic systems and the related phenomenon of Electromagnetically Induced Transparency (EIT), wherein complete population transfer between two quantum states through a third lossy state, coupled to each of the other two states, is enabled. The dark state is the most essential building block of our proposed efficient weakly-radiative energy-transfer scheme, because it has no energy at all in the intermediate (lossy) resonator $R_B$, i.e. $a_B(t) = 0 \forall t$ whenever the three-object system is in state $\vec{V}_{ds}$. In fact, if $\Gamma_A \to 0$, then this state is completely lossless, or if $\Gamma_{A,rad} \to 0$, then this state is completely non-radiative. Therefore, we disclose using predominantly this state to implement the wireless energy transfer. By doing that, the proposed energy transfer scheme can be made completely lossless, in the limit $\Gamma_A \to 0$, no matter how large is the loss rate $\Gamma_B$ as shown in FIG. 20, or completely non-radiative, in the limit $\Gamma_{A,rad} \to 0$, no matter how large is the radiative loss rate $\Gamma_{B,rad}$. Since the energy transfer efficiency increases as the quality factors of the first (source) and second (device) resonances increase, one may design these resonators to have a high quality factor. In some examples, one may design resonators with $Q_A > 50$. In some examples, one may design resonators with $Q_A > 100$.

Let us demonstrate how it is possible to use the dark state for energy transfer with minimal loss. From the expression of $\vec{V}_{ds}$ one can see that, if the three-object system is in the state $\vec{V}_{ds}$, then, in general, there is energy in the source resonator with field amplitude proportional to the coupling rate $\kappa_{B2}$ between the device resonator and the intermediate resonator, and there is also energy in the device resonator with field amplitude proportional to the coupling rate $\kappa_{1B}$ between the source resonator and the intermediate resonator. Then, $\kappa_{1B} = 0$ corresponds to all the system's energy being in $R_1$, while $\kappa_{B2} = 0$ corresponds to all the system's energy being in $R_2$.

Figure 17C:
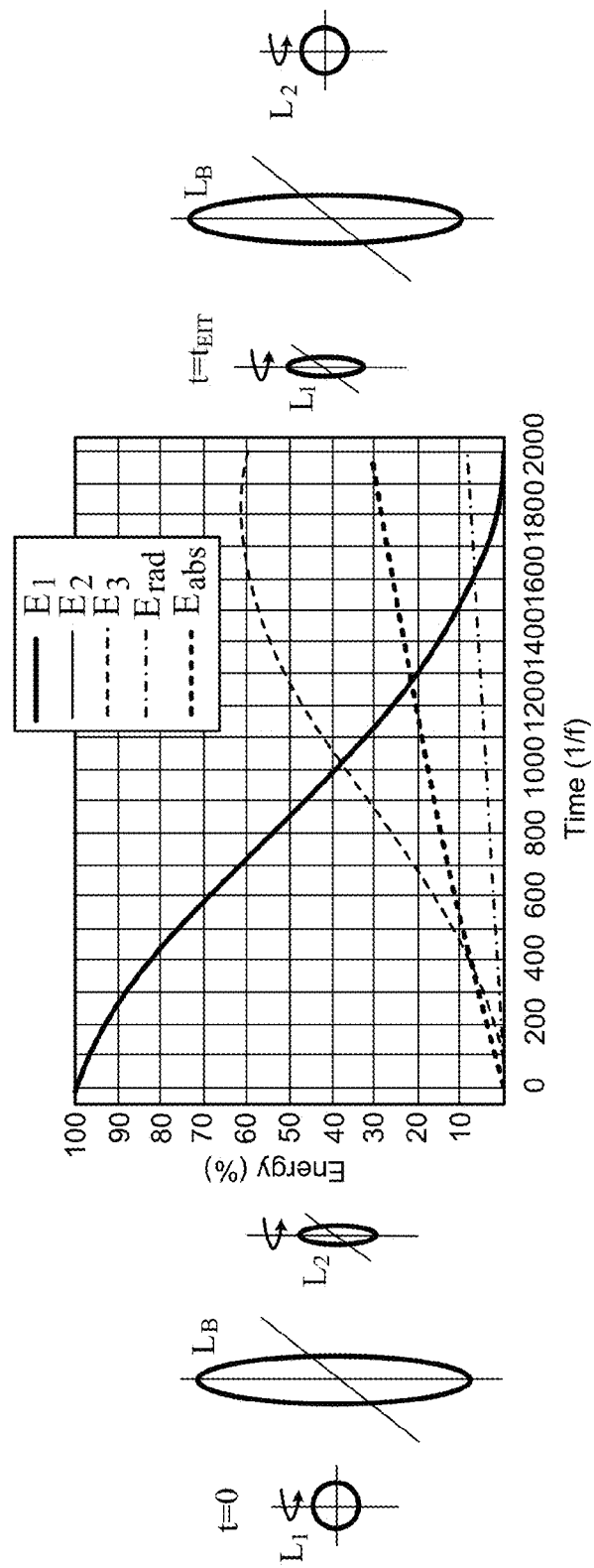

So, the important considerations necessary to achieve efficient weakly-radiative energy transfer, consist of preparing the system initially in state $\vec{V}_{ds}$ and varying the coupling rates in time appropriately to evolve this state $\vec{V}_{ds}$ in a way that will cause energy transfer. Thus, if at $t=0$ all the energy is in $R_1$, then one should have $\kappa_{1B}(t=0) \ll \kappa_{B2}(t=0)$, for example $\kappa_{1B}(t=0)=0$ and $\kappa_{B2}(t=0) \neq 0$. In order for the total energy of the system to end up in $R_2$, at a time $t_{EIT}$ when the full variation of the coupling rates has been completed, we should have $\kappa_{1B}(t=t_{EIT}) \gg \kappa_{B2}(t=t_{EIT})$, for example $\kappa_{1B}(t=t_{EIT}) \neq 0$ and $\kappa_{B2}(t=t_{EIT})=0$. This ensures that the initial and final states of the three-object system are parallel to $\vec{V}_{ds}$. However, a second important consideration is to keep the three-object system at all times in $\vec{V}_{ds}(t)$, even as $\kappa_{1B}(t)$ and $\kappa_{B2}(t)$ are varied in time. This is crucial in order to prevent the system's energy from getting into any of the two other eigenstates $\vec{V}_\pm$ and thus getting into the intermediate object $R_B$, which may be highly radiative or lossy in general, as in the example of FIG. 17. This consideration requires changing $\kappa_{1B}(t)$ and $\kappa_{B2}(t)$ slowly enough so as to make the entire three-object system adiabatically follow the time evolution of $\vec{V}_{ds}(t)$. The criterion for adiabatic following can be expressed, in analogy to the population transfer case as $$\left| \left\langle \vec{V}_\pm \left| \frac{d\vec{V}_{ds}}{dt} \right\rangle \right| \ll |\bar{\omega}_\pm - \bar{\omega}_{ds}| \tag{43}$$

where $\vec{V}_\pm$ are the remaining two eigenstates of the system, with corresponding eigenvalues $\bar{\omega}_\pm$, as shown earlier. Note that any functional dependence of the coupling rates with time (with duration parameter $t_{EIT}$) will work, provided it satisfies the adiabaticity criterion Eq. (43) above. The time functional can be linear, sinusoidal (as in the illustrative example to follow) or the temporal analog of a Butterworth (maximally flat) taper, a Chebyshev taper, an exponential taper and the like.

Figure 18:
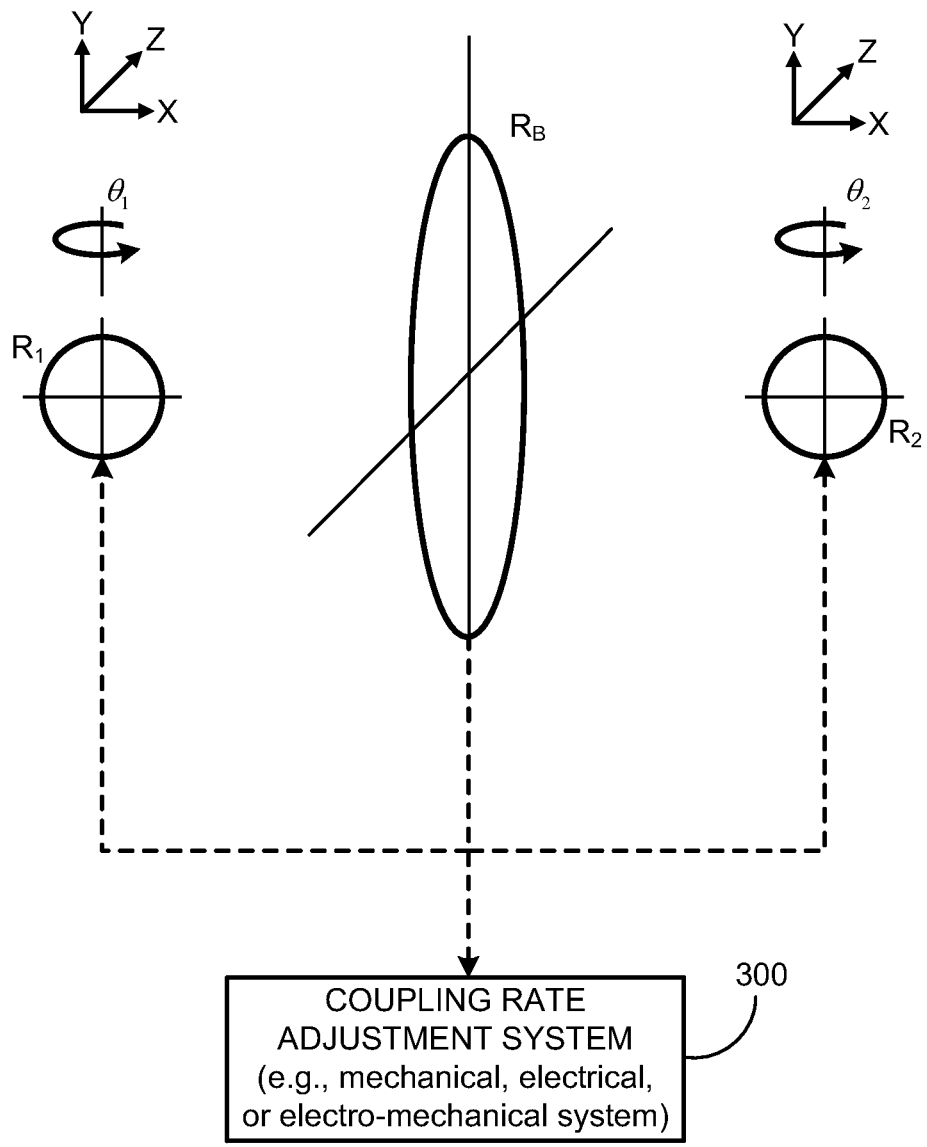
FIG. 18 shows a schematic of an example wireless energy transfer scheme with one source resonator and one device resonator exchanging energy indirectly through an intermediate resonator, where an adjustment system is used to rotate the resonator structures to dynamically adjust their coupling rates.

Referring to FIG. 18, an example coupling rate adjustment system 300 for adjusting coupling rates for the one or more of the resonator structures $R_1$, $R_2$, or $R_B$ is shown. As described, the coupling rates between the first and intermediate resonator structures and the intermediate and second resonator structures are characterized by $\kappa_{1B}$ and $\kappa_{B2}$ respectively. These coupling rates, $\kappa_{1B}$ and $\kappa_{B2}$, are several times (e.g., 70 times) greater than the coupling rate $\kappa_{12}$ between the first and second resonator structure. In some examples, the coupling rate adjustment system can be a mechanical, electrical, or electro-mechanical system 300 for dynamically adjusting, e.g., rotating, or effecting a translational movement (X, Y, Z), of the one or more resonator structures with respect to each other.

In some examples, the coupling rate $\kappa_{1B}$ is much smaller than the coupling rate the coupling rate $\kappa_{B2}$ at the beginning of the energy transfer. By the end, i.e., when a substantial amount of energy has been transferred from the first resonator structure $R_1$ to the second resonator structure, $R_2$, the coupling rate $\kappa_{1B}$ is much greater than the coupling rate $\kappa_{B2}$. In some examples, the coupling rate $\kappa_{1B}$ can be set to a fixed value while the coupling rate $\kappa_{B2}$ is being varied from its maximum to its minimum value. In some examples, the coupling rate $\kappa_{B2}$ can be set to a fixed value while the coupling rate $\kappa_{1B}$ is being varied from its minimum to its maximum value. In some examples, the coupling rate $\kappa_{1B}$ can be varied from a minimum to a maximum value while the coupling rate $\kappa_{B2}$ is being varied from its maximum to minimum value.

Figure 19:
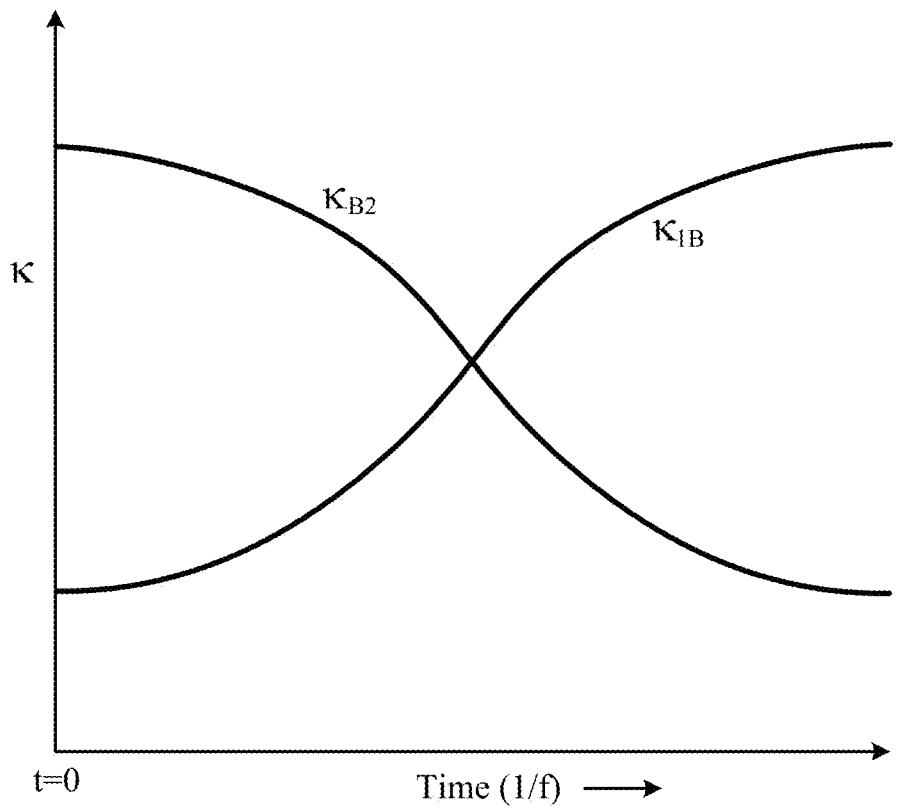
FIG. 19 shows an example of a temporal variation of the coupling rates in a wireless energy transfer system as in FIG. 18 to achieve an adiabatic transfer of energy from the source object $R_1$ to the device object $R_2$.

Referring now to FIG. 19, a graph for implementing an example coupling rate adjustment system 300 is shown. As shown, in some examples, the coupling rate $\kappa_{1B}$ is set at its minimum value at time, t=0, and increased as a function of time (see, for example, equation 44), while the coupling rate $\kappa_{B2}$ is at its maximum value at t=0 and decreased as a function of time (see, for example, equation 45). Accordingly, at the beginning (t=0), the value of $\kappa_{1B}$ is much smaller than the value of $\kappa_{B2}$. In some examples, the value of $\kappa_{1B}$ can be selected to be any value much smaller than the value of $\kappa_{B2}$ During the wireless energy transfer, the value of $\kappa_{1B}$ is increased, while the value of $\kappa_{B2}$ is decreased. After a predetermined amount of time $t_{EIT}$ has elapsed (e.g., after a substantial amount of energy has been transferred to the second resonator), the value of $\kappa_{1B}$ becomes much greater than the value of $\kappa_{B2}$.

In some implementations, the coupling rate adjustment system 300 can effect an adjustment of coupling rates between the resonator structures by changing a relative orientation of one or more of the resonator structures with respect to each other. For example, referring again to FIG. 18, the first and second resonator structures, $R_1$ and $R_2$, can be rotated about their respective axes (e.g., varying angles $\theta_1$ and $\theta_2$), with respect to the intermediate resonator structure $R_B$ to simultaneously change $\kappa_{1B}$ and $\kappa_{B2}$. Alternatively, the orientation of the intermediate resonator structure, $R_B$, can be adjusted, e.g., rotated about an axis, with respect to the first and second resonator structures to simultaneously change $\kappa_{1B}$ and $\kappa_{B2}$. Alternatively, the orientation of only the first resonator structure $R_1$ can be rotated about its respective axis to change $\kappa_{1B}$, while the orientations of $R_2$ and $R_B$ are fixed and thus $\kappa_{B2}$ is fixed to a value intermediate between the minimum and maximum values of $\kappa_{1B}$. Alternatively, the orientation of only the second resonator structure $R_2$ can be rotated about its respective axis to change $\kappa_{B2}$, while the orientations of $R_1$ and $R_B$ are fixed and thus $\kappa_{1B}$ is fixed to a value intermediate between the minimum and maximum values of $\kappa_{B2}$.

In some implementations, the coupling rate adjustment system 300 can effect an adjustment of coupling rates between the resonator structures by translationally moving one or more of the resonator structures with respect to each other. For example, the positions of the first and second resonator structures, $R_1$ and $R_2$, can be adjusted, e.g., moved along an axis, with respect to the intermediate resonator structure $R_B$ to simultaneously change $\kappa_{1B}$ and $\kappa_{B2}$. Alternatively, a position of the intermediate resonator structure, $R_B$, can be adjusted, e.g., moved along an axis, with respect to the first and second resonator structures to simultaneously change $\kappa_{1B}$ and $\kappa_{B2}$. Alternatively, a position of only the first resonator structure, $R_1$, can be adjusted, e.g., moved along an axis, with respect to the intermediate $R_B$ resonator structure to change $\kappa_{1B}$, while the positions of $R_2$ and $R_B$ are fixed and thus $\kappa_{B2}$ is fixed to a value intermediate between the minimum and maximum values of $\kappa_{1B}$. Alternatively, a position of only the second resonator structure, $R_2$, can be adjusted, e.g., moved along an axis, with respect to the intermediate $R_B$ resonator structure to change $\kappa_{B2}$, while the positions of $R_1$ and $R_B$ are fixed and thus $\kappa_{1B}$ is fixed to a value intermediate between the minimum and maximum values of $\kappa_{B2}$.

In some examples, the coupling rate adjustment system 300 can dynamically adjust an effective size of the resonator objects to effect adjustments in the coupling rates $\kappa_{1B}$ and $\kappa_{B2}$ similar to that described above. The effective size can be adjusted by changing a physical size of the resonator objects. For example, the physical size can be adjusted by effecting mechanical changes in area, length, or other physical aspect of one or more of the resonator structures. The effective size can also be adjusted through non-mechanical changes, such as, but not limited to, applying a magnetic field to change the permeability of the one or more of the resonator structures.

In principle, one would think of making the transfer time $t_{EIT}$ as long as possible to ensure adiabaticity. However there is limitation on how slow the transfer process can optimally be, imposed by the losses in $R_1$ and $R_2$. Such a limitation may not be a strong concern in typical atomic EIT case, because the initial and final states there can be chosen to be non-lossy ground states. However, in our case, losses in $R_1$ and $R_2$ are not avoidable, and can be detrimental to the energy transfer process whenever the transfer time $t_{EIT}$ is not less than $1/\Gamma_A$. This is because, even if the three-object system is carefully kept in $\vec{V}_{ds}$ at all times, the total energy of the system will decrease from its initial value as a consequence of losses in $R_1$ and $R_2$. Thus the duration of the transfer may be a compromise between these two limits: the desire to keep $t_{EIT}$ long enough to ensure near-adiabaticity, but short enough not to suffer from losses in $R_1$ and $R_2$.

Given a particular functional variation of the coupling rates with time with variation duration parameter $t_{EIT}$, one may calculate the optimal energy transfer efficiency in the following way: First, for each $t_{EIT}$, determine the optimal time $t_*$, at which the energy at $R_2$ is maximized and the transfer process may be terminated. Then find the optimal variation time $t_{EIT*}$ based on the counteracting mechanisms discussed above. The optimal efficiency of energy transfer $\tilde{\eta}_{EIT,E*}$ can then be calculated. In most cases, this procedure may need to be done numerically using the CMT Eqs. (34) as analytical solutions may not be possible. With respect to optimizing the functional dependence of the coupling rates with time, one may choose one that minimizes the coupling of energy to the eigenstates $\vec{V}_\pm$ for a given $t_{EIT}$, which may lead to the temporal analog of a Chebyshev taper.

In some examples, the optimal $t_{EIT}$ may not be long enough for the adiabadicity criterion of Eq. (43) to be always satisfied. In those cases, some energy may get into at least one of the lossy states $\vec{V}_\pm$. Still significant improvement in efficiency and radiation loss may be achieved by the mode of operation where the coupling rates are variable, compared to the mode of operation where the coupling rates are constant, provided the maximum energy that enters the states $\vec{V}_\pm$ is much less in the variable rate scenario than in the constant rate scenario. In examples, using the proposed scheme of time-varying coupling rates may be advantageous as long as the maximum energy stored in the intermediate resonator is substantially small. In some examples, substantially small may be at most 5% of the peak total energy of the system. In some examples, substantially small may be at most 10% of the peak total energy of the system.

We can now also see why the mode of operation of the system where the coupling rates are kept constant in time may cause a considerable amount of lost (and especially radiated) energy, compared to the proposed mode of operation where the coupling rates are varied adiabatically in time. The reason is that, when $\kappa_{1B}=\kappa_{B2}=$const, the energies in $R_1$ and $R_2$ will always be equal to each other if the three-object system is to stay in $\vec{V}_{as}$. So one cannot transfer energy from $R_1$ to $R_2$ by keeping the system purely in state $\vec{V}_{ds}$; note that even the initial state of the system, in which all the energy is in $R_1$ and there is no energy in $R_3$, cannot be solely in $\vec{V}_{ds}$ for fixed nonzero $\kappa_{1B}$ and $\kappa_{B2}$, and has nonzero components along the eigenstates $\vec{V}_\pm$ which implies a finite energy will build up in $R_B$, and consequently result in an increased radiation, especially if $\Gamma_{B,rad} \gg \Gamma_{A,rad}$, which may be the case if the resonator $R_B$ is chosen large enough to couple strongly to $R_1$ and $R_2$, as explained earlier.

Illustrative Example

The previous analysis explains why a considerable amount of energy was radiated when the inductive coupling rates of the loops were kept constant in time, like in FIG. 17b. Let us now consider the modifications necessary for an adiabatically-varied-K three-loops indirect transfer scheme, as suggested in the previous section, aiming to reduce the total radiated energy back to its reasonable value in the two-loops direct transfer case (FIG. 17a), while maintaining the total energy transfer at level comparable to the constant-κ three-loops indirect transfer case (FIG. 17b). In one example, shown in FIG. 17c(Left and Right), we will keep the orientation of $L_B$ fixed, and start initially (t=0) with $L_1$ perpendicular to $L_B$ for $\kappa_{1B}=0$ and $L_2$ parallel to $L_B$ for $\kappa_{B2}=$max, then uniformly rotate $L_1$ and $L_2$, at the same rates, until finally, at (t=$t_{EIT}$), $L_1$ becomes parallel to $L_B$ for $\kappa_{1B}=$max and $L_2$ perpendicular to $L_B$ for $\kappa_{B2}=0$, where we stop the rotation process. In this example, we choose a sinusoidal temporal variation of the coupling rates:

$$\kappa_{1B}(t) = \kappa \sin(\pi t/2t_{EIT}) \quad (44)$$

$$\kappa_{B2}(t) = \kappa \cos(\pi t/2t_{EIT}) \quad (45)$$

for $0<t<t_{EIT}$, and $k_{1B}\equiv\kappa_{1B}/\pi f=k_{B2}=0.0056$ as before. By using the same CMT analysis as in Eq. (34), we find, in FIG. 17c(Center), that for an optimal $t_{EIT*}=1989(1/f)$, an optimum transfer of $\eta_{EIT,E*}=61.2\%$ can be achieved at $t_*=1796(1/f)$, with only 8.2% of the initial energy being radiated, 28.6% absorbed, and 2% left in $L_1$. This is quite remarkable: by simply rotating the loops during the transfer, the energy radiated has dropped by factor of 4, while keeping the same 61% level of the energy transferred.

This considerable decrease in radiation may seem surprising, because the intermediate resonator $L_B$, which mediates all the energy transfer, is highly radiative (≈650 times more radiative than $L_1$ and $L_2$), and there is much more time to radiate, since the whole process lasts 14 times longer than in FIG. 17b. Again, the clue to the physical mechanism behind this surprising result can be obtained by observing the differences between the curves describing the energy in $R_B$ in FIG. 17b and FIG. 17c. Unlike the case of constant coupling rates, depicted in FIG. 17b, where the amount of energy ultimately transferred to $L_2$ goes first through the intermediate loop $L_B$, with peak energy storage in $L_B$ as much as 30% of the peak total energy of the system, in the case of time-varying coupling rates, shown in FIG. 17c, there is almost little or no energy in $L_B$ at all times during the transfer. In other words, the energy is transferred quite efficiently from $L_i$ to $L_2$, mediated by $L_B$ without considerable amount of energy ever being in the highly radiative intermediate loop $L_B$. (Note that direct transfer from $L_1$ to $L_2$ is identically zero here since $L_1$ is always perpendicular to $L_2$, so all the energy transfer is indeed mediated through $L_B$). In some examples, improvement in efficiency and/or radiated energy can still have been accomplished if the energy transfer had been designed with a time $t_{EIT}$ smaller than its optimal value (perhaps to speed up the process), if the maximum energy accumulated inside the intermediate resonator was less than 30%. For example, improvement can have been achieved for maximum energy accumulation inside the intermediate resonator of 5% or even 10%.

An example implementation of the coupling rate adjustment system 300 is described below, where the resonators are capacitively-loaded loops, which couple to each other inductively. At the beginning (t=0), the coupling rate adjustment system 300 sets the relative orientation of the first resonator structure $L_1$ to be perpendicular to the intermediate resonator structure $L_B$. At this orientation, the value of the coupling rate $\kappa_{1B}$ between the first and intermediate resonator structure is at its minimum value. Also, the coupling rate adjustment system 300 can set the relative orientation of the second resonator structure $L_2$ to be parallel to the intermediate resonator structure $L_B$. At this orientation, the value of the coupling rate $\kappa_{B2}$ is at a maximum value. During wireless energy transfer, the coupling rate adjustment system 300 can effect the rotation of the first resonator structure $L_1$ about its axis so that the value of $\kappa_{1B}$ is increased. In some examples, the coupling rate adjustment system 300 can also effect the rotation of the second resonator structure, $L_2$, about its axis so that the value of $\kappa_{B2}$ is decreased. In some examples, a similar effect can be achieved by fixing $L_1$ and $L_2$ to be perpendicular to each other and rotating only $L_B$ to be parallel to $L_2$ and perpendicular to $L_1$ at t=0 and parallel to $L_1$ and perpendicular to $L_2$ at t=$t_{EIT}$. In some examples, a similar effect can be achieved by fixing $L_B$ and one of $L_1$ and $L_2$ (e.g., $L_1$) at a predetermined orientation (e.g. at 45 degrees with respect to the intermediate resonator $L_B$) and rotating only the other of $L_1$ and $L_2$ (e.g., $L_2$ from parallel to $L_B$ at t=0 to perpendicular to $L_B$ at t=$t_{EIT}$).

Similarly, in some implementations, at the beginning (t=0), the coupling rate adjustment system 300 can set the position of the first resonator structure $L_1$ at a first large predetermined distance from the intermediate resonator structure $L_B$ so that the value of the coupling rate $IC_{1B}$ is at its minimum value. Correspondingly, the coupling rate adjustment system 300 can set the position of the second resonator structure $L_2$ at a second small predetermined distance from the intermediate resonator structure $L_B$ so that the value of the coupling rate $\kappa_{B2}$ between the first and intermediate resonator structure is at its maximum value. During wireless energy transfer, the coupling rate adjustment system 300 can affect the position of the first resonator structure $L_1$ to bring it closer to $L_B$ so that the value of $\kappa_{1B}$ is increased. In some examples, the coupling rate adjustment system 300 can also effect the position of the second resonator structure, $L_2$, to take it away from $L_B$ so that the value of $\kappa_{B2}$ is decreased. In some examples, a similar effect can be achieved by fixing $L_1$ and $L_2$ to be at a fixed distance to each other and effecting the position of only $L_B$ to be close to $L_2$ and away from $L_1$ at t=0 and close to $L_1$ and away from $L_2$ at t=$t_{EIT}$. In some examples, a similar effect can be achieved by fixing $L_B$ and one of $L_1$ and $L_2$ (e.g., $L_1$) at a predetermined (not too large but not too small) distance and effecting the position only the other of $L_1$ and $L_2$ (e.g., $L_2$ from close to $L_B$ at t=0 to away from $L_B$ at t=$t_{EIT}$).

5. Comparison of Static and Adiabatically Dynamic Systems

Figure 21:
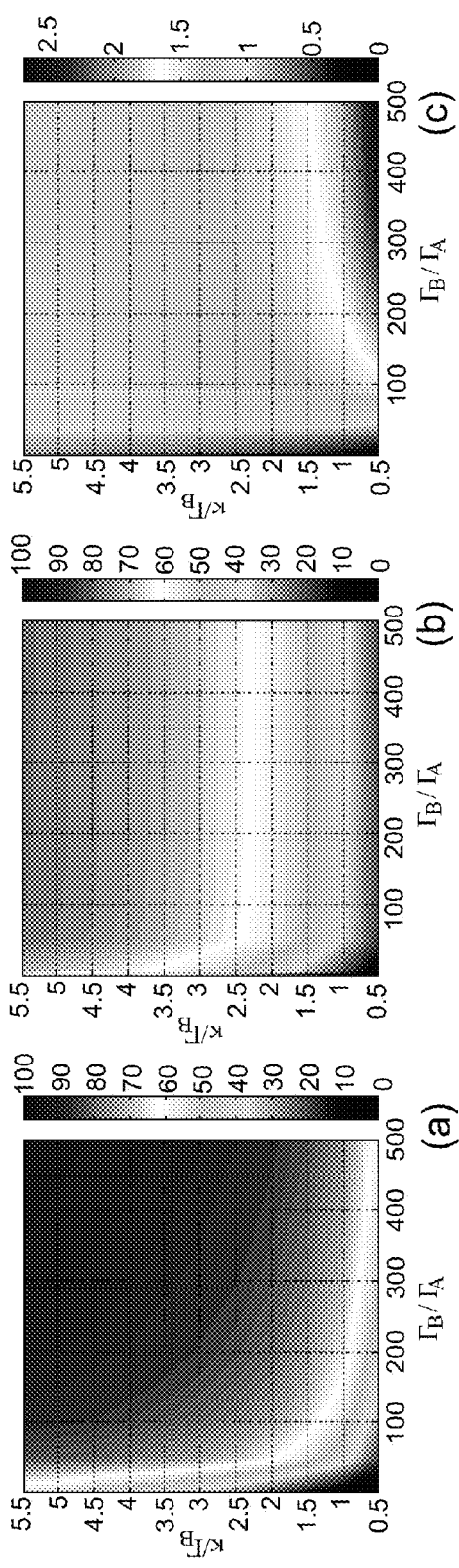
FIGS. 21(a)-(f) show a comparison between the adiabatic-κ and constant-κ energy transfer schemes, in the general case: (a) Optimum $E_2$ (%) in adiabatic-κ transfer, (b) Optimum $E_2$ (%) in constant-κ transfer, (c) $(E_2)_{adiabatic-\kappa}/(E_2)_{constant-\kappa}$, (d) Energy lost (%) at optimum adiabatic-κ transfer, (e) Energy lost (%) at optimum constant-κ transfer, (f) $(E_{lost})_{constant-\kappa}/(E_{lost})_{adiabatic-\kappa}$.

In the abstract case of energy transfer from $R_1$ to $R_2$, where no constraints are imposed on the relative magnitude of $\kappa$, $\Gamma_{rad}^A$, $\Gamma_{rad}^B$, $\Gamma_{abs}^A$, and $\Gamma_{abs}^B$, it is not certain that the adiabatic-$\kappa$ (EIT-like) system will always perform better than the constant-$\kappa$ one, in terms of the transferred and radiated energies. In fact, there could exist some range of the parameters ($\kappa$, $\Gamma_{rad}^A$, $\Gamma_{rad}^B$, $\Gamma_{abs}^A$, $\Gamma_{abs}^B$), for which the energy radiated in the constant-$\kappa$ transfer case is less than that radiated in the EIT-like case. For this reason, we investigate both the adiabatic-$\kappa$ and constant-$\kappa$ transfer schemes, as we vary some of the crucial parameters of the system. The percentage of energies transferred and lost (radiated+absorbed) depends only on the relative values of $\kappa$, $\Gamma_A = \Gamma_{rad}^A + \Gamma_{abs}^A$ and $\Gamma_B = \Gamma_{rad}^B + \Gamma_{abs}^B$. Hence we first calculate and visualize the dependence of these energies on the relevant parameters $\kappa/\Gamma_B$ and $\Gamma_B/\Gamma_A$, in the contour plots shown in FIG. 21.

The way the contour plots are calculated is as follows. For each value of ($\kappa/\Gamma_B$, $\Gamma_B/\Gamma_A$) in the adiabatic case, where $\kappa_{1B}(t)$ and $\kappa_{B2}(t)$ are given by Eq. (44)-(45), one tries range of values of $t_{EIT}$. For each $t_{EIT}$, the maximum energy transferred $E_2$ (%) over $0 < t < t_{EIT}$, denoted by max($E_2$, $t_{EIT}$), is calculated together with the total energy lost at that maximum transfer. Next the maximum of max($E_2$, $t_{EIT}$) over all values of $t_{EIT}$ is selected and plotted as single point on the contour plot in FIG. 21a. We refer to this point as the optimum energy transfer (%) in the adiabatic-$\kappa$ case for the particular ($\kappa/\Gamma_B$, $\Gamma_B/\Gamma_A$) under consideration. We also plot in FIG. 21d the corresponding value of the total energy lost (%) at the optimum of $E_2$. We repeat these calculations for all pairs ($\kappa/\Gamma_B$, $\Gamma_B/\Gamma_A$) shown in the contour plots. In the constant-$\kappa$ transfer case, for each ($\kappa/\Gamma_B$, $\Gamma_B/\Gamma_A$), the time evolution of $E_2$(%) and $E_{lost}$ are calculated for $0 < t < 2/\kappa$, and optimum transfer, shown in FIG. 21b, refers to the maximum of $E_3(t)$ over $0 < t < 2/\kappa$. The corresponding total energy lost at optimum constant-transfer is shown in FIG. 21e. Now that we calculated the energies of interest as functions of ($\kappa/\Gamma_B$, $\Gamma_B/\Gamma_A$), we look for ranges of the relevant parameters in which the adiabatic-$\kappa$ transfer has advantages over the constant-$\kappa$ one. So, we plot the ratio of $(E_2)_{adiabatic-\kappa}/(E_2)_{constant-\kappa}$ in FIG. 21c, and $(E_{lost})_{constant-\kappa}/(E_{lost})_{adiabatic-\kappa}$ in FIG. 21f. We find that, for $\Gamma_B/\Gamma_A > 50$, the optimum energy transferred in the adiabatic-$\kappa$ case exceeds that in the constant-$\kappa$ case, and the improvement factor can be larger than 2. From FIG. 21f, one sees that the adiabatic-$\kappa$ scheme can reduce the total energy lost by factor of 3 compared to the constant-$\kappa$ scheme, also in the range $\Gamma_B/\Gamma_A > 50$. As in the constant-$\kappa$ case, also in the adiabatic-$\kappa$ case the efficiency increases as the ratio of the maximum value, $\kappa$, of the coupling rates to the loss rate of the intermediate object (and thus also the first and second objects for $\Gamma_B/\Gamma_A > 1$) increases. In some examples, one may design a system so that $\kappa$ is larger than each of $\Gamma_B$ and $\Gamma_A$. In some examples, one may design a system so that $\kappa$ is at least 2 times larger than each of $\Gamma_B$ and $\Gamma_A$. In some examples, one may design a system so that $\kappa$ is at least 4 times larger than each of $\Gamma_B$ and $\Gamma_A$.

Figure 22:
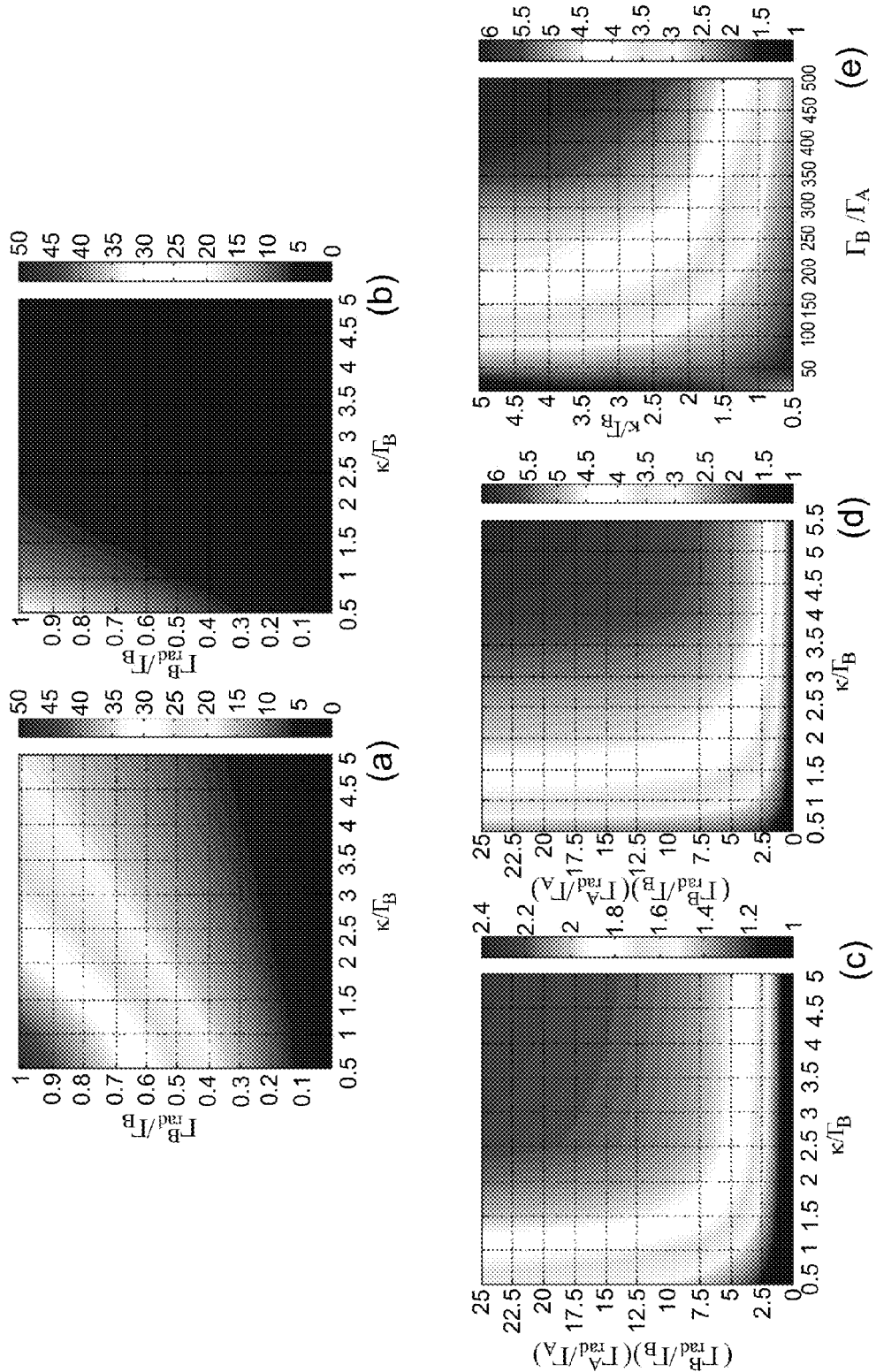
FIG. 22(a)-(e) show a comparison between radiated energies in the adiabatic-κ and constant-κ energy transfer schemes: (a) $E_{rad}$ (%) in the constant-scheme for $\Gamma_B/\Gamma_A=500$ and $\Gamma_{rad}{}^A=0$, (b) $E_{rad}$ (%) in the adiabatic-κ scheme for $\Gamma_B/\Gamma_A=500$ and $\Gamma_{rad}{}^A=0$, (c) $(E_{rad})_{constant-\kappa}/(E_{rad})_{adiabatic-\kappa}$ for $\Gamma_B/\Gamma_A=50$, (d) $(E_{rad})_{constant-\kappa}/(E_{rad})_{adiabatic-\kappa}$ for $\Gamma_B/\Gamma_A=500$, (e) $[(E_{rad})_{constant-\kappa}/(E_{rad})_{adiabatic-\kappa}]$ as function of $\kappa/\Gamma_B$ and $\Gamma_B/\Gamma_A$, for $\Gamma_{rad}{}^A=0$.

Although one may be interested in reducing the total energy lost (radiated+absorbed) as much as possible in order to make the transfer more efficient, the undersirable nature of the radiated energy may make it important to consider reducing the energy radiated. For this purpose, we calculate the energy radiated at optimum transfer in both the adiabatic-$\kappa$ and constant-$\kappa$ schemes, and compare them. The relevant parameters in this case are $\kappa/\Gamma_B$, $\Gamma_B/\Gamma_A$, $\Gamma_{rad}^A/\Gamma_A$, and $\Gamma_{rad}^B/\Gamma_B$. The problem is more complex because the parameter space is now 4-dimensional. So we focus on those particular cross sections that can best reveal the most important differences between the two schemes. From FIGS. 21c and 21f, one can guess that the best improvement in both $E_2$ and $E_{lost}$ occurs for $\Gamma_B/\Gamma_A \geq 500$. Moreover, knowing that it is the intermediate object $R_B$ that makes the main difference between the adiabatic-$\kappa$ and constant-$\kappa$ schemes, being "energy-empty" in the adiabatic-$\kappa$ case and "energy-full" in the constant-$\kappa$ one, we first look at the special situation where $\Gamma_{rad}^A = 0$. In FIG. 22a and FIG. 22b, we show contour plots of the energy radiated at optimum transfer, in the constant-$\kappa$ and adiabatic-$\kappa$ schemes respectively, for the particular cross section having $\Gamma_B/\Gamma_A = 500$ and $\Gamma_{rad}^A = 0$. Comparing these two figures, one can see that, by using the adiabatic-$\kappa$ scheme, one can reduce the energy radiated by factor of 6.3 or more.

To get quantitative estimate of the radiation reduction factor in the general case where $\Gamma_{A,rad} \neq 0$, we calculate the ratio of energies radiated at optimum transfers in both schemes, namely, $$\frac{(E_{rad})_{constant-\kappa}}{(E_{rad})_{adiabatic-\kappa}} = \frac{2\int_0^{\tau_*^{constant-\kappa}} \left\{ \frac{\Gamma_{rad}^B}{\Gamma_{rad}^A} |a_B^{constant-\kappa}(t)|^2 + |a_1^{constant-\kappa}(t)|^2 + |a_2^{constant-\kappa}(t)|^2 \right\}}{2\int_0^{\tau_*^{adiabatic-\kappa}} \left\{ \frac{\Gamma_{rad}^B}{\Gamma_{rad}^A} |a_B^{adiabatic-\kappa}(t)|^2 + |a_1^{adiabatic-\kappa}(t)|^2 + |a_2^{adiabatic-\kappa}(t)|^2 \right\}} \quad (46)$$

which depends only on $\Gamma_{rad}^B/\Gamma_{rad}^A$, the time-dependent mode amplitudes, and the optimum transfer times in both schemes. The latter two quantities are completely determined by $\kappa/\Gamma_B$ and $\Gamma_B/\Gamma_A$. Hence the only parameters relevant to the calculations of the ratio of radiated energies are $\Gamma_{rad}^B/\Gamma_{rad}^A$, $\kappa/\Gamma_B$ and $\Gamma_B/\Gamma_A$, thus reducing the dimensionality of the investigated parameter space from down to 3. For convenience, we multiply the first relevant parameter $\Gamma_{rad}^B/\Gamma_{rad}^A$ by $\Gamma_B/\Gamma_A$ which becomes $(\Gamma_{rad}^B/\Gamma_B)/(\Gamma_{rad}^A/\Gamma_A)$, i.e. the ratio of quantities that specify what percentage of each object's loss is radiated. Next, we calculate the ratio of energies radiated as function of $(\Gamma_{rad}^B/\Gamma_B)/(\Gamma_{rad}^A/\Gamma_A)$ and $\kappa/\Gamma_B$ in the two special cases $\Gamma_B/\Gamma_A = 50$, and $\Gamma_B/\Gamma_A = 500$, and plot them in FIG. 22c and FIG. 22d, respectively. We also show, in FIG. 22e, the dependence of $(E_{rad})_{constant-\kappa}/(E_{rad})_{EIT-like}$ on $\kappa/\Gamma_B$ and $\Gamma_B/\Gamma_A$, for the special case $\Gamma_{rad}^A = 0$. As can be seen from FIG. 22c-22d, the adiabatic-$\kappa$ scheme is less radiative than the constant-$\kappa$ scheme whenever $\Gamma_{rad}^B/\Gamma_B$ is larger than $\Gamma_{rad}^A/\Gamma_A$, and the radiation reduction ratio increases as $\Gamma_B/\Gamma_A$ and $\kappa/\Gamma_B$ are increased (see FIG. 22e). In some examples, the adiabatic-$\kappa$ scheme is less radiative than the constant-$\kappa$ scheme whenever $\Gamma_{rad}^B/\Gamma_{rad}^A$ is larger than about 20. In some examples, the adiabatic-$\kappa$ scheme is less radiative than the constant-$\kappa$ scheme whenever $\Gamma_{rad}^B/\Gamma_{rad}^A$ is larger than about 50.

It is to be understood that while three resonant objects are shown in the previous examples, other examples can feature four or more resonant objects. For example, in some examples, a single source object can transfer energy to multiple device objects through one intermediate object. In some examples, energy can be transferred from a source resonant object to a device resonant object, through two or more intermediate resonant objects, and so forth.

6. System Sensitivity to Extraneous Objects

In general, the overall performance of an example of the resonance-based wireless energy-transfer scheme depends strongly on the robustness of the resonant objects' resonances. Therefore, it is desirable to analyze the resonant objects' sensitivity to the near presence of random non-resonant extraneous objects. One appropriate analytical model is that of "perturbation theory" (PT), which suggests that in the presence of an extraneous perturbing object p the field amplitude $a_1(t)$ inside the resonant object 1 satisfies, to first order:

$$\frac{da_1}{dt} = -i(\omega_1 - i\Gamma_1)a_1 + i(\delta\kappa_{11(p)} + i\delta\Gamma_{1(p)})a_1 \quad (47)$$

where again $\omega_1$ is the frequency and $\Gamma_1$ the intrinsic (absorption, radiation etc.) loss rate, while $\delta\kappa_{11(p)}$ is the frequency shift induced onto 1 due to the presence of p and $\delta\Gamma_{1(p)}$ is the extrinsic due to p (absorption inside p, scattering from p etc.) loss rate. $\delta\Gamma_{1(p)}$ is defined as $\delta\Gamma_{1(p)} \equiv \Gamma_{1(p)} - \Gamma_1$, where $\Gamma_{1(p)}$ is the total perturbed loss rate in the presence of p. The first-order PT model is valid only for small perturbations. Nevertheless, the parameters $\delta\kappa_{11(p)}$, $\delta\Gamma_{1(p)}$ are well defined, even outside that regime, if $a_1$ is taken to be the amplitude of the exact perturbed mode. Note also that interference effects between the radiation field of the initial resonant-object mode and the field scattered off the extraneous object can for strong scattering (e.g. off metallic objects) result in total $\Gamma_{1,rad(p)}$ that are smaller than the initial $\Gamma_{1,rad}$ (namely $\delta\Gamma_{1,rad(p)}$ is negative).

It has been shown that a specific relation is desired between the resonant frequencies of the source and device-objects and the driving frequency. In some examples, all resonant objects must have the same eigenfrequency and this must be equal to the driving frequency. In some implementations, this frequency-shift can be "fixed" by applying to one or more resonant objects and the driving generator a feedback mechanism that corrects their frequencies. In some examples, the driving frequency from the generator can be fixed and only the resonant frequencies of the objects can be tuned with respect to this driving frequency.

The resonant frequency of an object can be tuned by, for example, adjusting the geometric properties of the object (e.g. the height of a self-resonant coil, the capacitor plate spacing of a capacitively-loaded loop or coil, the dimensions of the inductor of an inductively-loaded rod, the shape of a dielectric disc, etc.) or changing the position of a non-resonant object in the vicinity of the resonant object.

Figure 23A:
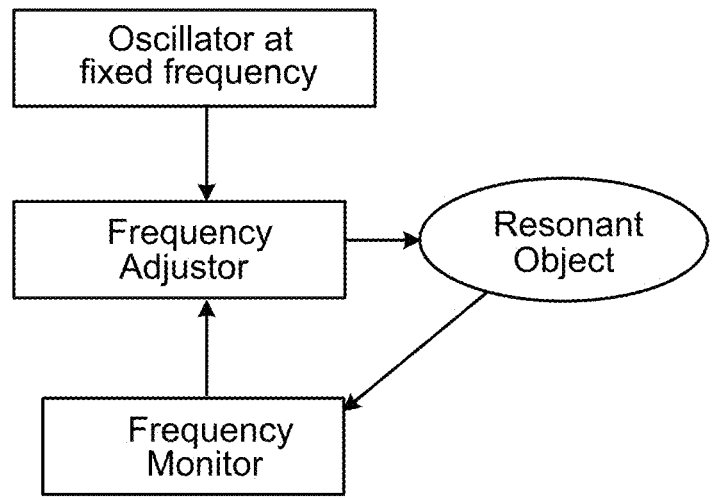
FIGS. 23(a)-(b) show schematics for frequency control mechanisms.

In some examples, referring to FIG. 23a, each resonant object is provided with an oscillator at fixed frequency and a monitor which determines the eigenfrequency of the object. At least one of the oscillator and the monitor is coupled to a frequency adjuster which can adjust the frequency of the resonant object. The frequency adjuster determines the difference between the fixed driving frequency and the object frequency and acts, as described above, to bring the object frequency into the required relation with respect to the fixed frequency. This technique assures that all resonant objects operate at the same fixed frequency, even in the presence of extraneous objects.

Figure 23B:
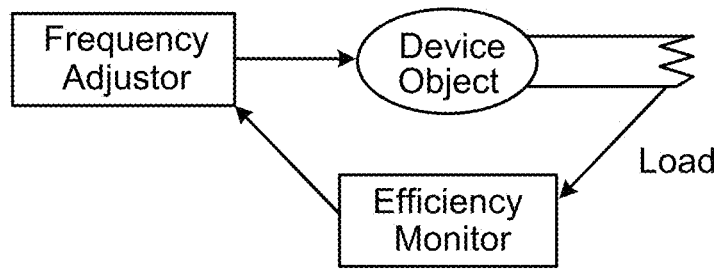

In some examples, referring to FIG. 23(b), during energy transfer from a source object to a device object, the device object provides energy or power to a load, and an efficiency monitor measures the efficiency of the energy-transfer or power-transmission. A frequency adjuster coupled to the load and the efficiency monitor acts, as described above, to adjust the frequency of the object to maximize the efficiency.

In other examples, the frequency adjusting scheme can rely on information exchange between the resonant objects. For example, the frequency of a source object can be monitored and transmitted to a device object, which is in turn synched to this frequency using frequency adjusters, as described above. In other embodiments the frequency of a single clock can be transmitted to multiple devices, and each device then synched to that frequency using frequency adjusters, as described above.

Unlike the frequency shift, the extrinsic perturbing loss due to the presence of extraneous perturbing objects can be detrimental to the functionality of the energy-transfer scheme, because it is difficult to remedy. Therefore, the total perturbed quality factors $Q_{(p)}$ (and the corresponding perturbed strong-coupling factor $U_{(p)}$) should be quantified.

In some examples, a system for wireless energy-transfer uses primarily magnetic resonances, wherein the energy stored in the near field in the air region surrounding the resonator is predominantly magnetic, while the electric energy is stored primarily inside the resonator. Such resonances can exist in the quasi-static regime of operation ($r \ll \lambda$) that we are considering: for example, for coils with $h \ll 2r$, most of the electric field is localized within the self-capacitance of the coil or the externally loading capacitor and, for dielectric disks, with $\in \gg 1$ the electric field is preferentially localized inside the disk. In some examples, the influence of extraneous objects on magnetic resonances is nearly absent. The reason is that extraneous non-conducting objects p that could interact with the magnetic field in the air region surrounding the resonator and act as a perturbation to the resonance are those having significant magnetic properties (magnetic permeability $Re\{\mu\} > 1$ or magnetic loss $Im\{\mu\} > 0$). Since almost all every-day non-conducting materials are non-magnetic but just dielectric, they respond to magnetic fields in the same way as free space, and thus will not disturb the resonance of the resonator. Extraneous conducting materials can however lead to some extrinsic losses due to the eddy currents induced inside them or on their surface (depending on their conductivity). However, even for such conducting materials, their presence will not be detrimental to the resonances, as long as they are not in very close proximity to the resonant objects.

The interaction between extraneous objects and resonant objects is reciprocal, namely, if an extraneous object does not influence a resonant object, then also the resonant object does not influence the extraneous object. This fact can be viewed in light of safety considerations for human beings. Humans are also non-magnetic and can sustain strong magnetic fields without undergoing any risk. A typical example, where magnetic fields $B \sim 1$ T are safely used on humans, is the Magnetic Resonance Imaging (MRI) technique for medical testing. In contrast, the magnetic near-field required in typical embodiments in order to provide a few Watts of power to devices is only $B \sim 10^{-4}$ T, which is actually comparable to the magnitude of the Earth's magnetic field. Since, as explained above, a strong electric near-field is also not present and the radiation produced from this non-radiative scheme is minimal, the energy-transfer apparatus, methods and systems described herein is believed safe for living organisms.

An advantage of the presently proposed technique using adiabatic variations of the coupling rates between the first and intermediate resonators and between the intermediate and second resonators compared to a mode of operation where these coupling rates are not varied but are constant is that the interactions of the intermediate resonator with extraneous objects can be greatly reduced with the presently proposed scheme. The reason is once more the fact that there is always a substantially small amount of energy in the intermediate resonator in the adiabatic-κ scheme, therefore there is little energy that can be induced from the intermediate object to an extraneous object in its vicinity. Furthermore, since the losses of the intermediate resonator are substantially avoided in the adiabatic-κ case, the system is less immune to potential reductions of the quality factor of the intermediate resonator due to extraneous objects in its vicinity.

6.1 Capacitively-Loaded Conducting Loops or Coils

In some examples, one can estimate the degree to which the resonant system of a capacitively-loaded conducting-wire coil has mostly magnetic energy stored in the space surrounding it. If one ignores the fringing electric field from the capacitor, the electric and magnetic energy densities in the space surrounding the coil come just from the electric and magnetic field produced by the current in the wire; note that in the far field, these two energy densities must be equal, as is always the case for radiative fields. By using the results for the fields produced by a subwavelength ($r \ll \lambda$) current loop (magnetic dipole) with $h=0$, we can calculate the ratio of electric to magnetic energy densities, as a function of distance $D_p$ from the center of the loop (in the limit $r \ll D_p$) and the angle $\theta$ with respect to the loop axis:

$$\frac{w_e(x)}{w_m(x)} = \frac{\varepsilon_0 |E(x)|^2}{\mu_0 |H(x)|^2} = \frac{\left(1 + \frac{1}{x^2}\right)\sin^2\theta}{\left(\frac{1}{x^2} + \frac{1}{x^4}\right)4\cos^2\theta + \left(1 - \frac{1}{x^2} + \frac{1}{x^4}\right)\sin^2\theta}; \quad (48)$$

$$x = 2\pi \frac{D_p}{\lambda} \Rightarrow \frac{\oiint_{S_p} w_e(x) dS}{\oiint_{S_p} w_m(x) dS} = \frac{1 + \frac{1}{x^2}}{1 + \frac{1}{x^2} + \frac{3}{x^4}};$$

$$x = 2\pi \frac{D_p}{\lambda},$$

where the second line is the ratio of averages over all angles by integrating the electric and magnetic energy densities over the surface of a sphere of radius $D_p$. From Eq. (48) it is obvious that indeed for all angles in the near field ($x \ll 1$) the magnetic energy density is dominant, while in the far field ($x \gg 1$) they are equal as they should be. Also, the preferred positioning of the loop is such that objects which can interfere with its resonance lie close to its axis ($\theta=0$), where there is no electric field. For example, using the systems described in Table 4, we can estimate from Eq. (48) that for the loop of $r=30$ cm at a distance $D_p=10r=3$ m the ratio of average electric to average magnetic energy density would be ~12% and at $D_p=3r=90$ cm it would be ~1%, and for the loop of $r=10$ cm at a distance $D_p=10r=1$ m the ratio would be ~33% and at $D_p=3r=30$ cm it would be ~2.5%. At closer distances this ratio is even smaller and thus the energy is predominantly magnetic in the near field, while in the radiative far field, where they are necessarily of the same order (ratio→1), both are very small, because the fields have significantly decayed, as capacitively-loaded coil systems are designed to radiate very little. Therefore, this is the criterion that qualifies this class of resonant system as a magnetic resonant system.

To provide an estimate of the effect of extraneous objects on the resonance of a capacitively-loaded loop including the capacitor fringing electric field, we use the perturbation theory formula, stated earlier, $\delta\Gamma_{1,abs(p)} = \omega_1/4 \cdot \int d^3 r \, \text{Im}\{\varepsilon_p(r)\}|E_1(r)|^2/W$ with the computational FEFD results for the field of an example like the one shown in the plot of FIG. 5 and with a rectangular object of dimensions 30 cm×30 cm×1.5 m and permittivity $\varepsilon=49+16i$ (consistent with human muscles) residing between the loops and almost standing on top of one capacitor (~3 cm away from it) and find $\delta Q_{abs(human)} \sim 10^5$ and for ~10 cm away $\delta Q_{abs(human)} \sim 5 \cdot 10^5$. Thus, for ordinary distances (~1 m) and placements (not immediately on top of the capacitor) or for most ordinary extraneous objects p of much smaller loss-tangent, we conclude that it is indeed fair to say that $\delta Q_{abs(p)} \to \infty$. The only perturbation that is expected to affect these resonances is a close proximity of large metallic structures.

Self-resonant coils can be more sensitive than capacitively-loaded coils, since for the former the electric field extends over a much larger region in space (the entire coil) rather than for the latter (just inside the capacitor). On the other hand, self-resonant coils can be simple to make and can withstand much larger voltages than most lumped capacitors. Inductively-loaded conducting rods can also be more sensitive than capacitively-loaded coils, since they rely on the electric field to achieve the coupling.

6.2 Dielectric Disks

For dielectric disks, small, low-index, low-material-loss or far-away stray objects will induce small scattering and absorption. In such cases of small perturbations these extrinsic loss mechanisms can be quantified using respectively the analytical first-order perturbation theory formulas $$[\delta Q_{1,rad(p)}]^{-1} = 2\delta\Gamma_{1,rad(p)}/\omega_1 \propto \int d^3 r \, [Re\{\varepsilon_p(r)\}|E_1(r)|]$$

$$[\delta Q_{1,abs(p)}]^{-1} = 2\delta\Gamma_{1,abs(p)}/\omega_1 = \int d^3 r \, Im\{\varepsilon_p(r)\}|E_1(r)|^2/2W$$

where $W = \int d^3 r \, \varepsilon(r)|E_1(r)|^2/2$ is the total resonant electromagnetic energy of the unperturbed mode. As one can see, both of these losses depend on the square of the resonant electric field tails E1 at the site of the extraneous object. In contrast, the coupling factor from object 1 to another resonant object 2 is, as stated earlier, $$k_{12} = 2\kappa_{12}/\sqrt{\omega_1 \omega_2} \propto \int d^3 r \, \varepsilon_2(r) E_2^*(r) E_1(r) / \int d^3 r \, \varepsilon(r)|E_1(r)|^2$$

and depends linearly on the field tails $E_1$ of 1 inside 2. This difference in scaling gives us confidence that, for, for example, exponentially small field tails, coupling to other resonant objects should be much faster than all extrinsic loss rates ($\kappa_{12} \gg \delta\Gamma_{1,2(p)}$), at least for small perturbations, and thus the energy-transfer scheme is expected to be sturdy for this class of resonant dielectric disks.

Figure 24C:
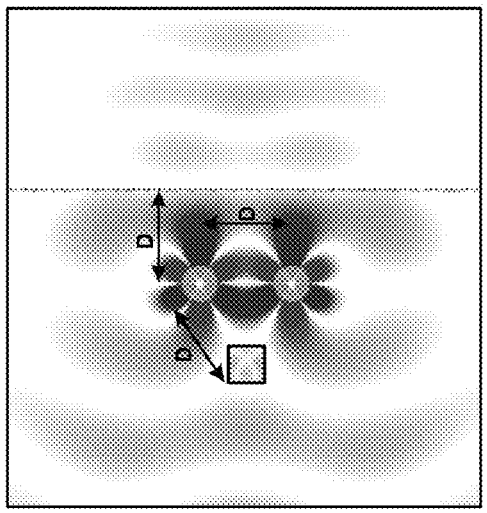

However, we also want to examine certain possible situations where extraneous objects cause perturbations too strong to analyze using the above first-order perturbation theory approach. For example, we place a dielectric disk close to another off-resonance object of large Re{∈}, Im{∈} and of same size but different shape (such as a human being h), as shown in FIG. 24a, and a roughened surface of large extent but of small Re{∈}, Im{∈} (such as a wall w), as shown in FIG. 24b. For distances $D_{h,w}/r=10-3$ between the disk-center and the "human"-center or "wall", the numerical FDFD simulation results presented in FIGS. 24a and 24b suggest that, the disk resonance seems to be fairly robust, since it is not detrimentally disturbed by the presence of extraneous objects, with the exception of the very close proximity of high-loss objects. To examine the influence of large perturbations on an entire energy-transfer system we consider two resonant disks in the close presence of both a "human" and a "wall". Comparing Table 8 to the table in FIG. 24c, the numerical FDFD simulations show that the system performance deteriorates from U~1-50 to $U_{(hw)}$~0.5-10, i.e. only by acceptably small amounts.

In general, different examples of resonant systems have different degree of sensitivity to external perturbations, and the resonant system of choice depends on the particular application at hand, and how important matters of sensitivity or safety are for that application. For example, for a medical implantable device (such as a wirelessly powered artificial heart) the electric field extent must be minimized to the highest degree possible to protect the tissue surrounding the device. In such cases where sensitivity to external objects or safety is important, one should design the resonant systems so that the ratio of electric to magnetic energy density $w_e/w_m$ is reduced or minimized at most of the desired (according to the application) points in the surrounding space.

7 Applications

The non-radiative wireless energy transfer techniques described above can enable efficient wireless energy-exchange between resonant objects, while suffering only modest transfer and dissipation of energy into other extraneous off-resonant objects. The technique is general, and can be applied to a variety of resonant systems in nature. In this Section, we identify a variety of applications that can benefit from or be designed to utilize wireless power transmission.

Remote devices can be powered directly, using the wirelessly supplied power or energy to operate or run the devices, or the devices can be powered by or through or in addition to a battery or energy storage unit, where the battery is occasionally being charged or re-charged wirelessly. The devices can be powered by hybrid battery/energy storage devices such as batteries with integrated storage capacitors and the like. Furthermore, novel battery and energy storage devices can be designed to take advantage of the operational improvements enabled by wireless power transmission systems.

Devices can be turned off and the wirelessly supplied power or energy used to charge or recharge a battery or energy storage unit. The battery or energy storage unit charging or recharging rate can be high or low. The battery or energy storage units can be trickle charged or float charged. It would be understood by one of ordinary skill in the art that there are a variety of ways to power and/or charge devices, and the variety of ways could be applied to the list of applications that follows.

Some wireless energy transfer examples that can have a variety of possible applications include for example, placing a source (e.g. one connected to the wired electricity network) on the ceiling of a room, while devices such as robots, vehicles, computers, PDAs or similar are placed or move freely within the room. Other applications can include powering or recharging electric-engine buses and/or hybrid cars and medical implantable devices. Additional example applications include the ability to power or recharge autonomous electronics (e.g. laptops, cell-phones, portable music players, house-hold robots, GPS navigation systems, displays, etc), sensors, industrial and manufacturing equipment, medical devices and monitors, home appliances (e.g. lights, fans, heaters, displays, televisions, counter-top appliances, etc.), military devices, heated or illuminated clothing, communications and navigation equipment, including equipment built into vehicles, clothing and protective-wear such as helmets, body armor and vests, and the like, and the ability to transmit power to physically isolated devices such as to implanted medical devices, to hidden, buried, implanted or embedded sensors or tags, to and/or from roof-top solar panels to indoor distribution panels, and the like.

A number of examples of the invention have been described. Nevertheless, it will be understood that various modifications can be made without departing from the spirit and scope of the invention.

What is claimed is:

1. A method for transferring energy wirelessly, the method comprising:
    transferring energy wirelessly from a first resonator structure to an intermediate resonator structure, wherein the coupling rate between the first resonator structure and the intermediate resonator structure is $\kappa_{1B}$;
    transferring energy wirelessly from the intermediate resonator structure to a second resonator structure, wherein the coupling rate between the intermediate resonator structure and the second resonator structure is $\kappa_{B2}$; and
    during the wireless energy transfers, adjusting at least one of the coupling rates $\kappa_{1B}$ and $\kappa_{B2}$ as a function of time to reduce energy accumulation in the intermediate resonator structure and improve wireless energy transfer from the first resonator structure to the second resonator structure through the intermediate resonator structure.

2. The method of claim 1, wherein the adjustment of at least one of the coupling rates $\kappa_{1B}$ and $\kappa_{B2}$ minimizes energy accumulation in the intermediate resonator structure and causes wireless energy transfer from the first resonator structure to the second resonator structure.

3. The method of claim 1, wherein the adjustment of at least one of the coupling rates $\kappa_{1B}$ and $\kappa_{B2}$ maintains energy distribution in the field of the three-resonator system in an eigenstate having substantially no energy in the intermediate resonator structure.

4. The method of claim 3, wherein the adjustment of at least one of the coupling rates $\kappa_{1B}$ and $\kappa_{B2}$ further causes the eigenstate to evolve substantially adiabatically from an initial state with substantially all energy in the resonator structures in the first resonator structure to a final state with substantially all of the energy in the resonator structures in the second resonator structure.

5. The method of claim 1, wherein the adjustment of at least one of the coupling rates $\kappa_{1B}$ and $\kappa_{B2}$ comprises adjustments of both coupling rates $\kappa_{1B}$ and $\kappa_{B2}$ during wireless energy transfer.

6. The method of claim 1, wherein the resonator structures each have a quality factor larger than 10.

7. The method of claim 1, wherein resonant energy in each of the resonator structures comprises electromagnetic fields.

8. The method of claim 7, wherein the maximum value of the coupling rate $\kappa_{1B}$ and the maximum value of the coupling rate $\kappa_{B2}$ for inductive coupling between the intermediate resonator structure and each of the first and second resonator structures are each larger than twice the loss rate $\Gamma$ for each of the first and second resonators.

9. The method of claim 8, wherein the maximum value of the coupling rate $\kappa_{1B}$ and the maximum value of the coupling rate $\kappa_{B2}$ for inductive coupling between the intermediate resonator structure and each of the first and second resonator structures are each larger than four (4) times the loss rate $\Gamma$ for each of the first and second resonators.

10. The method of claim 7, wherein each resonator structure has a resonant frequency between 50 KHz and 500 MHz.

11. The method of claim 1, wherein the maximum value of the coupling rate $\kappa_{1B}$ and the maximum value of the coupling rate $\kappa_{B2}$ are each at least five (5) times greater than the coupling rate between the first resonator structure and the second resonator structure.

12. The method of claim 1, wherein the intermediate resonator structure has a rate of radiative energy loss that is at least twenty (20) times greater than that for either the first resonator structure or the second resonator structure.

13. The method of claim 1, wherein the first and second resonator structures are substantially identical.

14. The method of claim 1, wherein the adjustment of at least one of the coupling rates $\kappa_{1B}$ and $\kappa_{B2}$ causes peak energy accumulation in the intermediate resonator structure to be less than five percent (5%) of the peak total energy in the three resonator structures.

15. The method of claim 1, wherein adjusting at least one of the coupling rates $\kappa_{1B}$ and $\kappa_{B2}$ comprises adjusting a relative position and/or orientation between one or more pairs of the resonator structures.

16. The method of claim 1, wherein adjusting at least one of the coupling rates $\kappa_{1B}$ and $\kappa_{B2}$ comprises adjusting a resonator property of one or more of the resonator structures.

17. The method of claim 16, wherein the resonator property comprises mutual inductance.

18. The method of claim 1, wherein at least one of the resonator structures comprises a capacitively loaded loop or coil of at least one of a conducting wire, a conducting Litz wire, and a conducting ribbon.

19. The method of claim 1, wherein at least one of the resonator structures comprises an inductively loaded rod of at least one of a conducting wire, a conducting Litz wire, and a conducting ribbon.

20. The method of claim 4, wherein the adjustment of at least one of the coupling rates $\kappa_{1B}$ and $\kappa_{B2}$ causes peak energy accumulation in the intermediate resonator structure during the wireless energy transfers to be less than ten percent (10%) of the peak total energy in the three resonator structures.

21. The method of claim 1, wherein the wireless energy transfers are non-radiative energy transfers mediated by a coupling of a resonant field evanescent tail of the first resonator structure and a resonant field evanescent tail of the intermediate resonator structure and a coupling of the resonant field evanescent tail of the intermediate resonator structure and a resonant field evanescent tail of the second resonator structure.

22. The method of claim 1, wherein the first and second resonator structures each have a quality factor greater than 50.

23. The method of claim 1, wherein the first and second resonator structures each have a quality factor greater than 100.

24. The method of claim 1, wherein during the wireless energy transfer from the first resonator structure to the second resonator structure at least one of the coupling rates is adjusted so that $\kappa_{1B} \ll \kappa_{B2}$ at a start of the energy transfer and $\kappa_{1B} \gg \kappa_{B2}$ by a time a substantial portion of the energy has been transferred from the first resonator structure to the second resonator structure.

25. A method for transferring energy wirelessly, the method comprising:
    transferring energy wirelessly from a first resonator structure to an intermediate resonator structure, wherein the coupling rate between the first resonator structure and the intermediate resonator structure is $\kappa_{1B}$;
    transferring energy wirelessly from the intermediate resonator structure to a second resonator, wherein the coupling rate between the intermediate resonator structure and the second resonator structure is $\kappa_{B2}$; and
    during the wireless energy transfers, adjusting at least one of the coupling rates $\kappa_{1B}$ and $\kappa_{B2}$ to cause an energy distribution in the field of the three-resonator system to have substantially no energy in the intermediate resonator structure while wirelessly transferring energy from the first resonator structure to the second resonator structure through the intermediate resonator structure.

26. The method of claim 25, wherein having substantially no energy in the intermediate resonator structure means that peak energy accumulation in the intermediate resonator structure is less than ten percent (10%) of the peak total energy in the three resonator structures throughout the wireless energy transfer.

27. The method of claim 25, wherein having substantially no energy in the intermediate resonator structure means that peak energy accumulation in the intermediate resonator structure is less than five percent (5%) of the peak total energy in the three resonator structures throughout the wireless energy transfer.

28. The method of claim 25, wherein the adjustment of at least one of the coupling rates $\kappa_{1B}$ and $\kappa_{B2}$ maintains the energy distribution in the field of the three-resonator system in an eigenstate having the substantially no energy in the intermediate resonator structure.

29. The method of claim 28, wherein the adjustment of at least one of the coupling rates $\kappa_{1B}$ and $\kappa_{B2}$ further causes the eigenstate to evolve substantially adiabatically from an initial state with substantially all energy in the resonator structures in the first resonator structure to a final state with substantially all of the energy in the resonator structures in the second resonator structure.

30. An apparatus comprising:
    first, intermediate, and second resonator structures, wherein a coupling rate between the first resonator structure and the intermediate resonator structure is $\kappa_{1B}$ and a coupling rate between the intermediate resonator structure and the second resonator structure is $\kappa_{B2}$; and
    means for adjusting at least one of the coupling rates $\kappa_{1B}$ and $\kappa_{B2}$ during wireless energy transfers among the resonator structures to cause an energy distribution in the field of the three-resonator system to have substantially no energy in the intermediate resonator structure while wirelessly transferring energy from the first resonator structure to the second resonator structure through the intermediate resonator structure.

31. An apparatus comprising:
    first, intermediate, and second resonator structures, wherein a coupling rate between the first resonator structure and the intermediate resonator structure is $\kappa_{1B}$ and a coupling rate between the intermediate resonator structure and the second resonator structure is $\kappa_{B2}$; and
    means for adjusting at least one of the coupling rates $\kappa_{1B}$ and $\kappa_{B2}$ during wireless energy transfers among the resonator structures as a function of time to reduce energy accumulation in the intermediate resonator structure and improve wireless energy transfer from the first resonator structure to the second resonator structure through the intermediate resonator structure.

32. The apparatus of claim 31, wherein the means for adjusting comprises a rotation stage for adjusting the relative orientation of the intermediate resonator structure with respect to the first and second resonator structures.

33. The apparatus of claim 31, wherein the means for adjusting comprises a translation stage for moving the first and/or second resonator structures relative to the intermediate resonator structure.

34. The apparatus of claim 31, wherein the means for adjusting comprises a mechanical, electro-mechanical, or electrical staging system for dynamically adjusting the effective size of one or more of the resonator structures.

* * * * *

UNITED STATES PATENT AND TRADEMARK OFFICE
CERTIFICATE OF CORRECTION

PATENT NO.        : 8,836,172 B2
APPLICATION NO.   : 13/677407
DATED             : September 16, 2014
INVENTOR(S)       : Rafif E. Hamam et al.

Page 1 of 1

It is certified that error appears in the above-identified patent and that said Letters Patent is hereby corrected as shown below:

On the Title Page,

Page 5

Column 1 under item (56), (Other Publications), Line 2, delete "Reasonators" and insert
-- Resonators --

Column 2 under item (56), (Other Publications), Line 20, delete "propogation" and insert
-- propagation --

Column 2 under item (56), (Other Publications), Line 38, delete "Electrica" and insert
-- Electrical --

Page 6

Column 1 under item (56), (Other Publications), Line 55, delete "NewScientistsTech" and insert
-- NewScientistTech --

Column 2 under item (56), (Other Publications), Line 17, delete "http;" and insert -- http: --

In the Claims,

Column 53, Line 48, in Claim 24, delete "$K_{B2}$" and insert -- $\kappa_{B2}$ --

Signed and Sealed this
Twenty-seventh Day of January, 2015

Michelle K. Lee
*Deputy Director of the United States Patent and Trademark Office*